US012306378B2

(12) United States Patent
Amin et al.

(10) Patent No.: US 12,306,378 B2
(45) Date of Patent: *May 20, 2025

(54) TRANSPARENT GLASS-CERAMIC ARTICLES WITH RETAINED STRENGTH AND DISPLAY DEVICES WITH THE SAME

(71) Applicant: CORNING INCORPORATED, Corning, NY (US)

(72) Inventors: Jaymin Amin, Corning, NY (US); Jason Thomas Harris, Horseheads, NY (US); Shandon Dee Hart, Elmira, NY (US); Chang-gyu Kim, Gyeonggi-do (KR); Karl William Koch, III, Elmira, NY (US); Carlo Anthony Kosik Williams, Painted Post, NY (US); Lin Lin, Painted Post, NY (US); Dong-gun Moon, Yongin-si (KR); Jeonghong Oh, Cheonan-si (KR); James Joseph Price, Corning, NY (US); Charlene Marie Smith, Corning, NY (US); Ananthanarayanan Subramanian, Corning, NY (US); Ljerka Ukrainczyk, Ithaca, NY (US); Tingge Xu, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 544 days.

This patent is subject to a terminal disclaimer.

(21) Appl. No.: 17/708,105

(22) Filed: Mar. 30, 2022

(65) Prior Publication Data
US 2022/0317340 A1    Oct. 6, 2022

Related U.S. Application Data

(60) Provisional application No. 63/169,376, filed on Apr. 1, 2021, provisional application No. 63/282,720, filed on Nov. 24, 2021.

(51) Int. Cl.
| G02B 1/14 | (2015.01) |
| C03C 10/00 | (2006.01) |
| C03C 17/34 | (2006.01) |
| G02B 1/115 | (2015.01) |
| G02B 5/28 | (2006.01) |

(52) U.S. Cl.
CPC ........... *G02B 1/14* (2015.01); *C03C 10/0027* (2013.01); *C03C 17/3435* (2013.01);
(Continued)

(58) Field of Classification Search
CPC .. G02B 1/11–1/18; C03C 3/076–3/118; C03C 17/22–17/256; C03C 17/3411–17/3494; C03C 17/3657
See application file for complete search history.

(56) References Cited

U.S. PATENT DOCUMENTS 9,703,011 B2   7/2017  Adib et al.
10,160,688 B2  12/2018  Amin et al.
(Continued)

FOREIGN PATENT DOCUMENTS

| JP | 6639101 B2 | 2/2020 | |
| WO | WO-2019022033 A1 * | 1/2019 | ............ C03B 32/02 |
| WO | 2020/018393 A1 | 1/2020 | |

OTHER PUBLICATIONS

International Search Report and Written Opinion of the International Searching Authority; PCT/US2022/022493; mailed on Jul. 18, 2022, 12 pages; European Patent Office.

*Primary Examiner* — Prashant J Khatri
(74) *Attorney, Agent, or Firm* — William J. Tucker

(57) ABSTRACT

A transparent article is described herein that includes: a glass-ceramic substrate comprising first and second primary surfaces opposing one another and a crystallinity of at least 40% by weight; and an optical film structure disposed on the first primary surface. The optical film structure comprises a plurality of alternating high refractive index (RI) and low RI
(Continued)

layers and a scratch-resistant layer. The article also exhibits an average photopic transmittance of greater than 80% and a maximum hardness of greater than 10 GPa, as measured by a Berkovich Hardness Test over an indentation depth range from about 100 nm to about 500 nm. The glass-ceramic substrate comprises an elastic modulus of greater than 85 GPa and a fracture toughness of greater than 0.8 MPa·√m. Further, the optical film structure exhibits a residual compressive stress of ≥700 MPa and an elastic modulus of ≥140 GPa.

13 Claims, 14 Drawing Sheets

(52) U.S. Cl.
CPC .............. *G02B 1/115* (2013.01); *G02B 5/285* (2013.01); *C03C 2217/734* (2013.01)

(56) References Cited

U.S. PATENT DOCUMENTS

| | | |
|---|---|---|
| 10,611,675 B2 | 4/2020 | Beall et al. |
| 11,242,280 B2 | 2/2022 | Hart et al. |
| 2014/0376094 A1 | 12/2014 | Bellman et al. |
| 2014/0377522 A1 | 12/2014 | Koch et al. |
| 2015/0274585 A1 | 10/2015 | Rogers et al. |
| 2016/0041308 A1 | 2/2016 | Kramer et al. |
| 2016/0102010 A1* | 4/2016 | Beall ................... C03C 21/002 501/4 |
| 2017/0075039 A1* | 3/2017 | Hart ..................... H05K 5/0017 |
| 2018/0011225 A1 | 1/2018 | Bellman et al. |
| 2018/0275318 A1 | 9/2018 | Amin et al. |
| 2018/0321425 A1 | 11/2018 | Hart et al. |
| 2019/0161395 A1 | 5/2019 | Beall et al. |
| 2019/0219739 A1 | 7/2019 | Gregorski et al. |
| 2019/0337841 A1 | 11/2019 | Hart et al. |
| 2020/0057177 A1* | 2/2020 | Hart ....................... C03C 3/085 |
| 2020/0148591 A1 | 5/2020 | Andrews et al. |
| 2020/0156992 A1 | 5/2020 | Baloukas et al. |
| 2020/0156994 A1* | 5/2020 | Li ........................... C03C 3/085 |
| 2020/0158916 A1 | 5/2020 | Hart et al. |
| 2020/0223744 A1 | 7/2020 | Beall et al. |
| 2020/0231491 A1 | 7/2020 | Beall et al. |
| 2020/0310000 A1 | 10/2020 | Hart et al. |
| 2020/0399171 A1 | 12/2020 | Ahmed et al. |
| 2020/0407268 A1 | 12/2020 | Mitchell |
| 2022/0268967 A1 | 8/2022 | Melcher et al. |

\* cited by examiner

TRANSPARENT GLASS-CERAMIC ARTICLES WITH RETAINED STRENGTH AND DISPLAY DEVICES WITH THE SAME

CLAIM OF PRIORITY

This application claims the benefit of priority under 35 U.S.C. § 119 of U.S. Provisional Patent Application No. 63/169,376, filed on Apr. 1, 2021, and U.S. Provisional Application No. 63/282,720, filed on Nov. 24, 2021. The entire contents of each of these applications are hereby incorporated herein by reference for all purposes.

FIELD

This disclosure relates to transparent articles for protection of optical articles and display devices, particularly transparent articles having a glass-ceramic substrate with an optical film structure disposed thereon that exhibit various optical and mechanical performance attributes including high hardness, photopic transmittance, low transmitted color, damage resistance, high modulus, high fracture toughness and/or retained strength.

BACKGROUND

Cover articles with glass substrates are often used to protect critical devices and components within electronic products and systems, such as mobile devices, smart phones, computer tablets, hand-held devices, vehicular displays and other electronic devices with displays, cameras, light sources and/or sensors. These cover articles can also be employed in architectural articles, transportation articles (e.g., articles used in automotive applications, trains, aircraft, sea craft, etc.), appliance articles, or any article that requires some transparency, scratch resistance, abrasion resistance, or a combination thereof.

These applications that employ cover glass articles often demand a combination of mechanical and environmental durability, breakage resistance, damage resistance, scratch resistance and strong optical performance characteristics. For example, the cover articles may be required to exhibit high light transmittance, low reflectance and/or low transmitted color in the visible spectrum. In some applications, the cover articles are required to cover and protect display devices, cameras, sensors and/or light sources.

Conventional cover articles employing glass substrates in combination with optical, hard coatings have been successfully employed in these applications. Nevertheless, the devices employed in these applications often remain limited by damage resistance, particularly from inadvertent impact events (e.g., dropping the device). While other approaches using polymeric substrates and/or low modulus, high toughness polymeric coatings have been successfully employed to improve damage resistance, these approaches tend to reduce device-level scratch resistance, can degrade optical performance, or can otherwise necessitate an increase in display power usage to compensate for the loss in optical performance. Other cover articles have employed glass-ceramic or ceramic substrates, mindful of their higher hardness and modulus levels as compared to glass substrates. But these approaches have had limited success as glass-ceramic and ceramic substrates are generally believed to have inferior optical properties, as compared to cover article approaches that employ glass substrates strengthened through ion-exchange processes.

Conventional cover articles employing glass or glass-ceramic substrates and optical film structures can suffer from reduced article-level mechanical performance. In particular, the inclusion of optical film structures on these substrates has provided advantages in terms of optical performance and certain mechanical properties (e.g., scratch resistance); however, conventional combinations of these substrates and optical film structures (e.g., as optimized for improved scratch resistance with high modulus and/or hardness) has resulted in inferior strength levels for the resultant article. Notably, it appears that the presence of the optical film structure on the substrate can disadvantageously reduce the strength level of the article to a level below the strength of the substrate in a bare form without the optical film structure.

Accordingly, there is a need for improved cover articles for protection of optical articles and devices, particularly transparent articles that exhibit high hardness, photopic transmittance, and low transmitted color, along with damage resistance, high modulus and/or high fracture toughness. Further, there is a need for the foregoing transparent articles in which their bare substrate strength levels are retained, or substantially retained (e.g., at or above an application-driven threshold), after the inclusion of their optical film structures. These needs, and other needs, are addressed by the present disclosure.

SUMMARY

According to an aspect of the disclosure, a transparent article is provided that includes: a glass-ceramic substrate comprising a first and a second primary surface, the primary surfaces opposing one another; and an optical film structure defining an outer surface, the optical film structure disposed on the first primary surface. The glass-ceramic substrate comprises a crystallinity of at least 40% by weight. Further, the optical film structure comprises a plurality of alternating high refractive index (RI) and low RI layers and a scratch-resistant layer. The article also exhibits an average photopic transmittance of greater than 80%, a transmitted color $\sqrt{(a^{*2}+b^{*2})}$ with a D65 illuminant of less than 4 at incident angles from 0 degrees to 10 degrees, and a maximum hardness of greater than 10 GPa, as measured by a Berkovich Hardness Test over an indentation depth range from about 100 nm to about 500 nm from the outer surface of the optical film structure. Further, the glass-ceramic substrate comprises an elastic modulus of greater than 85 GPa and a fracture toughness of greater than 0.8 MPa·$\sqrt{m}$.

According to another aspect of the disclosure, a transparent article is provided that includes: a glass-ceramic substrate comprising a first and a second primary surface, the primary surfaces opposing one another; and an optical film structure defining an outer surface, the optical film structure disposed on the first primary surface. The glass-ceramic substrate comprises a crystallinity of at least 40% by weight. Further, the optical film structure comprises a plurality of alternating high refractive index (RI) and low RI layers and a scratch-resistant layer. The article also exhibits an average photopic transmittance of greater than 80%, a transmitted color $\sqrt{(a^{*2}+b^{*2})}$ with a D65 illuminant of less than 4 at incident angles from 0 degrees to 10 degrees, and a lateral crack zone with an average largest linear dimension of less than 160 microns or a lateral crack area that is less than 25,000 μm², as tested with a Vickers Indentation Damage Test with a 1000 g load.

According to a further aspect of the disclosure, a transparent article is provided that includes: a glass-ceramic substrate having a refractive index of about 1.52 or greater and comprising a first and a second primary surface, the primary surfaces opposing one another; and an optical film structure defining an outer surface, the optical film structure disposed on the first primary surface. The glass-ceramic substrate comprises a crystallinity of at least 40% by weight. Further, the optical film structure comprises a plurality of alternating high refractive index (RI) and low RI layers and a scratch-resistant layer. The article also exhibits an average photopic transmittance of greater than 80% and a transmitted color $\sqrt{(a^{*2}+b^{*2})}$ with a D65 illuminant through of less than 4 at incident angles from 0 degrees to 10 degrees. In addition, the optical film structure comprises an outer structure and an inner structure, the scratch-resistant layer disposed between the outer and inner structures. Further, the inner structure of the optical film structure is configured to substantially match an optical impedance between the glass-ceramic substrate and the scratch-resistant layer. The glass-ceramic substrate also comprises an elastic modulus of greater than 85 GPa and a fracture toughness of greater than 0.8 MPa·$\sqrt{m}$.

According to an aspect of the disclosure, a transparent article is provided that includes: a glass-ceramic substrate comprising a first and a second primary surface, the primary surfaces opposing one another; and an optical film structure comprising an inner surface and an outer surface, the inner surface of the optical film structure disposed on the first primary surface. The glass-ceramic substrate comprises a crystallinity of at least 40% by weight. Further, the optical film structure comprises a plurality of alternating high refractive index (RI) layers and low RI layers and a scratch-resistant layer. The article also exhibits an average photopic transmittance of greater than 80% and a maximum hardness of greater than 10 GPa, as measured by a Berkovich Hardness Test over an indentation depth range from about 100 nm to about 500 nm from the outer surface of the optical film structure. The glass-ceramic substrate comprises an elastic modulus of greater than 85 GPa and a fracture toughness of greater than 0.8 MPa·$\sqrt{m}$. Further, the optical film structure exhibits a residual compressive stress of greater than or equal to 700 MPa and an elastic modulus of greater than or equal to 140 GPa.

According to another aspect of the disclosure, a transparent article is provided that includes: a glass-ceramic substrate comprising a first and a second primary surface, the primary surfaces opposing one another; and an optical film structure comprising an inner surface and an outer surface, the inner surface of the optical film structure disposed on the first primary surface. The glass-ceramic substrate comprises a crystallinity of at least 40% by weight. Further, the optical film structure comprises a plurality of alternating high refractive index (RI) layers and low RI layers and a scratch-resistant layer. The article also exhibits an average photopic transmittance of greater than 80% and a maximum hardness of greater than 10 GPa, as measured by a Berkovich Hardness Test over an indentation depth range from about 100 nm to about 500 nm from the outer surface of the optical film structure. The glass-ceramic substrate comprises an elastic modulus of greater than 85 GPa and a fracture toughness of greater than 0.8 MPa·$\sqrt{m}$. Further, the optical film structure exhibits a residual compressive stress of from 700 MPa to 1100 MPa and an elastic modulus of from 140 GPa to 200 GPa. In addition, the article exhibits an average failure stress of 700 MPa or greater in a ring-on-ring test with the outer surface of the optical film structure placed in tension.

According to a further aspect of the disclosure, a transparent article is provided that includes: a glass-ceramic substrate comprising a first and a second primary surface, the primary surfaces opposing one another; and an optical film structure comprising an inner surface and an outer surface, the inner surface of the optical film structure disposed on the first primary surface. The glass-ceramic substrate comprises a crystallinity of at least 75% by weight, a lithium disilicate phase, and average crystallite size of less than 100 nm. Further, the optical film structure comprises a plurality of alternating high refractive index (RI) layers and low RI layers and a scratch-resistant layer. The optical film structure has a total physical thickness of from about 200 nm to about 5000 nm, and the scratch resistant layer has a physical thickness from about 100 nm to about 4000 nm. The optical film structure exhibits an elastic modulus from about 140 GPa to 180 GPa. Further, the article exhibits an average failure stress of 700 MPa or greater in a ring-on-ring test with the outer surface of the optical film structure placed in tension.

According to other aspects of the disclosure, a display device is provided that includes one or more of the foregoing transparent articles, with each article serving as a protective cover for the display device.

According to another aspect of the disclosure, a method of making a transparent article is provided that includes: providing a glass-ceramic substrate comprising a first and a second primary surface, the primary surfaces opposing one another; and depositing an optical film structure on the substrate, the optical film structure comprising an inner surface and an outer surface, wherein the inner surface of the optical film structure is disposed on the first primary surface. The glass-ceramic substrate comprises a crystallinity of at least 40% by weight. Further, the optical film structure comprises a plurality of alternating high refractive index (RI) layers and low RI layers and a scratch-resistant layer. The article also exhibits an average photopic transmittance of greater than 80% and a maximum hardness of greater than 10 GPa, as measured by a Berkovich Hardness Test over an indentation depth range from about 100 nm to about 500 nm from the outer surface of the optical film structure. The glass-ceramic substrate comprises an elastic modulus of greater than 85 GPa and a fracture toughness of greater than 0.8 MPa·$\sqrt{m}$. Further, the step of depositing the optical film structure is conducted such that the optical film structure exhibits a residual compressive stress of greater than or equal to 700 MPa and an elastic modulus of greater than or equal to 140 GPa.

Additional features and advantages will be set forth in the detailed description which follows, and in part will be readily apparent to those skilled in the art from that description or recognized by practicing the embodiments as described herein, including the detailed description which follows, the claims, as well as the appended drawings.

BRIEF DESCRIPTION OF THE DRAWINGS

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments, wherein:

DETAILED DESCRIPTION

Figure 1A:
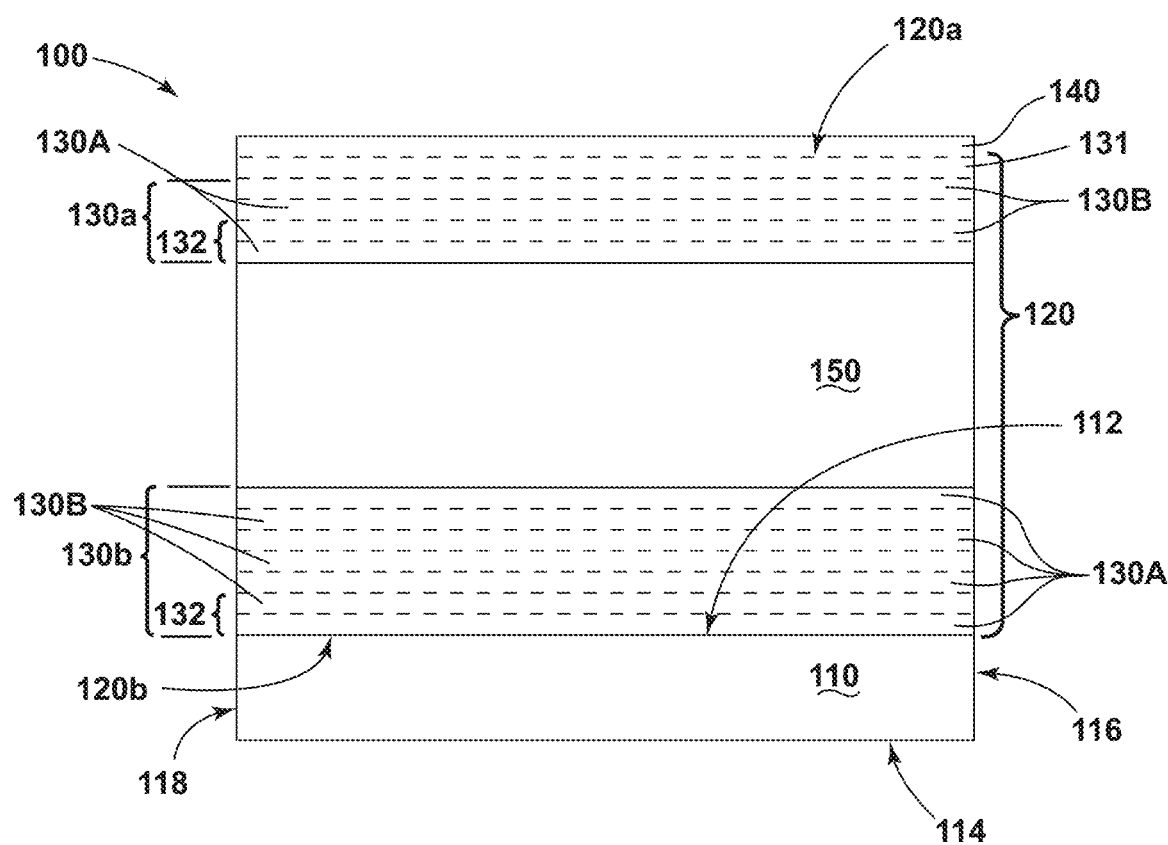
FIG. 1A is a cross-sectional side view of a transparent glass-ceramic article (e.g., for a display device), according to an embodiment of the disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example "up," "down," "right," "left," "front," "back," "top," "bottom"—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

As used herein, the term "dispose" includes coating, depositing, and/or forming a material onto a surface using any known or to be developed method in the art. The disposed material may constitute a layer, as defined herein. As used herein, the phrase "disposed on" includes forming a material onto a surface such that the material is in direct contact with the surface and embodiments where the material is formed on a surface with one or more intervening material(s) disposed between material and the surface. The intervening material(s) may constitute a layer, as defined herein.

As used herein, the terms "low RI layer" and "high RI layer" refer to the relative values of the refractive index ("RI") of layers of an optical film structure of a transparent article according to the disclosure (i.e., low RI layer<high RI layer). Hence, low RI layers have refractive index values that are less than the refractive index values of high RI layers. Further, as used herein, "low RI layer" and "low index layer" are interchangeable with the same meaning. Likewise, "high RI layer" and "high index layer" are interchangeable with the same meaning.

As used herein, the term "strengthened substrate" refers to a substrate employed in a transparent article of the disclosure that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

As used herein, the "Berkovich Indenter Hardness Test" and "Berkovich Hardness Test" are used interchangeably to refer to a test for measuring the hardness of a material on a surface thereof by indenting the surface with a diamond Berkovich indenter. The Berkovich Indenter Hardness Test includes indenting the outermost surface (e.g., an exposed surface) of a single optical film structure or the outer optical film structure of a transparent article of the disclosure with the diamond Berkovich indenter to form an indent to an indentation depth in the range from about 50 nm to about 1000 nm (or the entire thickness of the outer or inner optical film structure, whichever is less) and measuring the maximum hardness from this indentation along the entire indentation depth range or a segment of this indentation depth (e.g., in the range from about 100 nm to about 600 nm), generally using the methods set forth in Oliver, W. C.; Pharr, G. M. An improved technique for determining hardness and elastic modulus using load and displacement sensing indentation experiments. *J. Mater. Res.*, Vol. 7, No. 6, 1992, 1564-1583; and Oliver, W. C.; Pharr, G. M. Measurement of Hardness and Elastic Modulus by Instrument Indentation: Advances in Understanding and Refinements to Methodology. *J. Mater. Res.*, Vol. 19, No. 1, 2004, 3-20. As used herein, each of "hardness" and "maximum hardness" interchangeably refers to a maximum hardness as measured along a range of indentation depths, and not an average hardness.

As used herein, the "Vickers Indentation Damage Test" is conducted to measure the damage resistance of the transparent articles of the disclosure employing glass-ceramic substrates and conventional transparent articles. The test is performed using a Vickers indenter with quasi-static loads of 100 g and 1000 g. According to the Test, a series of indentation tests are carried out using a Vickers indenter tip, which is in the form of a pyramid with a square base and an angle of 136 degrees between opposite faces. After indentation and unloading of the indenter, optical microscopy is conducted according to the Test to generate images of the indented surfaces, and these images are accompanied by cross-sectional images obtained through focus ion beam scanning electron microscopy (FIB-SEM). Further, these images are evaluated to assess damage by measuring and quantifying the size of the observed damage zone. In particular, the size of the damage zone from the Vickers Test can be determined at one or both of the loads, 100 g and 1000 g, by measuring the average largest linear dimension of the damage zone (e.g., in units of $\mu m$) and/or the lateral crack area of the damage zone (e.g., in units of $\mu m^2$).

As used herein, the "Ramped Load Scratch Test" is conducted to measure the scratch resistance of the transparent articles of the disclosure employing glass-ceramic substrates and conventional transparent articles. The test is performed using a conical diamond indenter tip having a 90° cone with a 3.6 mm radius tip, a scratch having a length of 500 $\mu m$, a scratch velocity of 50 $\mu m$/sec, and a load ramped from 0 mN to a peak load of 320 mN, 360 mN or 400 mN. After conducting the test, damage is assessed by measuring the lateral crack length from the center of the scratch path. A variant of the test can be conducted in which the peak load is capped in successive tests, and the load is recorded in which a lateral crack is first observed.

As used herein, the "Garnet Scratch Test" is conducted to measure the scratch resistance of the transparent articles of the disclosure employing glass-ceramic substrates and conventional transparent articles. The test is performed using a single pass with 150 grit garnet sandpaper, with a 4 kg applied load over a ~0.6×0.6 cm contact area. After this scratch event, the level of scratching is quantified by the measurement of diffusely reflected light in the scratched region using an SCE measurement using a Konica-Minolta CM700D with a 6 mm diameter aperture.

As used herein, the term "ring-on-ring Test" or "ROR Test" refers to a test employed to determine the failure strength or stress (in units of MPa) of transparent articles of the disclosure, along with comparative articles. Each ROR Test was conducted with a test arrangement using loading and supporting rings made of high-strength steel having diameters of 12.7 mm and 25.4 mm, respectively. In addition, the load bearing surfaces of the loading and supporting rings are machined to a radius of about 0.0625 inches to minimize stress concentrations in the contact region between the rings and the transparent articles. Further, the loading ring is placed on the outermost primary surface of the transparent article (e.g., on the outer surface of its optical film structure) and the supporting ring is placed on the innermost primary surface of the transparent article (e.g., on the second primary surface of its substrate). The loading ring incorporates a mechanism that enables articulation of the loading ring and that insures proper alignment and uniform loading of the test sample. In addition, each ROR Test was conducted by applying the loading ring against the transparent article at a loading rate of 1.2 mm/min. The term "average" in the context of an ROR test is based on the mathematical average of failure stress measurements made on five (5) samples. Further, unless stated otherwise in specific instances of the disclosure, all failure stress values and measurements described herein refer to measurements from the ROR testing, which places the outer surface of the article in tension, as described in International Publication No. WO2018/125676, published on Jul. 5, 2018, entitled "Coated Articles with Optical Coatings Having Residual Compressive Stress," and incorporated herein by reference in its entirety. A failure in each ROR Test typically occurs on the side of the sample opposite the loading ring, which is in tension, and finite element modeling is used to provide an appropriate conversion from failure load to failure stress at the location of the failure. It also understood that other failure strength tests can be employed to determine the failure strengths of the transparent articles of the disclosure, with an appropriate correlation made to the ROR values and results reported herein in this disclosure based on differences in test conditions, test specimen geometry, and other technical considerations understood by those with ordinary skill in the field. Nevertheless, unless otherwise noted, all average failure strength values reported for the transparent articles of the disclosure, along with comparative articles, are given as measured from an ROR Test.

As used herein, the term "transmittance" is defined as the percentage of incident optical power within a given wavelength range transmitted through a material (e.g., the article, the substrate or the optical film or portions thereof). The term "reflectance" is similarly defined as the percentage of incident optical power within a given wavelength range that is reflected from a material (e.g., the article, the substrate, or the optical film or portions thereof). Transmittance and reflectance are measured using a specific linewidth. As used herein, an "average transmittance" refers to the average amount of incident optical power transmitted through a material over a defined wavelength regime. As used herein, an "average reflectance" refers to the average amount of incident optical power reflected by the material.

As used herein, "photopic reflectance" mimics the response of the human eye by weighting the reflectance or transmittance, respectively, versus wavelength spectrum according to the human eye's sensitivity. Photopic reflectance may also be defined as the luminance, or tristimulus Y value of reflected light, according to known conventions such as CIE color space conventions. The "average photopic reflectance", as used herein, for a wavelength range from 380 nm to 720 nm is defined in the below equation as the spectral reflectance, $R(\lambda)$ multiplied by the illuminant spectrum, $I(\lambda)$ and the CIE's color matching function $\bar{y}(\lambda)$, related to the eye's spectral response:

$$\langle R_p \rangle = \int_{380\,nm}^{720\,nm} R(\lambda) \times I(\lambda) \times \bar{y}(\lambda) d\lambda$$

In addition, "average reflectance" can be determined over the visible spectrum, or over other wavelength ranges, according to measurement principles understood by those skilled in the field of the disclosure, e.g., in the infrared spectrum from 840 nm to 950 nm, etc. Unless otherwise noted, all reflectance values reported or otherwise referenced in this disclosure are associated with testing through both primary surfaces of the substrate and optical film structure(s) of the transparent articles of the disclosure, e.g., a "two-surface" average photopic reflectance. In cases where "one-surface" or "first-surface" reflectance is specified, the reflectance from the rear surface of the article is eliminated through optical bonding to a light absorber, allowing the reflectance of only the first surface to be measured.

The usability of a transparent article in an electronic device (e.g., as a protective cover) can be related to the total amount of reflectance in the article. Photopic reflectance is particularly important for display devices that employ visible light. Lower reflectance in a cover transparent article over a lens and/or a display associated with the device can reduce multiple-bounce reflections in the device that can generate 'ghost images'. Thus, reflectance has an important relationship to image quality associated with the device, particularly its display and any of its other optical components (e.g., a lens of a camera). Low-reflectance displays also enable better display readability, reduced eye strain, and faster user response time (e.g., in an automotive display, where display readability can also correlate to driver safety). Low-reflectance displays can also allow for reduced display energy consumption and increased device battery life, since the display brightness can be reduced for low-reflectance displays compared to standard displays, while still maintaining the targeted level of display readability in bright ambient environments.

As used herein, "photopic transmittance" is defined in the below equation as the spectral transmittance, $T(\lambda)$ multiplied by the illuminant spectrum, $I(\lambda)$ and the CIE's color matching function $\bar{y}(\lambda)$, related to the eye's spectral response:

$$\langle T_p \rangle = \int_{380\,nm}^{720\,nm} T(\lambda) \times I(\lambda) \times \bar{y}(\lambda) d\lambda$$

In addition, "average transmittance" or "average photopic transmittance" can be determined over the visible spectrum or other wavelength ranges, according to measurement principles understood by those skilled in the field of the disclosure, e.g., in the infrared spectrum from 840 nm to 950 nm, etc. Unless otherwise noted, all transmittance values reported or otherwise referenced in this disclosure and claims are associated with testing through both primary surfaces of the substrate and the optical film structure (e.g., the glass-ceramic substrate 110, primary surfaces 112, 114, and optical film structure 120 as shown in FIGS. 1A-1D and described below) of the transparent articles, e.g., a "two-surface" average photopic transmittance.

As used herein, "transmitted color" and "reflected color" refer to the color transmitted or reflected through the transparent articles of the disclosure with regard to color in the CIE L*,a*,b* colorimetry system under a D65 illuminant. More specifically, the "transmitted color" and "reflected color" are given by $\sqrt{(a^{*2}+b^{*2})}$, as these color coordinates are measured through transmission or reflectance of a D65 illuminant through the primary surfaces of the substrate of the transparent article (e.g., the glass-ceramic substrate 110, primary surfaces 112, 114, and optical film structure 120 as shown in FIGS. 1A-1D and described below) over an incident angle range, e.g., from 0 degrees to 10 degrees.

Generally, the disclosure is directed to transparent articles that employ optical film structures over glass-ceramic substrates, including strengthened glass-ceramic substrates. Further, these transparent articles can include a high toughness, high modulus glass-ceramic substrate that is optically transparent, with a high-hardness optical coating having controlled transmittance and color. In view of this combination of substrate and optical film structure, the transparent article can exhibit a high hardness, scratch resistance, and damage tolerance, while also exhibiting transparency, high transmittance, low haze and low color. In addition, transparent articles of the disclosure can advantageously exhibit failure strength levels that are the same as, or substantially close to, the failure strength levels of their bare glass-ceramic substrates.

In some examples of these transparent articles, the toughness ($K_{IC}$) of the glass-ceramic substrate can be in the range of 1.15 MPa·$\sqrt{m}$ and the modulus of the substrate can be about 103 GPa. The glass-ceramic may comprise a nanostructured material having a mixed microstructure of lithium disilicate, petalite, and residual glass phases. The high toughness and modulus values of the substrate enable high flexural strength and breakage resistance of the combined optical structure and substrate system, which is important in light of the known reduction in flexural strength of glass substrates coated with high modulus coatings and optical film structures. In addition, the optical film structures of the disclosure can have a hardness of about 16 GPa or higher, imparting higher scratch and indentation damage resistance to the glass-ceramic substrate. The optical film structure may comprise a multilayer optical interference film composed of $SiO_2$, $SiO_xN_y$, and/or $Si_3N_4$ layers. The hard-coated article (e.g., the glass-ceramic substrate with an optical film structure disposed thereon) may have a total photopic average optical transmittance of greater than 80%, and article transmitted color $\sqrt{(a^{*2}+b^{*2})}$ of less than 2, or less than 1. In addition, embodiments of the disclosure are also directed to an electronic device that incorporates these transparent articles.

The transparent articles of the disclosure can be employed for protection and/or covers of displays, camera lenses, sensors and/or light source components within or otherwise part of electronic devices, along with protection of other components (e.g., buttons, speakers, microphones, etc.). These transparent articles with a protective function employ an optical film structure disposed on a glass-ceramic substrate such that the article exhibits a combination of high hardness, high damage resistance and desirable optical properties, including high photopic transmittance and low transmitted color. The optical film structure can include a scratch-resistant layer, at any of various locations within the structure. Further, the optical film structures of these articles can include a plurality of alternating high and low refractive index layers, with each high index layer and a scratch resistant layer comprising nitride or an oxynitride and each low index layer comprising an oxide.

With regard to mechanical properties, the transparent articles of the disclosure can exhibit a maximum hardness of 10 GPa or greater or 12 GPa or greater (or even greater than 14 GPa in some instances), as measured by a Berkovich Hardness Test over an indentation depth range from 100 nm to about 500 nm in the optical film structure. The glass-ceramic substrates employed in these articles can have an elastic modulus of greater than 85 GPa, or greater than 95 GPa in some instances. These substrates also can exhibit a fracture toughness of greater than 0.8 MPa·√m, or greater than 1 MPa·√m in some instances.

Transparent articles of the disclosure can also exhibit average failure stress levels of 700 MPa or greater, 750 MPa or greater, 800 MPa or greater, or even 850 MPa or greater, as measured in a ring-on-ring (ROR) test with the outer surface of the optical film structure of these articles placed in tension. Essentially, these article-level average failure stress levels are unexpectedly indicative of articles with optical film structures that have not experienced any loss, or have not experienced any substantial loss, in failure strength relative to the strength of their bare glass-ceramic substrates. Further, in some aspects of the disclosure, the transparent articles of the disclosure may experience some reduction in their failure strength as compared to the failure strength of their bare substrates, but the retained failure strength is above a preferred threshold for a particular end-use application.

As also outlined the disclosure, the foregoing, advantageous article-level failure stress levels can be achieved through the control of the composition, arrangement and/or processing of the optical film structures employed in the transparent articles. Notably, the composition, arrangement and/or processing of the optical film structures can be adjusted to obtain residual compressive stress levels of at least 700 MPa (e.g., from 700 to 1100 MPa) and an elastic modulus of at least 140 GPa (e.g., from 140 to 170 GPa, or from 140 to 180 GPa). These optical film structure mechanical properties unexpectedly correlate to average failure stress levels of 700 MPa or greater in the transparent articles employing these optical film structures, as measured in an ROR test with the outer surface of the optical film structure of the article placed in tension.

In terms of optical properties, the transparent articles of the disclosure can exhibit an average photopic transmittance of greater than 80%, greater than 90%, or even greater than 95%, as measured through the primary surfaces of the substrate at an incident angle from 0 to 10 degrees. In addition, the transparent articles can exhibit low transmitted color, $\sqrt{(a^{*2}+b^{*2})}$, of less than 4, less than 3, less than 2, or less than 1, in some instances, at incidence angles from 0 to 10 degrees, 0 to 20 degrees, 0 to 60 degrees, or all incidence angles from 0 to 90 degrees.

Referring to FIGS. 1A-1D, a transparent article 100 according to one or more embodiments may include a glass-ceramic substrate 110, and an optical film structure 120 defining an outer surface 120a and an inner surface 120b disposed on the substrate 110. The substrate 110 includes opposing primary surfaces 112, 114 and opposing secondary surfaces 116, 118. The optical film structure 120 is shown in FIGS. 1A-1D, with its inner surface 120b disposed on a first opposing primary surface 112 and no optical film structures are shown as being disposed on the second opposing primary surface 114. In some embodiments, however, one or more of the optical film structures 120 can be disposed on the second opposing primary surface 114 and/or on one or both of the opposing secondary surfaces 116, 118.

The optical film structure 120 includes at least one layer of material. As used herein, the term "layer" may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed therebetween. In one or more embodiments, a layer may include one or more contiguous and uninterrupted layers and/or one or more discontinuous and interrupted layers (i.e., a layer having different materials formed adjacent to one another). A layer or sub-layer may be formed by any known method in the art, including discrete deposition or continuous deposition processes. In one or more embodiments, the layer may be formed using only continuous deposition processes, or, alternatively, only discrete deposition processes.

In one or more embodiments, a single layer or multiple layers of the optical film structure 120 may be deposited onto the glass-ceramic substrate 110 by a vacuum deposition technique such as, for example, chemical vapor deposition (e.g., plasma enhanced chemical vapor deposition (PECVD), low-pressure chemical vapor deposition, atmospheric pressure chemical vapor deposition, and plasma-enhanced atmospheric pressure chemical vapor deposition), physical vapor deposition (e.g., reactive or nonreactive sputtering or laser ablation), thermal or e-beam evaporation and/or atomic layer deposition. Liquid-based methods may also be used such as spraying, dipping, spin coating, or slot coating (e.g., using sol-gel materials). Generally, vapor deposition techniques may include a variety of vacuum deposition methods which can be used to produce thin films. For example, physical vapor deposition uses a physical process (such as heating or sputtering) to produce a vapor of material, which is then deposited on the object which is coated. Preferred methods of fabricating the optical film structure 120 can include reactive sputtering, metal-mode reactive sputtering and PECVD processes.

The optical film structure 120 may have a thickness of from about 100 nm to about 10 microns. For example, the optical film structure 120 may have a thickness greater than or equal to about 200 nm, 300 nm, 325 nm, 350 nm, 375 nm, 400 nm, 500 nm, 600 nm, 700 nm, 800 nm, 900 nm, 1 micron, 2 microns, 3 microns, 4 microns, 5 microns, 6 microns, 7 microns, or even 8 microns, and less than or equal to about 10 microns.

In some embodiments, as depicted for example in FIGS. 1A, 1B and 1D, the optical film structure 120 is divided into an outer structure 130a and an inner structure 130b, with a scratch-resistant layer 150 (as detailed further below) disposed between the structures 130a and 130b. In these embodiments, the outer and inner optical film structures 130a and 130b may have the same thicknesses or different thicknesses, and each comprises one or more layers. In other embodiments, as shown in FIG. 1C, the optical film structure 120 includes an inner structure 130b and no outer structure comparable to an outer structure 130a (see FIGS. 1A and 1B).

Referring again to the transparent article 100 depicted in FIGS. 1A-1D, the optical film structure 120 includes one or more scratch-resistant layers 150. For example, the transparent article 100 depicted in FIGS. 1A-1D includes an optical film structure 120 with a scratch-resistant layer 150 disposed over a primary surface 112 of the glass-ceramic substrate 110. According to one embodiment, the scratch-resistant layer 150 may comprise one or more materials chosen from $Si_uAl_vO_xN_y$, $Ta_2O_5$, $Nb_2O_5$, AlN, $AlN_x$, $SiAl_xN_y$, $AlN_x/SiAl_xN_y$, $Si_3N_4$, $AlO_xN_y$, $SiO_xN_y$, $SiN_y$, $SiN_x$:$H_y$, $HfO_2$, $TiO_2$, $ZrO_2$, $Y_2O_3$, $Al_2O_3$, $MoO_3$, diamond-like carbon, or combinations thereof. Exemplary materials used in the scratch-resistant layer 150 may include an inorganic carbide, nitride, oxide, diamond-like material, or combinations thereof. Examples of suitable materials for the scratch-resistant layer 150 include metal oxides, metal nitrides, metal oxynitride, metal carbides, metal oxycarbides, and/or combinations thereof. Exemplary metals include B, Al, Si, Ti, V, Cr, Y, Zr, Nb, Mo, Sn, Hf, Ta and W. Specific examples of materials that may be utilized in the scratch-resistant layer 150 may include $Al_2O_3$, AlN, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$, and combinations thereof. In some implementations, the scratch-resistant layer 150 may include $Si_3N_4$, $SiN_y$, $SiO_xN_y$, and combinations thereof. In embodiments, each of the scratch-resistant layers 150 employed in the transparent article 100 exhibits a fracture toughness value greater than about 1 MPa√m and simultaneously exhibits a hardness value greater than about 10 GPa, as measured by a Berkovich Hardness Test.

Each of the scratch-resistant layers 150, as shown in exemplary form in the transparent article 100 depicted in FIGS. 1A-1D, may be relatively thick as compared with other layers (e.g., low RI layers 130A, high RI layers 130B, capping layer 131, etc.) such as greater than or equal to about 50 nm, 75 nm, 100 nm, 150 nm, 200 nm, 250 nm, 300 nm, 325 nm, 350 nm, 375 nm, 400 nm, 425 nm, 450 nm, 475 nm, 500 nm, 525 nm, 550 nm, 575 nm, 600 nm, 700 nm, 800 nm, 900 nm, 1 micron, 2 microns, 3 microns, 4 microns, 5 microns, 6 microns, 7 microns, or even 8 microns. For example, a scratch-resistant layer 150 may have a thickness from about 50 nm to about 10 microns, from about 100 nm to about 10 microns, from about 150 nm to about 10 microns, from about 500 nm to 7500 nm, from about 500 nm to about 6000 nm, from about 500 nm to about 5000 nm, and all thickness levels and ranges between the foregoing ranges. In other implementations, the scratch resistant layer 150 may have a thickness from about 100 nm to about 10,000 nm, from about 1000 nm to about 3000 nm, or from about 1500 nm to about 2500 nm.

As shown in FIGS. 1A-1D, and outlined above, the transparent articles 100 of the disclosure include an optical film structure 120 with one or more of an outer structure 130a and inner structure 130b. Each of the outer and inner structures 130a, 130b includes a plurality of alternating low and high refractive index (RI) layers, 130A and 130B, respectively. According to embodiments, each of the outer and inner structures 130a and 130b includes a period 132 of two or more layers, such as the low RI layer 130A and high RI layer 130B, or a low RI layer 130A, high RI layer 130B and a low RI layer 130A. Further, each of the outer and inner structures 130a and 130b of the optical film structure 120 may include a plurality of periods 132, such as 1 to 30 periods, 1 to 25 periods, 1 to 20 periods, and all periods within the foregoing ranges. In addition, the number of periods 132, the number of layers of the outer and inner structures 130a and 130b, and/or the number of layers within a given period 132 can differ or they may be the same. Further, in some implementations, the total amount of the plurality of alternating low RI and high RI layers 130A and 130B and the scratch resistant layer 150 may range from 6 to 50 layers, 6 to 40 layers, 6 to 30 layers, 6 to 28 layers, 6 to 26 layers, 6 to 24 layers, 6 to 22 layer, 6 to 20 layers, 6 to 18 layers, 6 to 16 layers, and 6 to 14 layers, and all ranges of layers and amounts of layers between the foregoing values.

As an example, in FIGS. 1A-1D the period 132 of the outer or inner structures 130a, 130b may include a low RI layer 130A and a high RI layer 130B. When a plurality of periods is included in either or both of the outer and inner structures 130a and 130b, the low RI layers 130A (designated as "L") and the high RI layers 130B (designated as "H") can alternate in the following sequence of layers: L/H/L/H . . . or H/L/H/L . . . , such that the low RI layers 130A and the high RI layers 130B alternate along the physical thickness of the outer and inner structures 130a, 130b of the optical film structure 120.

In an implementation of the transparent article 100, as shown in FIG. 1A, the number of periods 132 of the outer and inner structures 130a and 130b can be configured such that the outer structure 130a includes at least four (4) layers (e.g., alternating low and high RI layers 130A and 130B) and the inner structure 130b includes at least seven (7) layers (e.g., two periods 132 of alternating low RI and high RI layers 130A, 130B, and an additional period 132 of three (3) layers, alternating low RI/high RI/low RI layers 130A, 130B). Further, in this implementation, the optical film structure 120 includes a capping layer 131 (similar in structure and thickness to a low RI layer 130A) over the outer structure 130a; and a scratch-resistant layer 150 between the outer and inner structures 130a and 130b.

Figure 1B:
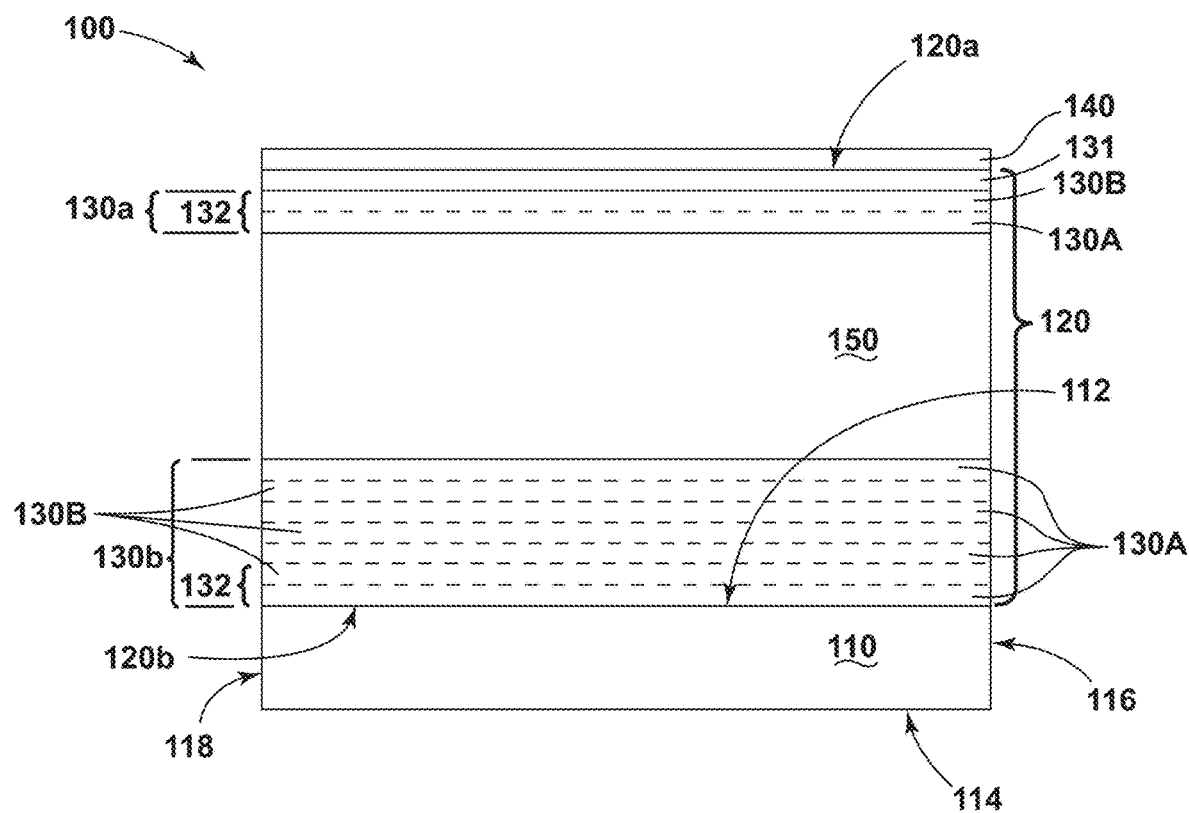
FIG. 1B is a cross-sectional side view of a transparent glass-ceramic article, according to an embodiment of the disclosure.
Figure 1C:
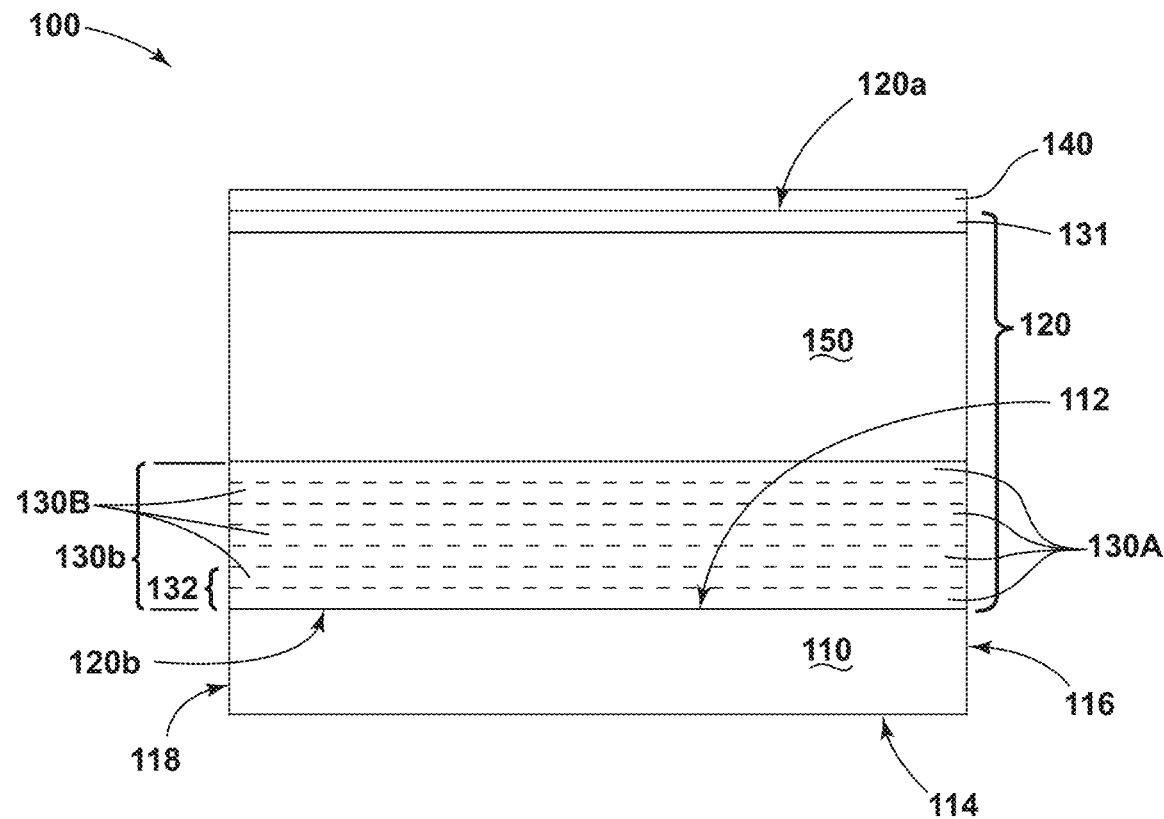
FIG. 1C is a cross-sectional side view of a transparent glass-ceramic article, according to an embodiment of the disclosure.

In an implementation of the transparent article 100, as shown in FIG. 1B, the number of periods 132 of the outer and inner structures 130a and 130b can be configured such that the outer structure 130a includes at least two (2) layers (e.g., an alternating low and high RI layer 130A and 130B) and the inner structure 130b includes at least seven (7) layers (e.g., two periods 132 of alternating low RI and high RI layers 130A, 130B, and an additional period 132 of three (3) layers, alternating low RI/high RI/low RI layers 130A, 130B). Also, in this implementation, the optical film structure 120 includes a capping layer 131 (similar in structure and thickness to a low RI layer 130A) over the outer structure 130a; and a scratch-resistant layer 150 between the outer and inner structures 130a and 130b.

According to another implementation of the transparent article 100, as shown in FIG. 1C, the number of periods 132 of the inner structure 130b includes at least seven (7) layers (e.g., two periods 132 of alternating low RI and high RI layers 130A, 130B, and an additional period 132 of three layers, alternating low RI/high RI/low RI layers 130A, 130B). Further, in this implementation, the optical film structure 120 includes a capping layer 131 (similar in structure and thickness to a low RI layer 130A) over the scratch-resistant layer 150, and the scratch-resistant layer 150 is over the inner structure 130b.

Figure 1D:
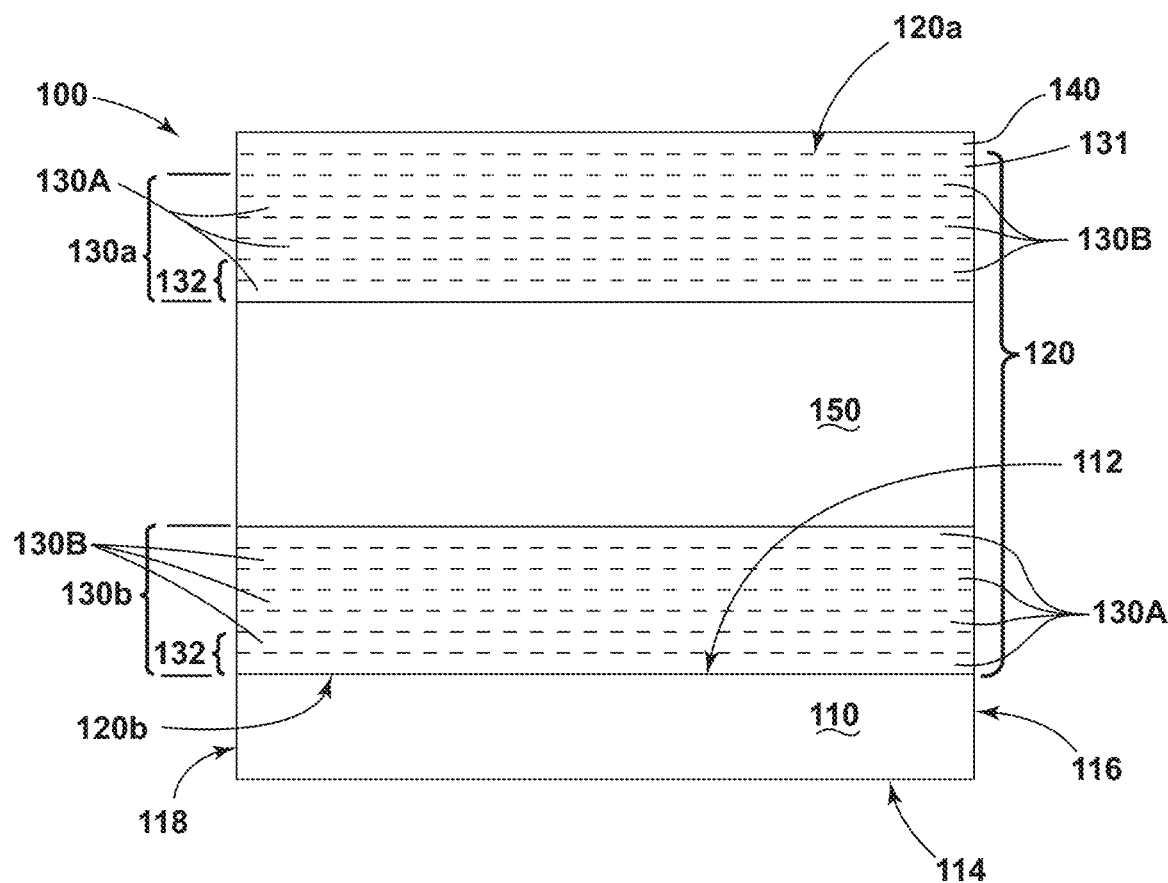
FIG. 1D is a cross-sectional side view of a transparent glass-ceramic article, according to an embodiment of the disclosure.

According to a further implementation of the transparent article 100, as shown in FIG. 1D, the number of periods 132 of the outer and inner structures 130a and 130b can be configured such that the outer structure 130a includes at least six (6) layers (e.g., alternating low and high RI layers 130A and 130B) and the inner structure 130b includes at least seven (7) layers (e.g., two periods 132 of alternating low RI and high RI layers 130A, 130B, and an additional period 132 of three (3) layers, alternating low RI/high RI/low RI layers 130A, 130B). Further, in this implementation, the optical film structure 120 includes a capping layer 131 (similar in structure and thickness to a low RI layer 130A) over the outer structure 130a; and a scratch-resistant layer 150 between the outer and inner structures 130a and 130b.

According to some embodiments of the transparent article 100 depicted in FIGS. 1A-1D, the outermost capping layer 131 of the optical film structure 120 may not be exposed but instead have a top coating 140 disposed thereon. In some implementations of the transparent article 100, each high RI layer 130B of the optical film structure 120, along with the outer and inner structures 130a, 130b, comprises a nitride, a silicon-containing nitride (e.g., $SiN_y$, $Si_3N_4$), an oxynitride, or a silicon-containing oxynitride (e.g., $SiAl_xO_yN_z$ or $SiO_xN_y$). Further, according to some embodiments, each low RI layer 130A of the optical film structure 120, along with the outer and inner structures 130a, 130b, comprises an oxide or a silicon-containing oxide (e.g., $SiO_2$, $SiO_x$ or $SiO_2$ as doped with Al, N or F).

In one or more embodiments of the transparent article 100 depicted in FIGS. 1A-1D, the term "low RI", when used with the low RI layers 130A and/or capping layer 131, includes a refractive index range from about 1.3 to about 1.7 or 1.75. In one or more embodiments, the term "high RI", when used with the high RI layers 130B and/or scratch-resistant layer 150, includes a refractive index range from about 1.7 to about 2.5 (e.g., about 1.85 or greater). In one or more embodiments, the term "medium RI", when used with an optional third layer of a period 132, includes a refractive index range from about 1.55 to about 1.8. In some embodiments, the ranges for low RI, high RI, and/or medium RI may overlap; however, in most instances, the layers of each of the outer and inner structures 130a and 130b of the optical film structure 120 have the general relationship regarding RI of: low RI<medium RI<high RI (where "medium RI" is applicable in the case of a three layer period). In one or more embodiments, the difference in the refractive index of each of the low RI layers 130A (and/or capping layer 131) and the high RI layers 130B (and/or scratch-resistant layer 150) may be about 0.01 or greater, about 0.05 or greater, about 0.1 or greater, or even about 0.2 or greater.

Example materials suitable for use in the outer and inner structures 130a and 130b of the optical film structure 120 of the transparent article 100 depicted in FIGS. 1A-1D include, without limitation, $SiO_2$, $SiO_x$, $Al_2O_3$, $SiAl_xO_y$, $GeO_2$, SiO, $AlO_xN_y$, AlN, $AlN_x$, $SiAl_xN_y$, $SiN_x$, $SiO_xN_y$, $SiAl_xO_yN_z$, $Ta_2O_5$, $Nb_2O_5$, $TiO_2$, $ZrO_2$, TiN, MgO, $MgF_2$, $BaF_2$, $CaF_2$, $SnO_2$, $HfO_2$, $Y_2O_3$, $MoO_3$, $DyF_3$, $YbF_3$, $YF_3$, $CeF_3$, diamond-like carbon and combinations thereof. Some examples of suitable materials for use in a low RI layer 130A include, without limitation, $SiO_2$, $SiO_x$, $Al_2O_3$, $SiAl_xO_y$, $GeO_2$, SiO, $AlO_xN_y$, $SiO_xN_y$, $SiAl_xO_yN_z$, MgO, $MgAl_xO_y$, $MgF_2$, $BaF_2$, $CaF_2$, $DyF_3$, $YbF_3$, $YF_3$, and $CeF_3$. In some implementations of the transparent article 100, each of its low RI layers 130A includes a silicon-containing oxide (e.g., $SiO_2$ or $SiO_x$). The nitrogen content of the materials for use in a low RI layer 130A may be minimized (e.g., in materials such as $Al_2O_3$ and $MgAl_xO_y$). Some examples of suitable materials for use in a high RI layer 130B include, without limitation, $SiAl_xO_yN_z$, $Ta_2O_5$, $Nb_2O_5$, AlN, $AlN_x$, $SiAl_xN_y$, $AlN_x/SiAl_xN_y$, $Si_3N_4$, $AlO_xN_y$, $SiO_xN_y$, $SiN_y$, $SiN_x$:$H_y$, $HfO_2$, $TiO_2$, $ZrO_2$, $Y_2O_3$, $Al_2O_3$, $MoO_3$, and diamond-like carbon.

According to some implementations, each high RI layer 130B of the outer and inner structure 130a, 130b includes a silicon-containing nitride or a silicon-containing oxynitride (e.g., $Si_3N_4$, $SiN_y$, or $SiO_xN_y$). In one or more embodiments, each of the high RI layers 130B may have high hardness (e.g., hardness of greater than 8 GPa), and the high RI materials listed above may comprise high hardness and/or scratch resistance.

The oxygen content of the materials for the high RI layer 130B may be minimized, especially in $SiN_x$ materials. Further, exemplary $SiO_xN_y$ high RI materials may comprise from about 0 atom % to about 20 atom % oxygen, or from about 5 atom % to about 15 atom % oxygen, while including 30 atom % to about 50 atom % nitrogen. The foregoing materials may be hydrogenated up to about 30% by weight. Where a material having a medium refractive index is desired as a medium RI layer, some embodiments may utilize AlN and/or $SiO_xN_y$. It should be understood that a scratch-resistant layer 150 may comprise any of the materials disclosed as suitable for use in a high RI layer 130B.

In one or more embodiments of the transparent article 100, the optical film structure 120 includes a scratch-resistant layer 150 that can be integrated as a high RI layer 130B, and one or more low RI layers 130A, high RI layers 130B, and/or a capping layer 131 may be positioned over the scratch-resistant layer 150. Also, with regard to the scratch-resistant layer 150, as shown in FIGS. 1A-1D, an optional top coating 140 may also be positioned over the layer 150. The scratch-resistant layer 150 may be alternately defined as the thickest high RI layer 130B in the overall optical film structure 120 and/or in the outer and the inner structures 130a, 130b. Without being bound by theory, it is believed that the transparent article 100 may exhibit increased hardness at indentation depths when a relatively thin amount of material is deposited over the scratch-resistant layer 150. However, the inclusion of low RI and high RI layers 130A, 130B over the scratch-resistant layer 150 may enhance the optical properties of the transparent article 100. In some embodiments, relatively few layers (e.g., only 1, 2, 3, 4, or 5 layers) may be positioned over the scratch-resistant layer 150 and these layers may each be relatively thin (e.g., less than 100 nm, less than 75 nm, less than 50 nm, or even less than 25 nm).

In one or more embodiments, the transparent article 100 depicted in FIGS. 1A-1D may include one or more additional top coatings 140 disposed on the outer structure 130a of the optical film structure 120. In one or more embodiments, the additional top coating 140 may include an easy-to-clean coating. An example of a suitable easy-to-clean coating is described in U.S. Patent Application Publication No. 2014/0113083, published on Apr. 24, 2014, entitled "Process for Making of Glass Articles with Optical and Easy-to-Clean Coatings", which is incorporated herein in its entirety by reference. The easy-to-clean coating may have a thickness in the range from about 5 nm to about 50 nm and may include known materials such as fluorinated silanes. The easy-to-clean coating may alternately or additionally comprise a low-friction coating or surface treatment. Exemplary low-friction coating materials may include diamond-like carbon, silanes (e.g., fluorosilanes), phosphonates, alkenes, and alkynes. In some embodiments, the easy-to-clean coating of the top coating 140 may have a thickness in the range from about 1 nm to about 40 nm, from about 1 nm to about 30 nm, from about 1 nm to about 25 nm, from about 1 nm to about 20 nm, from about 1 nm to about 15 nm, from about 1 nm to about 10 nm, from about 5 nm to about 50 nm, from about 10 nm to about 50 nm, from about 15 nm to about 50 nm, from about 7 nm to about 20 nm, from about 7 nm to about 15 nm, from about 7 nm to about 12 nm, from about 7 nm to about 10 nm, from about 1 nm to about 90 nm, from about 5 nm to about 90 nm, from about 10 nm to about 90 nm, or from about 5 nm to about 100 nm, and all ranges and sub-ranges therebetween.

The top coating 140 may include a scratch-resistant layer or layers which comprise any of the materials disclosed as being suitable for use in the scratch-resistant layer 150. In some embodiments, the additional top coating 140 includes a combination of easy-to-clean material and scratch-resistant material. In one example, the combination includes an easy-to-clean material and diamond-like carbon. Such an additional top coating 140 may have a thickness in the range from about 5 nm to about 20 nm. The constituents of the additional coating 140 may be provided in separate layers. For example, the diamond-like carbon may be disposed as a first layer and the easy-to clean material can be disposed as a second layer on the first layer of diamond-like carbon. The thicknesses of the first layer and the second layer may be in the ranges provided above for the additional coating. For example, the first layer of diamond-like carbon may have a thickness of about 1 nm to about 20 nm or from about 4 nm to about 15 nm (or more specifically about 10 nm) and the second layer of easy-to-clean material may have a thickness of about 1 nm to about 10 nm (or more specifically about 6 nm). The diamond-like coating may include tetrahedral amorphous carbon (Ta—C), Ta—C:H, and/or a —C—H.

According to embodiments of the transparent article 100 depicted in FIGS. 1A-1D, each of the high RI layers 130B of the outer and inner structures 130a, 130b of the optical film structure 120 can have a physical thickness that ranges from about 5 nm to 2000 nm, about 5 nm to 1500 nm, about 5 nm to 1000 nm, and all thicknesses and ranges of thickness between these values. For example, these high RI layers 130B can have a physical thickness of 5 nm, 10 nm, 20 nm, 30 nm, 40 nm, 50 nm, 60 nm, 70 nm, 80 nm, 90 nm, 100 nm, 250 nm, 500 nm, 750 nm, 1000 nm, 1250 nm, 1500 nm, 1750 nm, 2000 nm and all thickness values between these levels. Further, each of the high RI layers 130B of the inner structure 130b can have a physical thickness that ranges from about 5 nm to 500 nm, about 5 nm to 400 nm, about 5 nm to 300 nm, and all thicknesses and ranges of thickness between these values. As an example, each of these high RI layers 130B can have a physical thickness of 5 nm, 10 nm, 20 nm, 30 nm, 40 nm, 50 nm, 60 nm, 70 nm, 80 nm, 90 nm, 100 nm, 200 nm, 300 nm, 400 nm, 500 nm, and all thickness values between these levels. In addition, according to some embodiments of the transparent article 100 depicted in FIGS. 1A-1D, each of the low RI layers 130A of the outer and inner structures 130a, 130b can have a physical thickness from about 5 nm to 300 nm, about 5 nm to 250 nm, about 5 nm to 200 nm, and all thicknesses and ranges of thickness between these values. For example, each of these low RI layers 130A can have a physical thickness of 5 nm, 10 nm, 20 nm, 30 nm, 40 nm, 50 nm, 60 nm, 70 nm, 80 nm, 90 nm, 100 nm, 150 nm, 200 nm, 250 nm, 300 nm, and all thickness values between these levels.

In one or more embodiments, at least one of the layers (such as a low RI layer 130A or a high RI layer 130B) of the outer and inner structures 130a, 130b of the optical film structure 120 may include a specific optical thickness (or optical thickness range). As used herein, the term "optical thickness" refers to the product of the physical thickness and the refractive index of a layer. In one or more embodiments, at least one of the layers of the outer and inner structures 130a, 130b may have an optical thickness in the range from about 2 nm to about 200 nm, from about 10 nm to about 100 nm, from about 15 nm to about 100 nm, from about 15 nm to about 500 nm, or from about 15 nm to about 5000 nm. In some embodiments, all of the layers in the outer and inner structures 130a, 130b may each have an optical thickness in the range from about 2 nm to about 200 nm, from about 10 nm to about 100 nm, from about 15 nm to about 100 nm, from about 15 nm to about 500 nm, or from about 15 nm to about 5000 nm. In some embodiments, at least one layer of either or both of the outer and inner structures 130a, 130b has an optical thickness of about 50 nm or greater. In some embodiments, each of the low RI layers 130A have an optical thickness in the range from about 2 nm to about 200 nm, from about 10 nm to about 100 nm, from about 15 nm to about 100 nm, from about 15 nm to about 500 nm, or from about 15 nm to about 5000 nm. In some embodiments, each of the high RI layers 130B have an optical thickness in the range from about 2 nm to about 200 nm, from about 10 nm to about 100 nm, from about 15 nm to about 100 nm, from about 15 nm to about 500 nm, or from about 15 nm to about 5000 nm. In embodiments with a three layer period 132, each of the medium RI layers have an optical thickness in the range from about 2 nm to about 200 nm, from about 10 nm to about 100 nm, from about 15 nm to about 100 nm, from about 15 nm to about 500 nm, or from about 15 nm to about 5000 nm. In some embodiments, the scratch-resistant layer 150 is the thickest layer in the optical film structure 120, and/or has an index of refraction higher than that of any other layer in the film structure.

The glass-ceramic substrate 110 of the transparent article 100 depicted in FIGS. 1A-1D may include an inorganic material with amorphous and crystalline portions. The substrate 110 may be formed from man-made materials and/or naturally occurring materials (e.g., quartz). In some specific embodiments, the glass-ceramic substrate 110 may specifically exclude polymeric, plastic and/or metal substrates. The glass-ceramic substrate 110 may be characterized as an alkali-including substrate (i.e., the substrate includes one or more alkalis). In one or more embodiments, the glass-ceramic substrate 110 exhibits a refractive index in the range from about 1.5 to about 1.6. In specific embodiments, the glass-ceramic substrate 110 may exhibit an average strain-to-failure at a surface on one or more opposing major surfaces that is 0.5% or greater, 0.6% or greater, 0.7% or greater, 0.8% or greater, 0.9% or greater, 1% or greater, 1.1% or greater, 1.2% or greater, 1.3% or greater, 1.4% or greater, 1.5% or greater or even 2% or greater, as measured using an ROR test using at least 5, at least 10, at least 15, or at least 20 samples to determine the average strain-to-failure value. In specific embodiments, the glass-ceramic substrate 110 may exhibit an average strain-to-failure at its surface on one or more opposing major surfaces of about 1.2%, about 1.4%, about 1.6%, about 1.8%, about 2.2%, about 2.4%, about 2.6%, about 2.8%, or about 3% or greater.

The term "strain-to-failure" refers to the strain at which cracks propagate in the outer or inner structures 130a, 130b of the optical film structure 120, glass-ceramic substrate 110, or both simultaneously without application of additional load, typically leading to catastrophic failure in a given material, layer or film and perhaps even bridge to another material, layer, or film, as defined herein. That is, breakage of the optical film structure 120 (i.e., as including outer and/or inner structures 130a, 130b) without breakage of the glass-ceramic substrate 110 constitutes failure, and breakage of the substrate 110 also constitutes failure. The term "average" when used in connection with average strain-to-failure or any other property is based on the mathematical average of measurements of such property on 5 samples. Typically, crack onset strain measurements are repeatable under normal laboratory conditions, and the standard deviation of crack onset strain measured in multiple samples may be as little as 0.01% of observed strain. Average strain-to-failure as used herein was measured using Ring-on-Ring Tensile Testing. However, unless stated otherwise, strain-to-failure measurements described herein refer to measurements from the ring-on-ring testing, as described in International Publication No. WO2018/125676, published on Jul. 5, 2018, entitled "Coated Articles with Optical Coatings Having Residual Compressive Stress," and incorporated herein by reference in its entirety.

Suitable glass-ceramic substrates 110 may exhibit an elastic modulus (or Young's modulus) in the range from about 60 GPa to about 130 GPa. In some instances, the elastic modulus of the substrate 110 may be in the range from about 70 GPa to about 120 GPa, from about 80 GPa to about 110 GPa, from about 80 GPa to about 100 GPa, from about 80 GPa to about 90 GPa, from about 85 GPa to about 110 GPa, from about 85 GPa to about 105 GPa, from about 85 GPa to about 100 GPa, from about 85 GPa to about 95 GPa, and all ranges and sub-ranges therebetween (e.g., ~103 GPa). In some implementations, the elastic modulus of the substrate 110 may be greater than 85 GPa, greater than 90 GPa, greater than 95 GPa, or even greater than 100 GPa. In some examples, Young's modulus may be measured by sonic resonance (ASTM E1875), resonant ultrasound spectroscopy, or nanoindentation using Berkovich indenters. Further, suitable glass-ceramic substrates 110 may exhibit a shear modulus in the range from about 20 GPa to about 60 GPa, from about 25 GPa to about 55 GPa, from about 30 GPa to about 50 GPa, from about 35 GPa to about 50 GPa, and shear modulus ranges and sub-ranges therebetween (e.g., ~43 GPa). In some implementations, the glass-ceramic substrate 110 may have a shear modulus of greater than 35 GPa, or even greater than 40 GPa. Further, the glass-ceramic substrates 110 can exhibit a fracture toughness of greater than 0.8 MPa·√m, greater than 0.9 MPa·√m, greater than 1 MPa·√m, or even greater than 1.1 MPa·√m in some instances (e.g., ~1.15 MPa·√m).

In one or more embodiments, the glass-ceramic substrate 110 includes one or more glass-ceramic materials and may be strengthened or non-strengthened. In one or more embodiments, the glass-ceramic substrates 110 may comprise one or more crystalline phases such as lithium disilicate, lithium metasilicate, petalite, beta quartz, and/or beta spodumene, as potentially combined with residual glass in the structure. In an embodiment, the glass-ceramic substrate 110 comprises a disilicate phase. In another implementation, the glass-ceramic substrate 110 comprises a disilicate phase and a petalite phase. According to an embodiment, the glass-ceramic substrate 110 has a crystallinity of at least 40% by weight. In some implementations, the glass-ceramic substrate 110 has a crystallinity of at least about 40%, 45%, 50%, 55%, 60%, 65%, 70%, 75%, 80%, 85%, or greater (by weight), with the residual as a glass phase. Further, according to some embodiments, each of the crystalline phases of the glass-ceramic substrate 110 has an average crystallite size of less than 100 nm, less than 75 nm, less than 50 nm, less than 40 nm, less than 30 nm, and all crystallite sizes within or less than these levels. According to one exemplary embodiment, the glass-ceramic substrate 110 comprises lithium disilicate and petalite phases with 40 wt. % lithium disilicate, 45 wt. % petalite, and the remainder as residual glass (i.e., ~85% crystalline, ~15% residual amorphous/glass); each crystalline phase having a majority of crystals with an average crystallite size in the range of 10 nm to 50 nm.

Embodiments of the glass-ceramic substrate 110 employed in the transparent article 100 of the disclosure (see, e.g., FIGS. 1A-1D) can exhibit a refractive index that is higher than refractive indices of conventional glass substrates or strengthened glass substrates. For example, the refractive index of the glass-ceramic substrates 110 can range from about 1.52 to 1.65, from about 1.52 to 1.64, from about 1.52 to 1.62, or from about 1.52 to 1.60, and all refractive indices within the foregoing ranges (e.g., as measured at a visible wavelength of 589 nm). As such, conventional optical coatings, which are typically optimized for glass substrates and their refractive index ranges, are not necessarily suitable for use with the glass-ceramic substrates 110 of the transparent articles 100 of the disclosure. In particular, the layers of the optical film structure 120 between the substrate 110 and the scratch resistant layer 150 can be modified to achieve low reflectance and low color generated by the transition zone between the glass-ceramic substrate 110 and the scratch resistant layer 150. This layer re-design requirement can also be described as optical impedance matching between the glass-ceramic substrate 110 and the scratch resistant layer 150.

According to implementations, the glass-ceramic substrate 110 is substantially optically clear, transparent and free from light scattering. In such embodiments, the substrate 110 may exhibit an average light transmittance over the optical wavelength regime of about 80% or greater, about 81% or greater, about 82% or greater, about 83% or greater, about 84% or greater, about 85% or greater, about 86% or greater, about 87% or greater, about 88% or greater, about 89% or greater, about 90% or greater, about 91% or greater, about 92% or greater, about 93% or greater, or even about 94% or greater. In some embodiments, these light reflectance and transmittance values may be a total reflectance or total transmittance (taking into account reflectance or transmittance on both major surfaces of the glass-ceramic substrate 110) or may be observed on a single-side of the substrate 110 (i.e., on the primary surface 112 only, without taking into account the opposite surface 114). Unless otherwise specified, the average reflectance or transmittance of the substrate 110 alone is measured at an incident illumination angle of 0 degrees relative to the primary surface 112 (however, such measurements may be provided at incident illumination angles of 45 degrees or 60 degrees).

Additionally or alternatively, the physical thickness of the glass-ceramic substrate 110 may vary along one or more of its dimensions for aesthetic and/or functional reasons. For example, the edges of the substrate 110 may be thicker as compared to more central regions of the substrate 110. The length, width and physical thickness dimensions of the substrate 110 may also vary according to the application or use of the article 100.

The glass-ceramic substrate 110 may be provided using a variety of different processes. For instance, where the substrate 110 includes an amorphous portion or phase such as glass, various forming methods can include float glass processes and down-draw processes such as fusion draw and slot draw.

Once formed, a glass-ceramic substrate 110 may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

Where the glass-ceramic substrate 110 is chemically strengthened by an ion exchange process, the ions in the surface layer of the substrate 110 are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the glass-ceramic substrate 110 in a salt bath (or baths), use of multiple salt baths, additional steps such as annealing, washing, and the like, are generally determined by the composition of the substrate 110 and the desired compressive stress (CS), depth of compressive stress layer (or depth of layer) of the substrate 110 that result from the strengthening operation. By way of example, ion exchange of alkali metal-containing glass-ceramic substrates may be achieved by immersion in at least one molten bath containing a salt such as, but not limited to, nitrates, sulfates, and chlorides of the larger alkali metal ion. The temperature of the molten salt bath typically is in a range from about 380° C. up to about 530° C., while immersion times range from about 15 minutes up to about 40 hours. However, temperatures and immersion times different from those described above may also be used.

The degree of chemical strengthening achieved by ion exchange may be quantified based on the parameters of central tension (CT), surface CS, depth of compression (DOC) (i.e., the point in the substrate in which the stress state changes from compression to tension), and depth of layer of potassium ions (DOL). Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass-ceramic material. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. Refracted near-field (RNF) method or a scattered light polariscope (SCALP) technique may be used to measure the stress profile. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, issued Oct. 7, 2014, entitled "Systems and Methods for Measuring a Profile Characteristic of a Glass Sample", which is incorporated herein by reference in its entirety. In particular, the RNF method includes placing the glass-ceramic article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass-ceramic sample from the normalized detector signal. The maximum CT values are measured using a scattered light polariscope (SCALP) technique known in the art.

In one embodiment of the transparent article 100 (see FIGS. 1A-1D), a strengthened glass-ceramic substrate 110 can have a surface CS of 200 MPa or greater, 250 MPa or greater, 300 MPa or greater, or 350 MPa or greater. In another implementation, a strengthened glass-ceramic substrate can exhibit a surface compressive stress (CS) of from about 200 MPa to about 600 MPa, from about 200 MPa to about 500 MPa, from about 200 MPa to about 400 MPa, from about 225 MPa to about 400 MPa, from 250 MPa to about 400 MPa, and all CS sub-ranges and values in the foregoing ranges. The strengthened substrate 110 may have a DOL of from 1 µm to 5 µm, from 1 µm to 10 µm, or from 1 µm to 15 µm and/or a central tension (CT) of 50 MPa or greater, 75 MPa or greater, 100 MPa or greater, 125 MPa or greater (e.g., 80 MPa, 90 MPa, or 100 MPa or greater) but less than 250 MPa (e.g., 200 MPa or less, 175 MPa or less, 150 MPa or less, etc.). In such implementations of the transparent articles 100 with glass-ceramic substrates 110 having a CT from about 50 MPa to about 200 MPa or 80 MPa to about 200 MPa, the thickness of the glass-ceramic substrate 110 should be limited to about 0.6 mm or less to ensure that the substrate is not frangible. For implementations employing thicker substrates, e.g., with a thickness up to 0.8 mm, 0.9 mm, or even up to 1.0 mm, the upper limit of CT should be held to levels below 200 MPa to ensure that the substrate is not frangible (e.g., 150 MPa for a thickness of 0.8 mm).

The depth of compression (DOC) of the glass-ceramic substrate 110 may be from 0.1•(thickness (t) of the substrate) to about 0.25•t, for example from about 0.15•t to about 0.25•t, from about 0.15•t to about 0.25•t, or from about 0.15•t to about 0.20•t, and all DOC values between the foregoing ranges. For example, the glass-ceramic substrate 110 can have a DOC of 20% of the thickness of the substrate, as compared to 15% or less for ion-exchanged glass substrates. In embodiments, the depths of compression for the substrate materials can from ~8% to ~20% of the thickness of the substrate 110. Note that the foregoing DOC values are as measured from one of the primary surfaces 112 or 114 of the substrate 110. As such, for a substrate 110 with a thickness of 600 µm, the DOC may be 20% of the thickness of the substrate, ~120 µm from each of the primary surfaces 112, 114 of the substrate 110, or 240 µm in total for the entire substrate. In one or more specific embodiments, the strengthened glass-ceramic substrate 110 can exhibit one or more of the following mechanical properties: a surface CS of from about 200 MPa to about 400 MPa, a DOL of greater than 30 µm, a DOC of from about 0.08•t to about 0.25•t, and a CT from about 80 MPa to about 200 MPa.

According to embodiments of the disclosure, the glass-ceramic substrate 110 (without the optical film structure 120 disposed thereon for measurement purposes) can exhibit a maximum hardness of 8.5 GPa or greater, 9 GPa or greater, or 9.5 GPa or greater (or even greater than 10 GPa in some instances), as measured by a Berkovich Hardness Test over an indentation depth range from 100 nm to about 500 nm in the substrate 110. For example, the glass-ceramic substrate 110 can exhibit a maximum hardness of 8.5 GPa, 8.75 GPa, 9 GPa, 9.25 GPa, 9.5 GPa, 9.75 GPa, 10 GPa, and higher hardness levels, as measured by a Berkovich Hardness Test over an indentation depth range from 100 nm to about 500 nm in the substrate 110. Further, glass-ceramic substrates 110 of the disclosure can exhibit a Vicker's hardness of greater than 700, or even greater than 800, as measured using a 200 g load. In addition, glass-ceramic substrates 110 of the disclosure can exhibit a Mohs hardness of greater than 6.5, or even greater than 7.

As noted earlier, the glass-ceramic substrate 110 may be non-strengthened or strengthened, and with a suitable composition to support strengthening. Examples of suitable glass ceramics for the glass-ceramic substrate 110 may include a $Li_2O$—$Al_2O_3$—$SiO_2$ system (i.e., an LAS system) glass ceramics, $MgO$—$Al_2O$—$SiO_2$ system (i.e., an MAS System) glass ceramics, and/or glass ceramics that include a predominant crystal phase including β-quartz solid solution, β-spodumene ss, cordierite, and lithium disilicate. The glass ceramic substrates may be strengthened using the chemical strengthening processes disclosed herein. In one or more embodiments, MAS-System glass ceramic substrates may be strengthened in $Li_2SO_4$ molten salt, whereby an exchange of $2Li^+$ for $Mg^{2+}$ can occur.

According to some embodiments of the transparent article 100 of the disclosure, the glass-ceramic substrate 110 may be an LAS system with the following composition: 70-80% $SiO_2$, 5-10% $Al_2O_3$, 10-15% $Li_2O$, 0.01-1% $Na_2O$, 0.01-1% $K_2O$, 0.1-5% $P_2O_5$ and 0.1-7% $ZrO_2$ (in wt. %, oxide basis). In some implementations of the transparent article 100 of the disclosure, the glass-ceramic substrate 110 may be an LAS system with the following composition: 70-80% $SiO_2$, 5-10% $Al_2O_3$, 10-15% $Li_2O$, 0.01-1% $Na_2O$, 0.01-1% $K_2O$, 0.1-5% $P_2O_5$ and 0.1-5% $ZrO_2$ (in wt. %, oxide basis). According to another embodiment, the glass-ceramic substrate 110 may be an LAS system with the following composition: 70-75% $SiO_2$, 5-10% $Al_2O_3$, 10-15% $Li_2O$, 0.05-1% $Na_2O$, 0.1-1% $K_2O$, 1-5% $P_2O_5$, 2-7% $ZrO_2$ and 0.1-2% CaO (in wt. %, oxide basis). According to a further embodiment, the glass-ceramic substrate 110 can have the following composition: 71-72% $SiO_2$, 6-8% $Al_2O_3$, 10-13% $Li_2O$, 0.05-0.5% $Na_2O$, 0.1-0.5% $K_2O$, 1.5-4% $P_2O_5$, 4-7% $ZrO_2$ and 0.5-1.5% CaO (in wt. %, oxide basis). More generally, these compositions of the glass-ceramic substrate 110 are advantageous for the transparent articles 100 of the disclosure because they exhibit low haze levels, high transparency, high fracture toughness, and high elastic modulus, and are ion-exchangeable.

According to embodiments of the transparent article 100, the glass-ceramic substrates 110 are selected with any of the compositions of the disclosure and further processed to the crystallinity levels of the disclosure to exhibit a combination of high fracture toughness (e.g., greater than 1 MPa·√m) and high elastic modulus (e.g., greater than 100 GPa). These mechanical properties can be derived from the presence of the crystalline phase (e.g., the lithium disilicate phase), which exhibits a relatively high modulus; and the microstructure of the final glass-ceramic substrate 110, which includes some residual glass phase. Notably, the residual glass phase (and its alkali-containing composition) ensures that the glass-ceramic substrate 110 can be ion-exchange strengthened to a high level of central tension (CT) (e.g., greater than 80 MPa) and compressive stress (CS) (e.g., greater than 200 MPa). Further, the ceramming (i.e., the post-melt processing, heat treatment conditions) can be chosen to minimize the grain size of the glass-ceramic substrate 110 such that the grain size is smaller than the wavelength of visible light, thereby ensuring that the substrate 110 and article 100 is transparent or substantially transparent. Ultimately, the composition and processing of the glass-ceramic substrate 110 is advantageously selected to achieve a balance of high fracture toughness, high elastic modulus and optical transparency to ensure that the transparent article 100, as employing these substrates 110 and an optical film structure 120, exhibits this balance of mechanical and optical properties, along with a surprising level of damage resistance.

The glass-ceramic substrate 110 according to one or more embodiments can have a physical thickness ranging from about 100 μm to about 5 mm in various portions of the substrate 110. Example substrate 110 physical thicknesses range from about 100 μm to about 500 μm (e.g., 100, 200, 300, 400 or 500 μm), from about 500 μm to about 1000 μm (e.g., 500, 600, 700, 800, 900 or 1000 μm), and from about 500 μm to about 1500 μm (e.g., 500, 750, 1000, 1250, or 1500 μm), for example. In some implementations, the substrate 110 may have a physical thickness greater than about 1 mm (e.g., about 2, 3, 4, or 5 mm). In one or more specific embodiments, the substrate 110 may have a physical thickness of 2 mm or less, or less than 1 mm. The substrate 110 may be acid polished or otherwise treated to remove or reduce the effect of surface flaws.

With regard to the hardness of the transparent articles 100 depicted in FIGS. 1A-1D, typically, in nanoindentation measurement methods (such as by using a Berkovich indenter) where the coating is harder than the underlying substrate, the measured hardness may appear to increase initially due to development of the plastic zone at shallow indentation depths (e.g., less than 25 nm or less than 50 nm) and then increases and reaches a maximum value or plateau at deeper indentation depths (e.g., from 50 nm to about 500 nm or 1000 nm). Thereafter, hardness begins to decrease at even deeper indentation depths due to the effect of the underlying substrate. Where a glass-ceramic substrate 110 having a greater hardness compared to the optical film structure 120 is utilized, the same effect can be seen; however, the hardness increases at deeper indentation depths due to the effect of the underlying substrate.

With further regard to the transparent articles 100 depicted in FIGS. 1A-1D, the indentation depth range and the hardness values at certain indentation depth ranges can be selected to identify a particular hardness response of the optical film structure 120 and the layers of the outer and inner structures 130a, 130b thereof, described herein, without the effect of the underlying glass-ceramic substrate 110. When measuring hardness of the optical film structure 120 (when disposed on a substrate 110) with a Berkovich indenter, the region of permanent deformation (plastic zone) of a material is associated with the hardness of the material. During indentation, an elastic stress field extends well beyond this region of permanent deformation. As indentation depth increases, the apparent hardness and modulus are influenced by stress field interactions with the underlying substrate 110. The influence of the substrate 110 on hardness occurs at deeper indentation depths (i.e., typically at depths greater than about 10% of the total thickness of the optical film structure 120). Moreover, a further complication is that the hardness response requires a certain minimum load to develop full plasticity during the indentation process. Prior to that certain minimum load, the hardness shows a generally increasing trend.

At small indentation depths (which also may be characterized as small loads) (e.g., up to about 50 nm) in the optical film structure 120, the apparent hardness of a material appears to increase dramatically versus indentation depth. This small indentation depth regime does not represent a true metric of hardness but, instead, reflects the development of the aforementioned plastic zone, which is related to the finite radius of curvature of the indenter. At intermediate indentation depths, the apparent hardness approaches maximum levels. At deeper indentation depths, the influence of the glass-ceramic substrate 110 becomes more pronounced as the indentation depths increase. Hardness may begin to drop dramatically once the indentation depth exceeds about 30% of the optical coating thickness.

In one or more embodiments, the transparent article 100, as depicted in FIGS. 1A-1D, may exhibit a maximum hardness of about 10 GPa or greater, about 11 GPa or greater, or about 12 GPa or greater, 13 GPa or greater, or 14 GPa or greater, as measured from the outer surface 120a of the optical film structure 120 by a Berkovich Indenter Hardness Test over an indentation depth from about 100 nm to about 500 nm, or over an indentation depth from about 100 nm to about 900 nm. For example, the transparent article 100 can exhibit a maximum hardness of 10 GPa, 11 GPa, 12 GPa, 13 GPa, 14 GPa, 15 GPa, 16 GPa, 17 GPa, 18 GPa, 19 GPa, 20 GPa, or greater, as measured from the outer surface 120a of the optical film structure 120 by a Berkovich Indenter Hardness Test over an indentation depth from about 100 nm to about 500 nm. In some implementations, the maximum hardness of the transparent article 100 is greater than 10 GPa, 11 GPa, 12 GPa, 13 GPa, 14 GPa, 15 GPa, 16 GPa, 17 GPa, 18 GPa, or 19 GPa, at an indentation depth of 100 nm. In some implementations, the maximum hardness of the transparent article 100 is greater than 10 GPa, 12 GPa, 14 GPa, 16 GPa, 17 GPa, 18 GPa, or 19 GPa, at an indentation depth of 500 nm. Further, according to some implementations, the transparent article 100 may exhibit a maximum hardness of about 10 GPa or greater, about 12 GPa or greater, or about 14 GPa or greater, 15 GPa or greater, 16 GPa or greater, 17 GPa or greater, or even 18 GPa or greater, as measured from the outer surface 120a of the optical film structure 120 by a Berkovich Indenter Hardness Test over indentation depth ranges from about 100 nm to 500 nm, from about 100 nm to about 900 nm, or from about 200 nm to about 900 nm.

In one or more embodiments of the disclosure, the transparent article 100, as depicted in FIGS. 1A-1D, exhibits an average failure stress level of 700 MPa or greater, 750 MPa or greater, 800 MPa or greater, or even 850 MPa or greater, as measured in a ring-on-ring (ROR) test with the outer surface 120a of the optical film structure 120 of these articles placed in tension. Essentially, these article-level average failure stress levels are unexpectedly indicative of transparent articles 100 with optical film structures 120 that have not experienced any loss, or have not experienced any substantial loss, in failure strength relative to the strength of their bare glass-ceramic substrates. In some embodiments, the transparent article 100 exhibits an average failure stress level of 700 MPa, 725 MPa, 750 MPa, 775 MPa, 800 MPa, 825 MPa, 850 MPa, 875 MPa, 900 MPa, 925 MPa, 950 MPa, 975 MPa, 1000 MPa, 1025 MPa, 1050 MPa, 1075 MPa, 1100 MPa, and all average failure stress levels between the foregoing values, as measured in a ring-on-ring (ROR) test with the outer surface 120a of the optical film structure 120 of the article placed in tension.

Referring again to the transparent articles 100 (see FIGS. 1A-1D) with average ROR failure stress levels of 700 MPa or greater, it should be understood that these failure stress levels can be achieved through the control of the composition, arrangement and/or processing of the optical film structures 120 employed in the transparent articles 100. Notably, the composition, arrangement and/or processing of the optical film structures 120 can be adjusted to obtain residual compressive stress levels of at least 700 MPa (e.g., from 700 to 1100 MPa) and an elastic modulus of at least 140 GPa (e.g., from 140 to 170 GPa, or from 140 to 180 GPa). These mechanical properties of the optical film structures 120 unexpectedly correlate to average failure stress levels of 700 MPa or greater in the transparent articles 100 employing these optical film structures (see FIGS. 7 and 8, and the subsequent corresponding description below), as measured in an ROR test with the outer surface 120a of the optical film structure of the article placed in tension. According to some embodiments of the transparent article 100, the optical film structure 120 exhibits a residual compressive stress of from 700 MPa to 850 MPa and an elastic modulus of from about 140 GPa to 165 GPa. In some embodiments of the transparent article 100, the optical film structure 120 exhibits a residual compressive stress of from 750 MPa to 950 MPa and an elastic modulus of from about 140 GPa to 175 GPa. In some implementations of the transparent article 100, the optical film structure 120 exhibits a residual compressive stress of from 850 MPa to 1100 MPa and an elastic modulus of from about 140 GPa to 195 GPa.

With further regard to the residual compressive stress and elastic modulus levels (along with hardness levels) of the optical film structure 120, these properties can be controlled through adjustments to the stoichiometry and/or thicknesses of the low RI layers 130A, high RI layers 130B, capping layer 131 and scratch resistant layer 150. In embodiments, the residual compressive stress and elastic modulus levels (and hardness levels) exhibited by the optical film structure 120 can be controlled through adjustments to the processing conditions for sputtering the layers of the structure 120, particularly its high RI layers 130B and scratch resistant layer 150. In some implementations, for example, a reactive sputtering process can be employed to deposit high RI layers 130B comprising a silicon-containing nitride or a silicon-containing oxynitride. Further, these high RI layers 130B can be deposited by applying power to a silicon sputter target in a reactive gaseous environment containing argon gas (e.g., at flow rates from 50 to 150 sccm), nitrogen gas (e.g., at flow rates from 200 to 250 sccm) and oxygen gas, with residual compressive stress and elastic modulus levels largely dictated by the selected oxygen gas flow rate. For example, a relatively low oxygen gas flow rate (e.g., 45 sccm) can be employed according to the foregoing argon and nitrogen gas flow conditions to produce high RI layers 130B with a $SiO_xN_y$ stoichiometry such that its optical film structure 120 exhibits a residual compressive stress of about 942 MPa, hardness of 17.8 GPa and an elastic modulus of 162.6 GPa. As another example, a relatively high oxygen gas flow rate (e.g., 65 sccm) can be employed according to the foregoing argon and nitrogen gas flow conditions to produce high RI layers 130B with a $SiO_xN_y$ stoichiometry such that the optical film structure 120 exhibits a residual compressive stress of about 913 MPa, hardness of 16.4 GPa and an elastic modulus of 148.4 GPa. Accordingly, the stoichiometry of the optical film structure 120, particularly its high RI layers 130B and scratch resistant layer 150, can be controlled to achieve targeted residual compressive stress and elastic modulus levels, which unexpectedly correlate to the advantageously high average failure stress levels in the transparent articles 100 (e.g., greater than or equal to 700 MPa).

With further regard to the hardness of the transparent articles 100 depicted in FIGS. 1A-1D, the hardness of the material of a high RI layer 130B and/or scratch-resistant layer 150 may be characterized specifically. In some embodiments, the maximum hardness of the high RI layer 130B and/or the scratch-resistant layers 150, as measured by the Berkovich Indenter Hardness Test, may be about 10 GPa or greater, about 12 GPa or greater, about 15 GPa or greater, about 18 GPa or greater, or even about 20 GPa or greater. The hardness of a given layer (e.g., high RI layer 130B) may be measured by analyzing a transparent article 100 where the layer measured is the uppermost layer in the optical film structure 120. If the layer to be measured for hardness is a buried layer, its hardness may be measured by producing a transparent article which does not include the overlying layers and subsequently testing the article for hardness. Such measured hardness values may be exhibited by the transparent article 100, optical film structure 120, outer and inner structures 130a, 130b, high RI layer 130B, and/or scratch-resistant layers 150, along an indentation depth of about 50 nm or greater or about 100 nm or greater, and may be sustained above a certain hardness value for a continuous indentation depth range. In embodiments, the continuous indentation depth range can be from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, from about 200 nm to about 600 nm, from about 200 nm to about 800 nm, from about 200 nm to about 1000 nm, from about 300 nm to about 500 nm, from about 300 nm to about 800 nm, or from about 300 nm to about 1000 nm. In one or more embodiments, the transparent article 100 exhibits a hardness that is greater than the hardness of the glass-ceramic substrate 110 (which can be measured on the primary surface 112 or 114 with the optical film structure 120 removed).

According to embodiments, the transparent articles 100 depicted in FIGS. 1A-1D may exhibit an average two-sided or two-surface (i.e., through both primary surfaces 112, 114 of the glass-ceramic substrate 110) photopic transmittance, or average visible transmittance, over an optical wavelength regime from 400 to 700 nm, of about 80% or greater, about 85% or greater, about 90% or greater, about 91% or greater, about 92% or greater, about 93% or greater, or even about 94% or greater at normal incidence, from 0 to 10 degrees, from 0 to 20 degrees, from 0 to 30 degrees, from 0 to 40 degrees, from 0 to 50 degrees, or even from 0 to 60 degrees. In some embodiments, the transparent articles 100 can exhibit an average two-sided transmittance in the infrared spectrum (e.g., at 940 nm) of about 80% or greater, about 85% or greater, about 90% or greater, about 91% or greater, about 92% or greater, about 93% or greater, or even about 94% or greater at normal incidence, from 0 to 10 degrees, from 0 to 20 degrees, from 0 to 30 degrees, from 0 to 40 degrees, from 0 to 50 degrees, or even from 0 to 60 degrees.

According to some implementations, the transparent articles 100 depicted in FIGS. 1A-1D may exhibit a transmitted color with a D65 illuminant, as given by $\sqrt{(a^{*2}+b^{*2})}$, of less than 4, less than 3.5, less than 3, less than 2.5, less than 2, less than 1.5, or even less than 1, as measured at normal incidence, from 0 to 10 degrees, or over all incidence angles from 0 to 90 degrees. For example, the transparent articles 100 can exhibit a transmitted color of less than 4, 3.75, 3.5, 3.25, 3, 2.75, 2.5, 2.25, 2, 1.9, 1.8, 1.7, 1.6, 1.5, 1.4, 1.3, 1.2, 1.1, 1.0, 0.9, 0.8, 0.7, 0.6, 0.5, or even lower, as measured at normal incidence, from 0 to 10 degrees, or over all incidence angles from 0 to 90 degrees.

According to embodiments, the transparent articles 100 depicted in FIGS. 1A-1D may exhibit an average single-sided or first-surface (i.e., through one of the primary surfaces 112, 114 of the substrate 110) photopic reflectance, or average reflectance over an optical wavelength regime from 400 to 700 nm through one or both primary surfaces of the substrate 110 (i.e., first-surface or a two-surface reflectance), of less than about 15%, less than about 13%, less than about 12%, less than about 10%, less than about 8%, less than about 6%, less than about 4%, less than about 2%, or even less than 1%, at normal incidence, or from 0 to 10 degrees. For example, the transparent articles 100 can exhibit a first-surface average photopic reflectance of less than 20%, less than 10%, less than 5%, less than 2%, less than 1%, or even less than 0.8%.

According to some implementations, the transparent articles 100 depicted in FIGS. 1A-1D may exhibit a first-surface (i.e., through one of the primary surfaces 112, 114 of the substrate 110), reflected color with a D65 illuminant, as given by $\sqrt{(a^{*2}+b^{*2})}$, of less than 10, less than 8, less than 6, less than 4, less than 3, or even less than 2, as measured at normal incidence, from 0 to 10 degrees, or over all incidence angles from 0 to 90 degrees. For example, the transparent articles 100 can exhibit a reflected color of less than 10, 9, 8, 7, 6, 5, 4, 3.75, 3.5, 3.25, 3, 2.75, 2.5, 2.25, 2, 1.9, 1.8, 1.7, 1.6, 1.5, 1.4, 1.3, 1.2, 1.1, 1, or even lower, as measured at normal incidence, from 0 to 10 degrees, or over all incidence angles from 0 to 90 degrees.

In some implementations, the transparent articles 100 depicted in FIGS. 1A-1D may exhibit maximum-to-minimum oscillations in the average photopic transmittance or reflectance, or average transmittance or reflectance over an optical wavelength regime from 500 to 600 nm, of less than 2%, less than 1.8%, less than about 1.5%, less than about 1.0%, less than about 0.9%, less than 0.75%, or even less than 0.5%, at normal incidence, or from 0 to 10 degrees. For example, the transparent articles 100 can exhibit oscillations in their transmittance or reflectance spectra of 1.9%, 1.8%, 1.7%, 1.6%, 1.5%, 1.4%, 1.3%, 1.2%, 1.1%, 1.0%, 0.9%, 0.85%, 0.75%, 0.6%, 0.5%, or even lower, at normal incidence, or from 0 to 10 degrees. Note that these oscillation transmittance and reflectance values are in absolute reflectance or transmittance units, on a scale of 0-100% for both reflectance and transmittance. Hence, an embodiment of the transparent article 100 with a 1% average photopic reflectance and less than 0.5% reflectance oscillations will have a range of reflectance values between 0.5% and 1.5% over the specified wavelength range.

As noted earlier, the transparent articles 100 depicted in FIGS. 1A-1D exhibit high damage and scratch resistance. According to an implementation, the transparent articles 100 of the disclosure exhibit a lateral crack zone with an average largest linear dimension of less than 160 microns, or even less than 150 microns, as tested with a Vickers Indentation Damage Test with a 1000 g load. Conventional transparent articles with ion-exchanged glass substrates exhibit damage levels indicative of a lateral crack zone with an average largest linear dimension of greater than 180 microns, or even greater than 200 microns, according to the same Vickers Indentation Damage Test with a 1000 g load. Similarly, the transparent articles 100 of the disclosure exhibit a lateral crack zone with a largest lateral crack area that is less than 25,000 $\mu m^2$, or even less than 20,000 $\mu m^2$, as tested with a Vickers Indentation Damage Test with a 1000 g load. Conventional transparent articles with ion-exchanged glass substrates exhibit damage levels indicative of a lateral crack zone with a largest lateral crack area of greater than 30,000 µm², according to the same Vickers Indentation Damage Test with a 1000 g load.

According to another implementation, the transparent articles 100 of the disclosure (see FIGS. 1A-1D) exhibit a load threshold of about 340 mN or greater, 360 mN or greater, 380 mN or greater, or even 400 mN or greater, for lateral crack formation, as tested with a Ramped Load Scratch Test with a conical diamond indenter on the outer surface 120a of the optical film structure 120. In contrast, conventional transparent articles with ion-exchanged glass substrates exhibit a load threshold of about 320 mN or less, for lateral crack formation, as tested with the Ramped Load Scratch Test under the same test conditions. Further, according to another embodiment, the transparent articles 100 of the disclosure exhibit a visible damage from testing under the Ramped Load Scratch Test up to a peak load of 360 mN in the form of lateral cracking of less than 20 µm from the center of the scratch path. In contrast, conventional transparent articles with ion-exchanged glass substrates exhibit visible damage in the form of lateral cracking of at least 50 µm under the same test conditions.

According to a further implementation, the transparent articles 100 exhibit a diffuse reflectance (i.e., an SCE value) of the outer surface 120a of the optical film structure 120, after being subjected to the Garnet Scratch Test, of less than 0.1%, less than 0.05%, or even less than 0.005% in the scratched region from the Test. For example, the transparent articles 100 can exhibit a diffuse reflectance of 0.001%, 0.005%, 0.01%, 0.05%, 0.075%, 0.09%, and other diffuse reflectance values of less than 0.1%, after being subjected to the Garnet Scratch Test.

Figure 5A:
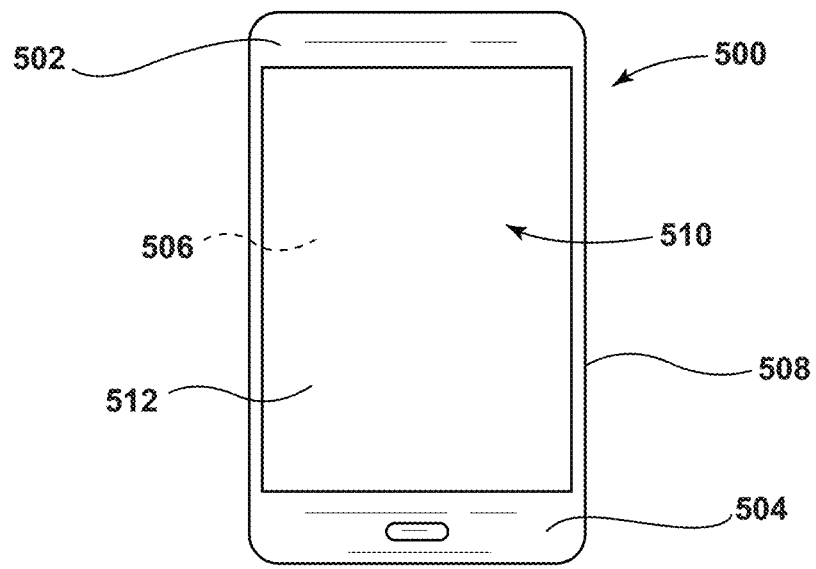
FIG. 5A is a plan view of an exemplary electronic device incorporating any of the transparent articles disclosed herein.
Figure 5B:
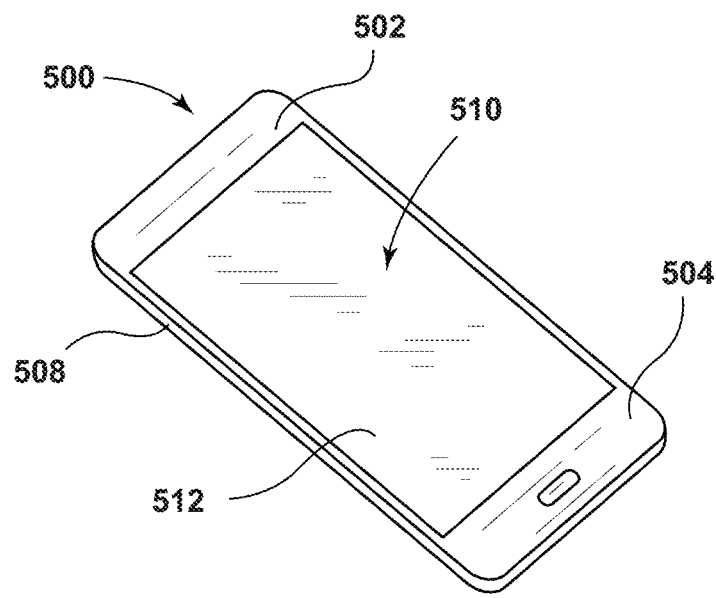
FIG. 5B is a perspective view of the exemplary electronic device of FIG. 5A.

The transparent articles 100 disclosed herein (e.g., as shown in FIGS. 1A-1D) may be incorporated into a device article, for example, a device article with a display (or display device articles) (e.g., consumer electronics, including mobile phones, tablets, computers, navigation systems, wearable devices (e.g., watches) and the like), augmented-reality displays, heads-up displays, glasses-based displays, architectural device articles, transportation device articles (e.g., automotive, trains, aircraft, sea craft, etc.), appliance device articles, or any device that benefits from transparency, scratch-resistance, abrasion resistance, damage resistance, or a combination thereof. An exemplary device article incorporating any of the articles disclosed herein (e.g., as consistent with the transparent articles 100 depicted in FIGS. 1A-1D) is shown in FIGS. 5A and 5B. Specifically, FIGS. 5A and 5B show a consumer electronic device 500 including a housing 502 having a front 504, a back 506, and side surfaces 508; electrical components (not shown) that are at least partially inside or entirely within the housing and including at least a controller, a memory, and a display 510 at or adjacent to the front surface of the housing; and cover substrate 512 at or over the front surface of the housing such that it is over the display. In some embodiments, the cover substrate 512 may include any of the transparent articles 100 disclosed herein.

EXAMPLES

The following examples describe various features and advantages provided by the disclosure, and are in no way intended to limit the invention and appended claims.

In these examples (Exs. 1-3; and Exs. 4A-7C) and comparative examples (i.e., Comp. Exs. 1, 5A, 5B and 7), transparent articles were formed according to the methods of the disclosure and as delineated in each of the Tables 1-3 and Tables 7-10C. More specifically, the optical film structures of these examples, unless otherwise noted, were formed using a metal-mode, reactive sputtering process in a rotary drum coater, with independent control of sputtering power in the metal deposition and the inductively coupled plasma (ICP) (gas reaction) zones. Reactive gases (e.g., $N_2$ gas and $O_2$ gas) are isolated from the metal target in the ICP (gas reaction) zone. Further, the metal sputtering zone employs only inert gas flow (i.e., Ar gas).

Optical transmission and reflectance properties were measured on experimental samples prepared according to these examples using an Agilent Cary 5000 UV-Vis-NIR spectrophotometer. Hardness values for the transparent articles reported in the following examples were obtained using the Berkovich Hardness Test method outlined earlier in the disclosure. More specifically, the inventive examples (Exs. 1-3), as combined with the strengthened glass-ceramic substrate, exhibit the low color values in transmittance and reflectance as well as the relatively small oscillations in reflectance and transmittance in the visible spectrum, that are outlined earlier for the transparent articles 100 of the disclosure (see FIGS. 1A-1D and corresponding description). Further, the inventive examples (Exs. 4A-7C) exhibit, or are otherwise expected to exhibit, the advantageous average failure strength levels (e.g., greater than 700 MPa), as also outlined earlier for the transparent articles 100 of the disclosure.

Comparative Example 1

A comparative transparent article including a strengthened glass substrate was prepared for this example with the structure delineated below in Table 1. The glass substrate is an ion-exchanged, aluminosilicate glass substrate having a thickness of 550 µm and a refractive index of 1.509. The substrate has the following composition: 61.81% $SiO_2$; 3.9% $B_2O_3$; 19.69% $Al_2O_3$; 12.91% $Na_2O$; 0.018% $K_2O$; 1.43% MgO; 0.019% $Fe_2O_3$; and 0.223% $SnO_2$ (wt %, on an oxide basis). The substrate was strengthened using a molten salt bath to achieve a maximum compressive stress (CS) of 850 MPa with a depth-of-layer (DOL) of 40 µm. Further, the layers of the optical film structure were deposited according to vapor deposition conditions set forth in U.S. Patent Application Publication No. 2020/0158916, the salient portions of which are incorporated herein by reference.

TABLE 1

Comp. Ex. 1 transparent article design with strengthened glass substrate

| Layer | Material | Refractive index (@ 550 nm) | Thickness (nm, unless noted) |
|---|---|---|---|
| Medium | Air | 1.0 | N/A |
| 13 | $SiO_2$ | 1.478 | 88.5 |
| 12 | $SiN_x$ | 2.022 | 143.6 |
| 11 | $SiO_2$ | 1.478 | 16.8 |
| 10 | $SiN_x$ | 2.022 | 40.9 |
| 9 | $SiO_2$ | 1.478 | 10.6 |
| 8 | $SiO_xN_y$ | 1.953 | 2000 |
| 7 | $SiO_2$ | 1.478 | 8.8 |
| 6 | $SiO_xN_y$ | 1.953 | 44.8 |
| 5 | $SiO_2$ | 1.478 | 30.1 |
| 4 | $SiO_xN_y$ | 1.953 | 26.4 |
| 3 | $SiO_2$ | 1.478 | 53.7 |
| 2 | $SiO_xN_y$ | 1.953 | 9.6 |
| 1 | $SiO_2$ | 1.478 | 25 |
| Substrate | Ion-exchanged glass | 1.509 | 550 microns |

Example 1

A transparent article including a strengthened glass-ceramic substrate was prepared for this example with the structure delineated below in Table 2. The glass-ceramic substrate is an ion-exchanged, LAS glass-ceramic substrate having a thickness of 600 μm and a refractive index of 1.531. Further, the glass-ceramic substrate has the following composition: 74.5% $SiO_2$; 7.53% $Al_2O_3$; 2.1% $P_2O_5$; 11.3% $Li_2O$, 0.06% $Na_2O$; 0.12% $K_2O$; 4.31% $ZrO_2$; 0.06% $Fe_2O_3$; and 0.02% $SnO_2$ (wt %, on an oxide basis). In addition, the glass-ceramic substrate was cerammed according to the following schedule: (a) ramp from room temperature to 580° C. at 5° C./min; (b) hold at 580° C. for 2.75 hours; (c) ramp to 755° C. at 2.5° C./min; (d) hold at 755° C. for 0.75 hours; and (e) cool at a furnace rate to room temperature. After ceramming, the glass-ceramic substrate was ion-exchange strengthened in a molten salt bath of 60% $KNO_3$/40% $NaNO_3$+0.12% $LiNO_3$ (wt. %) at 500° C. for 6 hours. Further, the layers of the optical film structure were deposited according to vapor deposition conditions set forth in U.S. Patent Application Publication No. 2020/0158916, the salient portions of which are incorporated herein by reference.

Referring again to the transparent article of this example, the layers (e.g., layers 1-7 in Table 2) of the optical film structure between the glass-ceramic substrate and the scratch resistant layer (e.g., layer 8 in Table 2) are configured to achieve low reflectance and low color generated by the transition zone between the substrate 110 and the scratch resistant layer. This layer configuration within the inner structure of the optical film structure can also be described as optical impedance matching between the glass-ceramic substrate and the scratch resistant layer. In addition, as is evident from Table 2, a volume of the low RI layers in the inner structure of the optical film structure is less than about 59% (i.e., layers, 1, 3, 5, and 7, as totaling 57.1%) and a volume of the high RI layers in the inner structure of the optical film structure is greater than about 41% (i.e., layers 2, 4, and 6, as totaling 42.9%).

TABLE 2

Ex. 1 transparent article design with strengthened glass-ceramic substrate

| Layer | Material | Refractive index (@ 550 nm) | Thickness (nm, unless noted) | Exemplary elements of transparent article 100 (see FIGS. 1A-1D) |
|---|---|---|---|---|
| Medium | Air | 1.0 | N/A | N/A |
| 13 | $SiO_2$ | 1.478 | 88.5 | 131 |
| 12 | $SiN_x$ | 2.022 | 143.6 | 130B |
| 11 | $SiO_2$ | 1.478 | 16.8 | 130A |
| 10 | $SiN_x$ | 2.022 | 40.9 | 130B |
| 9 | $SiO_2$ | 1.478 | 10.6 | 130A |
| 8 | $SiO_xN_y$ | 1.953 | 2000 | 150 and/or 130B |
| 7 | $SiO_2$ | 1.478 | 8.7 | 130A |
| 6 | $SiO_xN_y$ | 1.953 | 45.8 | 130B |
| 5 | $SiO_2$ | 1.478 | 29.7 | 130A |
| 4 | $SiO_xN_y$ | 1.953 | 28.1 | 130B |
| 3 | $SiO_2$ | 1.478 | 51.4 | 130A |
| 2 | $SiO_xN_y$ | 1.953 | 12.2 | 130B |
| 1 | $SiO_2$ | 1.478 | 25 | 130A |
| Substrate | Ion-exchanged transparent glass-ceramic | 1.531 | 600 microns | 110 |

Examples 2 and 3

A transparent article including a strengthened glass-ceramic substrate was prepared for these examples with the structure delineated below in Table 3. The glass-ceramic substrate is an ion-exchanged, LAS glass-ceramic substrate having a thickness of 600 μm and a refractive index of 1.531. Further, the glass-ceramic substrate has the following composition: 74.5% $SiO_2$; 7.53% $Al_2O_3$; 2.1% $P_2O_5$; 11.3% $Li_2O$; 0.06% $Na_2O$; 0.12% $K_2O$; 4.31% $ZrO_2$; 0.06% $Fe_2O_3$; and 0.02% $SnO_2$ (wt %, on an oxide basis). In addition, the glass-ceramic substrate was cerammed according to the following schedule: (a) ramp from room temperature to 580° C. at 5° C./min; (b) hold at 580° C. for 2.75 hours; (c) ramp to 755° C. at 2.5° C./min; (d) hold at 755° C. for 0.75 hours; and (e) cool at a furnace rate to room temperature. After ceramming, the glass-ceramic substrate was ion-exchange strengthened in a molten salt bath of 60% $KNO_3$/40% $NaNO_3$+0.12% $LiNO_3$ (wt. %) at 500° C. for 6 hours. Further, the layers of the optical film structure were deposited according to vapor deposition conditions set forth in U.S. Patent Application Publication No. 2020/0158916, the salient portions of which are incorporated herein by reference.

TABLE 3

Exs. 2 and 3 transparent article designs with strengthened glass-ceramic substrates

| Layer | Material | Refractive index (@ 550 nm) | Ex. 2 Thickness (nm, unless noted) | Ex. 3 Thickness (nm, unless noted) | Exemplary elements of transparent article 100 (see FIGS. 1A-1D) |
|---|---|---|---|---|---|
| Medium | Air | 1.0 | N/A | N/A | |
| 9 | $SiO_2$ | 1.478 | 14 | 14 | 131 |
| 8 | $SiO_xN_y$ | 1.953 | 2000 | 5000 | 150 and/or 130B |
| 7 | $SiO_2$ | 1.478 | 8.7 | 8.7 | 130A |
| 6 | $SiO_xN_y$ | 1.953 | 45.8 | 45.8 | 130B |
| 5 | $SiO_2$ | 1.478 | 29.7 | 29.7 | 130A |
| 4 | $SiO_xN_y$ | 1.953 | 28.1 | 28.1 | 130B |
| 3 | $SiO_2$ | 1.478 | 51.4 | 51.4 | 130A |
| 2 | $SiO_xN_y$ | 1.953 | 12.2 | 12.2 | 130B |
| 1 | $SiO_2$ | 1.478 | 25 | 25 | 130A |
| Substrate | Ion-exchanged transparent glass-ceramic | 1.531 | 600 microns | 600 microns | 110 |

Mechanical Properties of Examples 1-3 and Comparative Example 1

Figure 2:
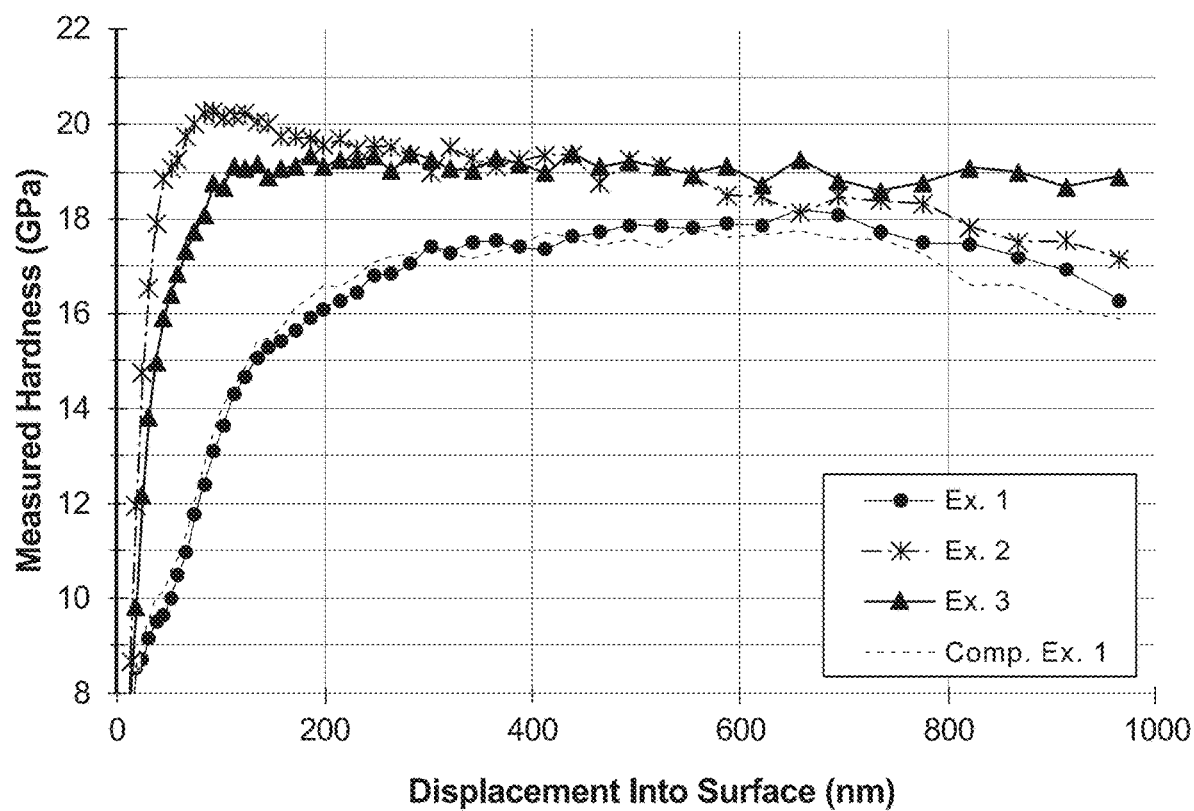
FIG. 2 is a plot of measured hardness vs. displacement from a Berkovich Hardness Test into the outer surface of a comparative transparent article with a glass substrate and an optical film structure and transparent articles with glass-ceramic substrates and optical film structures according to embodiments of the disclosure.

Referring to FIG. 2, a plot is provided of the measured hardness (GPa) vs. displacement (nm) from a Berkovich Hardness Test into the outer surface of the Comp. Ex. 1 and Exs. 1-3 transparent articles. The hardness values of each of the articles, as including the optical film structure, was measured via nanoindentation using a Berkovich diamond tip on a KLA Instruments G200 Nano Indenter, according to the Berkovich Hardness Test outlined earlier in this disclosure.

As shown in FIG. 2, the hardness values of Exs. 2 and 3 are higher due to the smaller amount of anti-reflective layers and $SiO_2$ material disposed over the thickest $SiO_xN_y$ layer (e.g., a scratch-resistant layer). The higher hardness values of Exs. 1-3 as compared to Comp. Ex. 1 at 500 to 1000 nm indentation depths are also correlated with the higher hardness of the underlying ion-exchanged glass-ceramic substrates in Exs. 1-3 as compared to the underlying ion-exchanged glass substrate of Comp. Ex. 1. Further, Table 4 below summarizes the measured Berkovich diamond nanoindentation hardness vs. depth for Exs. 1-3 and Comp. Ex. 1 from FIG. 2. Further, Table 4 includes elastic modulus measurements for these samples.

TABLE 4

Hardness and elastic modulus properties of Exs. 1-3 and Comp. Ex. 1

| Example | Hardness (GPa) | | | Elastic Modulus (GPa) |
| --- | --- | --- | --- | --- |
| | 100 nm depth | 500 nm depth | Max | Max |
| Comp. Ex. 1 | 14.0 | 17.6 | 17.8 | 173.7 |
| Ex. 1 | 13.6 | 17.8 | 18.2 | 181.3 |
| Ex. 2 | 20.2 | 19.2 | 20.3 | 229.7 |
| Ex. 3 | 18.7 | 19.2 | 19.4 | 220.6 |

Optical Properties of Examples 1-3 and Comparative Example 1

Tables 5 and 6 below summarize optical transmittance and reflectance properties, respectively, for Exs. 1-3 and Comp. Ex. 1. In particular, the optical transmission and reflectance properties were measured on experimental samples prepared according to these examples (Exs. 1-3 and Comp. Ex. 1) using an Agilent Cary 5000 UV-Vis-NIR spectrophotometer. The optical transmittance properties listed in Table 5 are as measured through both primary surfaces of the substrate and the optical film structure of each of these examples. Further, the optical reflectance properties listed in Table 6 are as measured through one and both of the primary surfaces of the substrate and the optical film structure of each of these examples, as noted.

TABLE 5

Optical transmittance metrics for Exs. 1-3 and Comp. Ex. 1

| Optical Transmittance | Photopic Average % T (Y) | L* | a* | b* |
| --- | --- | --- | --- | --- |
| Comp. Ex. 1 | 94.76 | 97.42 | −0.04 | 0.89 |
| Ex. 1 | 93.96 | 96.84 | −0.09 | 1.33 |
| Ex. 2 | 86.58 | 94.06 | −0.14 | 0.86 |
| Ex. 3 | 86.08 | 93.45 | −0.18 | 1.55 |

TABLE 6

Optical reflectance metrics for Exs. 1-3 and Comp. Ex. 1, including both 2-surface (accounting for 1 coated surface and 1 uncoated surface) and 1-surface (coated surface only) reflectance metrics.

| Optical Reflectance | | Photopic Average % R (Y) | L* | a* | b* |
| --- | --- | --- | --- | --- | --- |
| 2 surface % R | Comp. Ex. 1 | 4.52 | 25.68 | −0.37 | −0.64 |
| | Ex. 1 | 4.74 | 26.14 | −0.42 | −0.27 |
| | Ex. 2 | 12.24 | 40.82 | 0.03 | 1.34 |
| | Ex. 3 | 11.97 | 40.25 | 0.02 | 1.59 |
| 1 surface % R | Comp. Ex. 1 | 0.58 | 6.08 | −0.87 | −1.41 |
| | Ex. 1 | 0.61 | 6.86 | −1.12 | −2.28 |
| | Ex. 2 | 8.85 | 35.02 | 0.08 | 1.17 |
| | Ex. 3 | 8.46 | 34.05 | 0.10 | 1.50 |

Scratch and Damage Test Results of Examples 1-3 and Comparative Example 1

The inventive Exs. 1-3 show excellent resistance to severe scratch events, as quantified by a Garnet Scratch test. This test consisted of a single pass with 150 grit garnet sandpaper, with 4 kg applied load over a ~0.6×0.6 cm contact area. After this scratch event, the level of scratching is quantified by measurement of diffusely reflected light in the scratched region using an SCE measurement using a Konica-Minolta CM700D with a 6 mm diameter aperture. The diffuse reflectance (SCE) value was below 0.005% after the Garnet Scratch test for Exs. 1-3, compared to an average of ~0.25% or higher for an uncoated, chemically strengthened aluminosilicate glass (i.e., for an ion-exchanged glass substrate with no coating or optical film structure, and for an ion-exchanged glass substrate with a <10 nm fluorosilane ETC coating that reduces friction but does not modify the hardness of the glass article).

Figure 3:
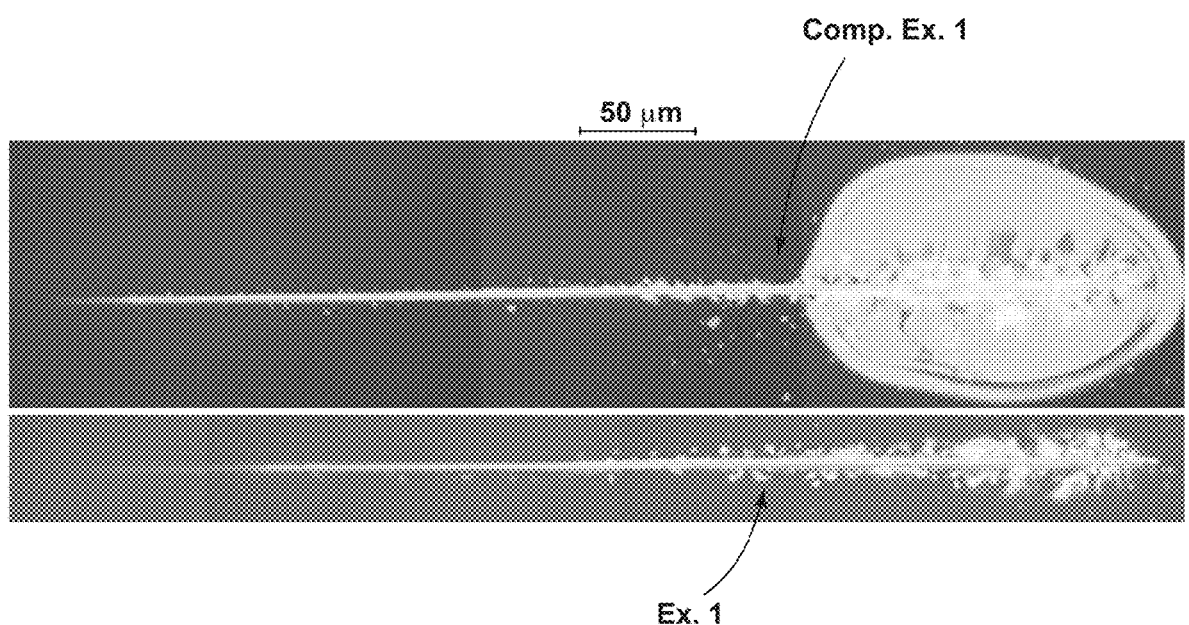
FIG. 3 includes two optical micrographs of the outer surface of a comparative transparent article with a glass substrate and an optical film structure and a transparent article with a glass-ceramic substrate and an optical film structure according to an embodiment of the disclosure, respectively, after a Ramped Load Scratch Test.

The inventive examples also demonstrate excellent damage resistance, as subjected to testing that approximates real-world stress scenarios, such as a smartphone being dropped onto a hard, rough surface. In particular, Ex. 1 and Comp. Ex. 1 were subjected to the Ramped Load Scratch Test to a maximum load of 360 mN. Referring to FIG. 3, this figure includes two optical micrographs of the outer surface of a comparative transparent article with a glass substrate and an optical film structure (Comp. Ex. 1) and a transparent article with a glass-ceramic substrate and an optical film structure (Ex. 1), respectively, after the Ramped Load Scratch Test. As is evident from FIG. 3, the extent of lateral cracking in Comp. Ex. 1 is at least 50 microns from the center of the scratch path. In contrast, the extent of the visible damage in Ex. 1 is less than about 20 microns from the center of the scratch path.

Further, Ex. 1 and Comp. Ex. 1 were subjected to the Ramped Load Scratch Test with varying load levels to determine the maximum load that correlates to the onset of damage (i.e., lateral crack formation). In particular, Ex. 1 was subjected to successive loading up to ~400 mN before the onset of damage in this test. In contrast, Comp. Ex. 1 was subjected to successive loading levels up to ~320 mN before the onset of damage in this test.

Figure 4:
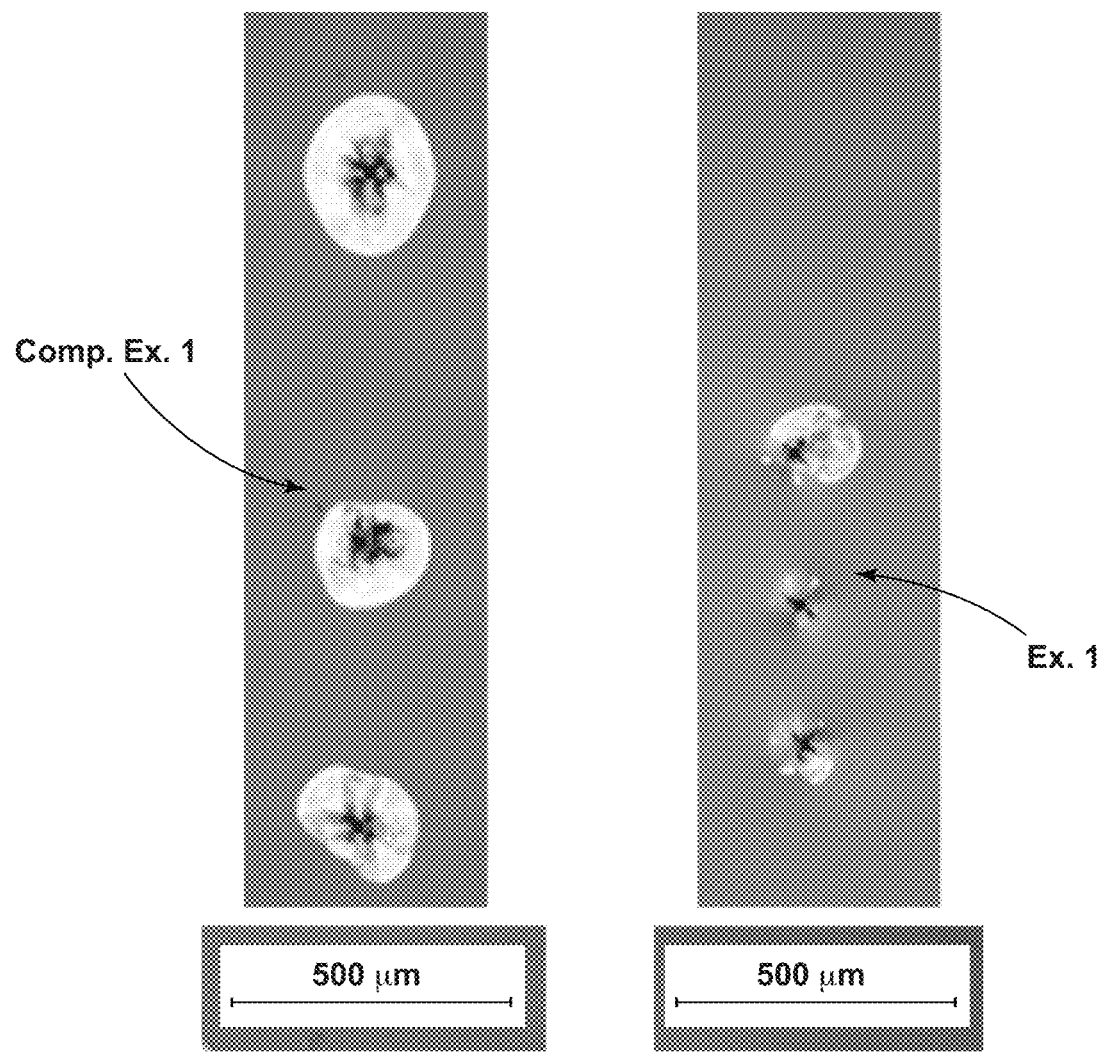
FIG. 4 includes two optical micrographs of the outer surface of a comparative transparent article with a glass substrate and an optical film structure and a transparent article with a glass-ceramic substrate and an optical film structure according to an embodiment of the disclosure, respectively, after a Vickers Indentation Damage Test.

Similarly, Ex. 1 and Comp. Ex. 1 were subjected to the Vickers Indentation Damage Test with a 1000 g load. Referring to FIG. 4, this figure includes two optical micrographs of the outer surface of a comparative transparent article with a glass substrate and an optical film structure (Comp. Ex. 1) and a transparent article with a glass-ceramic substrate and an optical film structure (Ex. 1), respectively, after the Vickers Indentation Damage Test. As is evident from FIG. 4, the extent of lateral cracking visible in Comp. Ex. 1 extends more than 100 µm, on average, from the center of the indent (with a corresponding largest linear damage extent of greater than about 200 microns, on average, and a damaged area greater than about 30,000 µm$^2$). In contrast, the extent of visible damage in Ex. 1 extends less than about 70 µm (with a corresponding linear damage extent of less than about 150 µm, on average, and a damaged area less than about 20,000 µm$^2$).

Examples 4A & 4B

A transparent article including a strengthened glass-ceramic substrate was prepared for this example with the structure delineated below in Table 7. The glass-ceramic substrate is an ion-exchanged, LAS glass-ceramic substrate having a thickness of 600 µm and a refractive index of 1.53. Further, the glass-ceramic substrate has the following composition: 74.5% $SiO_2$; 7.53% $Al_2O_3$; 2.1% $P_2O_5$; 11.3% $Li_2O$, 0.06% $Na_2O$; 0.12% $K_2O$; 4.31% $ZrO_2$; 0.06% $Fe_2O_3$; and 0.02% $SnO_2$ (wt %, on an oxide basis). In addition, the glass-ceramic substrate was cerammed according to the following schedule: (a) ramp from room temperature to 580° C. at 5° C./min; (b) hold at 580° C. for 2.75 hours; (c) ramp to 755° C. at 2.5° C./min; (d) hold at 755° C. for 0.75 hours; and (e) cool at a furnace rate to room temperature. After ceramming, the glass-ceramic substrate was ion-exchange strengthened in a molten salt bath of 60% $KNO_3$/40% $NaNO_3$+0.12% $LiNO_3$ (wt. %) at 500° C. for 6 hours. Further, the layers of the optical film structure were deposited according to vapor deposition conditions set forth in U.S. Patent Application Publication No. 2020/0158916, the salient portions of which are incorporated herein by reference.

Referring again to the transparent article of this example, the layers (e.g., layers 1-7 in Table 7) of the optical film structure between the glass-ceramic substrate and the scratch resistant layer (e.g., layer 8 in Table 7) are configured to achieve low reflectance and low color generated by the transition zone between the substrate 110 and the scratch resistant layer. Further, the arrangement of the layers in the optical film structure, along with the stoichiometry of the high RI layers in the structure, was configured to obtain residual compressive stress, hardness and elastic modulus levels in the optical film structure that assure average failure strength levels of the transparent article that exceed 700 MPa, as measured in an ROR test. Further, as noted in Table 7, the intentional variances in the stoichiometry of the high RI layers results in a varying refractive index for these layers.

TABLE 7

Exs. 4A & 4B transparent article designs with strengthened glass-ceramic substrate

| Layer | Material | Refractive index (@ 550 nm) | Thickness (nm, unless noted) | Exemplary elements of transparent article 100 (see FIGS. 1A-1D) |
|---|---|---|---|---|
| Medium | Air | 1.0 | N/A | N/A |
| 11 | $SiO_2$ | 1.476 | 58-64 | 131 |
| 10 | $SiO_xN_y$ | 1.74-2.1 | 30-42 | 130B |
| 9 | $SiO_2$ | 1.476 | 17-20 | 130A |
| 8 | $SiO_xN_y$ | 1.74-1.95 | 1900-2100 | 150 and/or 130B |
| 7 | $SiO_2$ | 1.476 | 8.7-9.2 | 130A |
| 6 | $SiO_xN_y$ | 1.74-1.95 | 45-53 | 130B |
| 5 | $SiO_2$ | 1.476 | 30-31 | 130A |
| 4 | $SiO_xN_y$ | 1.74-1.95 | 27-34 | 130B |
| 3 | $SiO_2$ | 1.476 | 50-53 | 130A |
| 2 | $SiO_xN_y$ | 1.74-1.95 | 11-17 | 130B |
| 1 | $SiO_2$ | 1.476 | 25 | 130A |
| Substrate | Ion-exchanged transparent glass-ceramic | 1.53 | 600 μm | 110 |

With further regard to this example, the high RI layers of Exs. 4A and 4B were prepared and configured with high RI layers comprising $SiO_xN_y$ with refractive indices of 1.75 and 1.88, respectively. Notably, the optical film structures of these samples (Exs. 4A and 4B) were configured according to the design outlined in Table 7. The low RI layers of Exs. 4A and 4B were deposited according to a conventional reactive sputtering process and the high RI layers were deposited according to a reactive sputtering process according to the following conditions: sputter power=6-7 kW, ICP power=2-4 kW, argon gas flow rate (metal sputter zone)=50-150 sccm (preferably, 70-90 sccm), argon gas flow rate (ICP zone)=0-100 sccm (e.g., 80 sccm), oxygen gas flow rate (ICP zone)=35-65 sccm, and a nitrogen gas flow rate (ICP zone)=200-250 sccm. Notably, oxygen gas flow rates were varied to produce high RI layers with a controlled $SiO_xN_y$ stoichiometry that influenced the refractive index, elastic modulus, residual compressive stress and hardness, with argon gas flow in the metal sputtering zone also playing a role in controlling film density, modulus, hardness, and stress.

Figure 6A:
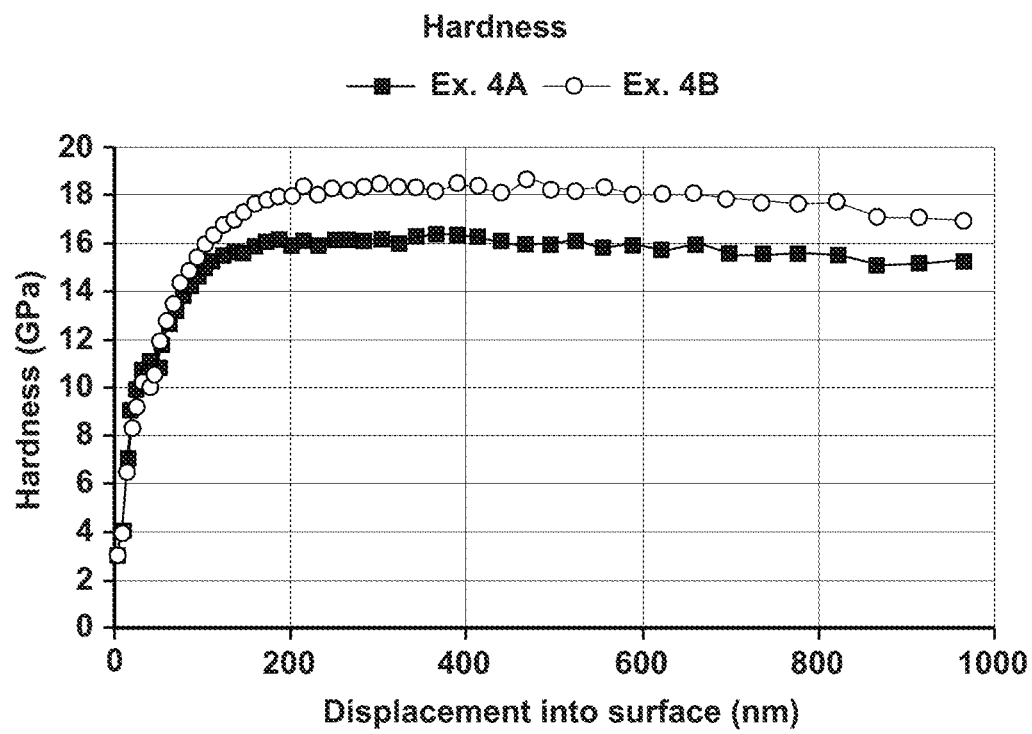
FIGS. 6A and 6B are plots of hardness and elastic modulus vs. displacement, as measured in a Berkovich Hardness Test of the optical film structure of two transparent articles of the disclosure.
Figure 6B:
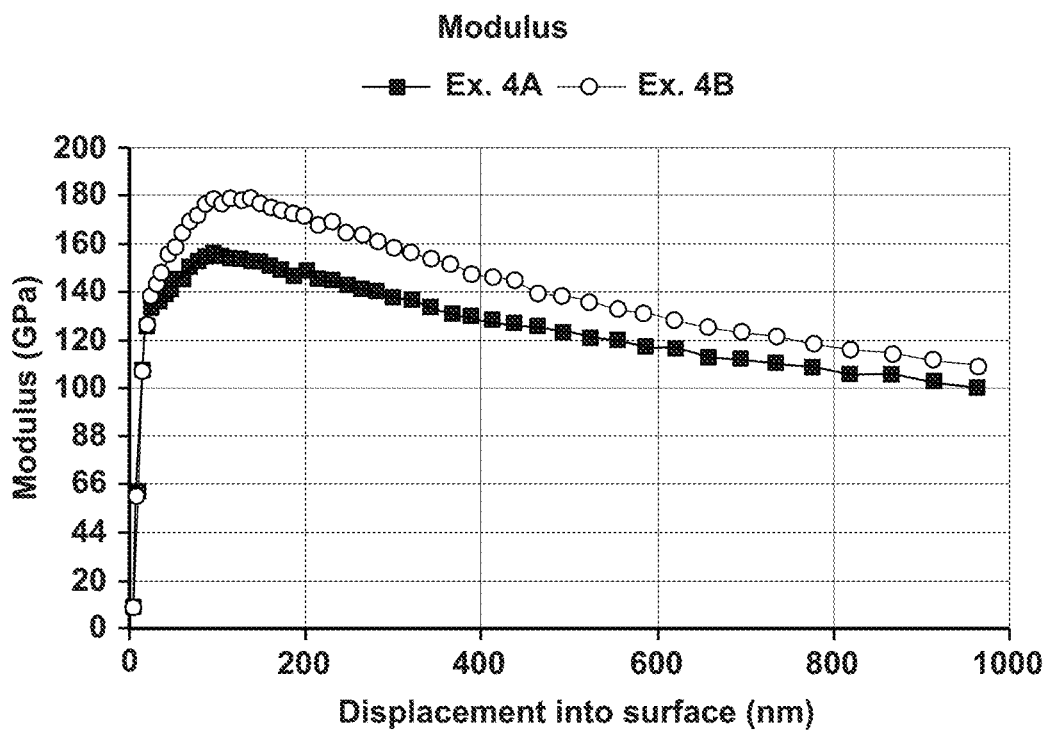

Now referring to FIGS. 6A and 6B, plots of hardness (GPa) and elastic modulus (GPa) vs. displacement (nm) are provided, respectively, as measured in a Berkovich Hardness Test on the outer surface of the optical film structures of two transparent articles of this example (Exs. 4A and 4B). As is evident from the data in FIG. 6A, each of these samples exhibited maximum hardness levels of about 18 and 16 GPa, respectively, at an indentation depth from about 100 nm to about 500 nm (or out to about 900 nm). As is evident from the data in FIG. 6B, each of these samples exhibited elastic modulus levels of about 180 GPa and 160 GPa, respectively, at an indentation depth of about 100 nm. Accordingly, it is evident that the stoichiometry of the high RI layers in the optical film structures of this example could be varied to result in optical film structures with varying, but controllable, mechanical properties including elastic modulus and hardness.

Example 4C

In this example, four transparent articles with optical film structures configured according to the glass-ceramic substrate and optical film structure of Table 8 (see below) were the subject of stress modeling. In particular, these articles were modeled to assess average ROR failure strength in view of the residual compressive stress and elastic modulus levels of their optical film structures. Further, these four articles employed optical film structures of Table 8, as further configured with $SiO_xN_y$ high RI layers such that the optical film structure exhibits elastic modulus levels of 140 GPa (Ex. 4C1), 150 GPa (Ex. 4C2), 160 GPa (Ex. 4C3) and 170 GPa (Ex. 4C4), respectively.

The following assumptions were made in conducting the modeling in this example. For the transparent articles of the disclosure with stiff and hard optical film structures and glass-ceramic substrates, the required applied strain to propagate pre-existing flaws in optical film structures is much lower than the required strain to propagate pre-existing flaws in the substrate itself, primarily because the brittle optical film structure is stiffer than the glass-ceramic substrate. Accordingly, the optical film structure was assumed to fail first, with a crack that then penetrated the substrate that lead to an eventual system catastrophic failure once the crack driving force exceeds the fracture resistance of the glass-ceramic substrate. Fracture mechanics-based numerical modeling (via finite element analysis) was then carried out in such a way that a series of cracks were inserted in the sample, and a strain level was determined when the crack tip stress intensity factor ($K_I$) equals the fracture toughness of the glass-ceramic substrate ($K_{IC}$) under an externally applied flexural load. The average retained strength was then calculated based on an assumed flaw distribution in the substrate of cracks that ranged from 0.1 to 2.5 μm in size.

TABLE 8

Ex. 4C transparent article designs with strengthened glass-ceramic substrate

| Layer | Material | Refractive index (@ 550 nm) | Thickness (nm, unless noted) | Exemplary elements of transparent article 100 (see FIGS. 1A-1D) |
|---|---|---|---|---|
| Medium | Air | 1.0 | N/A | N/A |
| 13 | $SiO_2$ | 1.478 | 88.5 | 131 |
| 12 | $SiO_xN_y$ | 1.7-1.9 | 143.6 | 130B |
| 11 | $SiO_2$ | 1.478 | 16.8 | 130A |
| 10 | $SiO_xN_y$ | 1.7-1.9 | 40.9 | 130B |
| 9 | $SiO_2$ | 1.478 | 10.6 | 130A |
| 8 | $SiO_xN_y$ | 1.7-1.9 | 2000 | 150 and/or 130B |
| 7 | $SiO_2$ | 1.478 | 8.7 | 130A |
| 6 | $SiO_xN_y$ | 1.7-1.9 | 45.8 | 130B |
| 5 | $SiO_2$ | 1.478 | 29.7 | 130A |
| 4 | $SiO_xN_y$ | 1.7-1.9 | 28.1 | 130B |
| 3 | $SiO_2$ | 1.478 | 51.4 | 130A |
| 2 | $SiO_xN_y$ | 1.7-1.9 | 12.2 | 130B |
| 1 | $SiO_2$ | 1.478 | 25 | 130A |
| Substrate | Ion-exchanged transparent glass-ceramic | 1.531 | 600 μm | 110 |

Figure 7:
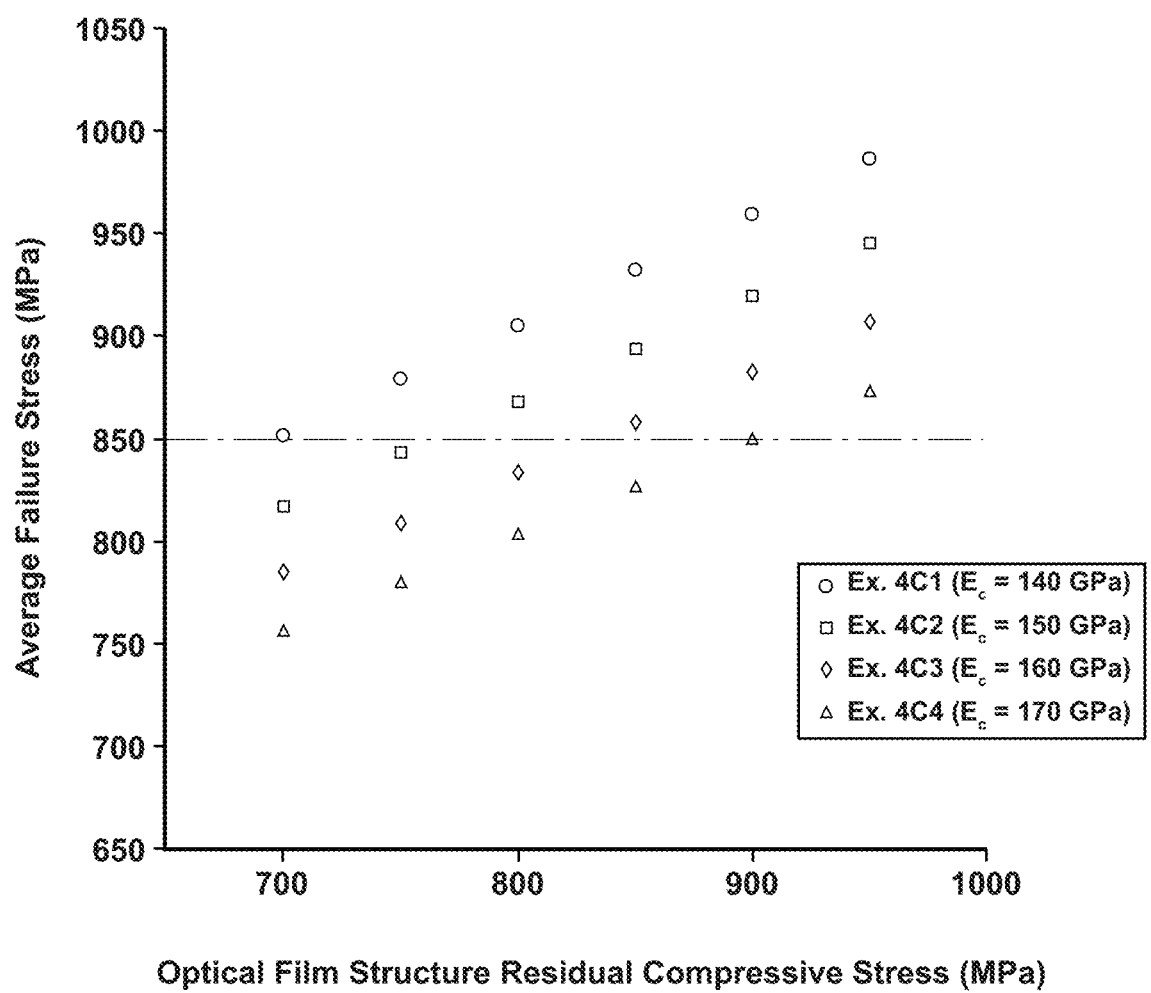
FIG. 7 is a chart of average article failure stress vs. optical film structure residual stress, as modeled for transparent articles with optical film structures of the disclosure exhibiting different elastic modulus values.

Referring now to FIG. 7, a chart is provided of average article failure stress (MPa), as measured in an ROR test, vs. optical film structure residual stress (MPa), as modeled for the transparent articles with optical film structures of this example having different elastic modulus values (Exs. 4C1-4C4). As is evident from the chart, maintaining an optical film structure residual stress of at least 700 MPa and controlling the optical film structure elastic modulus to 170 GPa or less can ensure that the optical film structure will exhibit a failure stress of at least 750 MPa. Further, raising the residual compressive stress in the optical film structure tends to improve the average failure stress to levels from 750 MPa to well above 850 MPa, provided that the elastic modulus of the optical film structure is maintained from about 140 GPa to about 170 GPa.

Example 5

Figure 8:
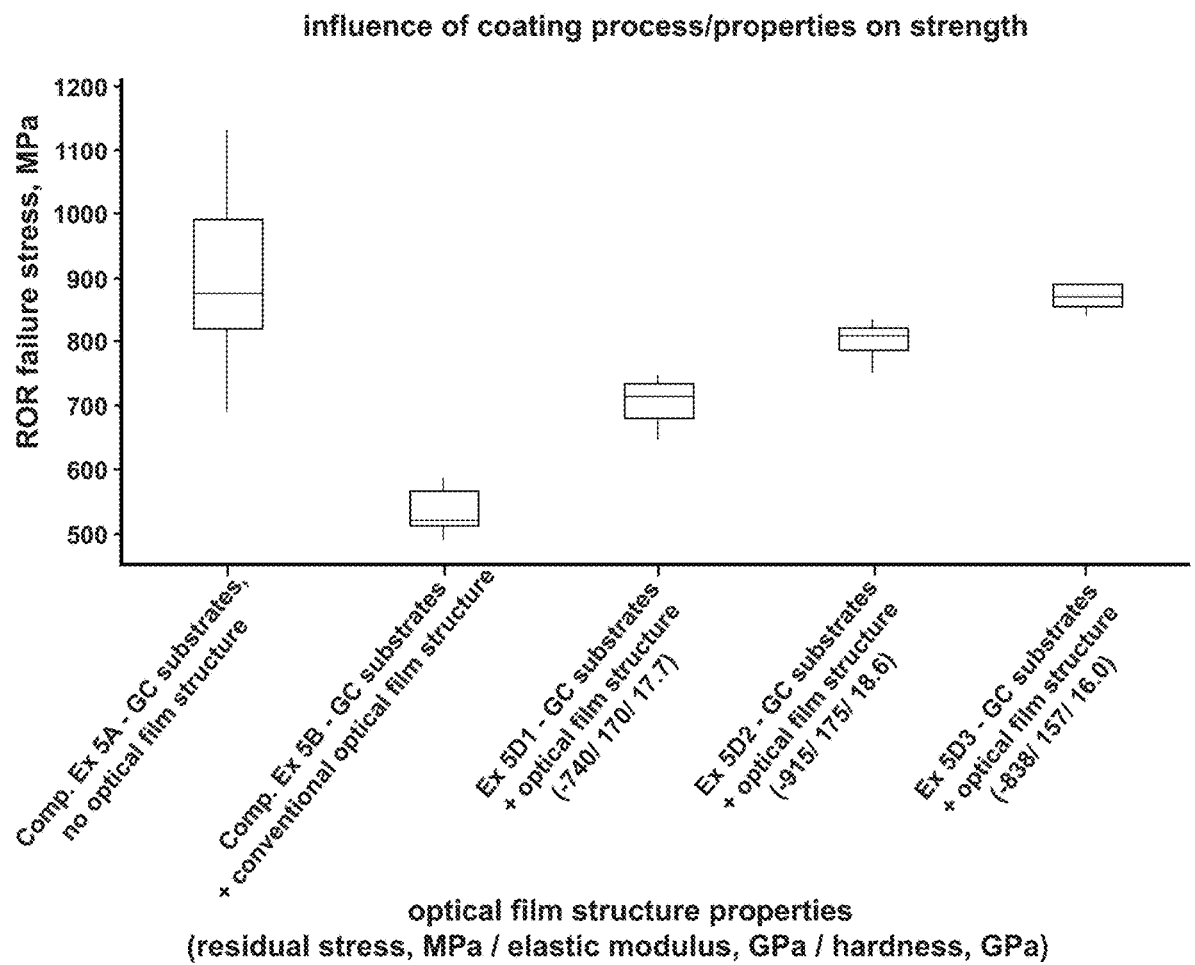
FIG. 8 is a box plot of average article failure stress, as measured in a ring-on-ring test, for transparent articles of the disclosure with different optical film structures and comparative transparent articles.

Actual transparent article samples were prepared and tested to validate the foregoing modeling results shown in FIG. 7 and described earlier. Referring now to FIG. 8, a box plot is provided of average article-level failure stress (MPa), as measured in an ROR test, for transparent articles with different optical film structures and comparative transparent articles of this example. In FIG. 8, average ROR failure stress levels are reported for the following five (5) sample groups: (a) a control group of glass-ceramic substrates without an optical film structure (Comp. Ex. 5A); (b) a control group of transparent articles employing glass-ceramic substrates and a conventional optical film structure (Comp. Ex. 5B); (c) inventive transparent articles employing optical film structures according to this example with a residual compressive stress of 740 MPa, elastic modulus of 170 GPa and a hardness of 17.7 GPa (Ex. 5D1); (d) inventive transparent articles employing optical film structures according to this example with a residual compressive stress of 915 MPa, elastic modulus of 175 GPa and a hardness of 18.6 GPa (Ex. 5D2); and (e) inventive transparent articles employing optical film structures according to this example with a residual compressive stress of 838 MPa, elastic modulus of 157 GPa and a hardness of 16.0 GPa (Ex. 5D3).

More specifically, the samples of this example (Comp. Exs. 5A and 5B; and Exs. 5D1-5D3) employed glass-ceramic substrates and ion-exchange conditions as outlined in the earlier examples. Further, the optical film structures of Exs. 5D1-5D3 were made according to the 11-layer design listed in Table 7, with adjustments made to the stoichiometery of the high RI layers to obtain the residual compressive stress, elastic modulus and hardness properties (see FIG. 8 and above); and minor adjustments to the thicknesses of the various layers in the design. The low RI layers of the samples of this example (i.e., Exs. 5D1-5D3) were deposited according to a conventional reactive sputtering process and the high RI layers were deposited according to a reactive sputtering process according to the following conditions: sputter power=6-7 kW, ICP power=2-4 kW, argon gas flow rate (metal sputter zone)=50-150 sccm (preferably, 70-90 sccm), argon gas flow rate (ICP zone)=0-100 sccm (e.g., 80 sccm), oxygen gas flow rate (ICP zone)=35-65 sccm, and a nitrogen gas flow rate (ICP zone)=200-250 sccm. Notably, oxygen gas flow rates were varied to produce high RI layers with a controlled $SiO_xN_y$ stoichiometry that influenced the refractive index, elastic modulus, residual compressive stress and hardness, with argon gas flow in the metal sputtering zone also playing a role in controlling film density, modulus, hardness, and stress.

In addition, the conventional optical film structure of Comp. Ex. 5B was prepared according to a design substantially similar to the one listed in Table 7; however, all of the high RI layers in this comparative example were prepared with a $SiO_xN_y$ stoichiometry such that they exhibit an elastic modulus of greater than 200 GPa and a refractive index from about 1.94 to 2.04. In particular, the high RI layers of Comp. Ex. 5B were produced with a $SiO_xN_y$ stoichiometry or a $SiN_x$ composition that approaches $Si_3N_4$ by reducing the oxygen gas flow rate (ICP zone) to a level below 30 sccm (e.g., 0-25 sccm), with sputter power=6-9 kW, ICP power=2-4 kW, argon gas flow rate (metal sputter zone)= 100-500 sccm, argon gas flow rate (ICP zone)=80 sccm, and a nitrogen gas flow rate (ICP zone)=100-250 sccm.

As is evident from FIG. 8, the experimental results correlate to the modeling results of FIG. 7. Further, it is evident that the inventive transparent articles of this example (Exs. 5D1-5D3) exhibit average ROR failure stress levels (700 MPa, 800 MPa and 850 MPa, respectively) that exceed those of the control group with a conventional optical film structure design (~525 MPa), a design that was not optimized with the targeted residual compressive stress and elastic modulus levels of the disclosure.

Examples 6A and 6B

A transparent article including a strengthened glass-ceramic substrate was prepared for this example with the structure delineated below in Tables 9A and 9B (Exs. 6A and 6B, respectively). The glass-ceramic substrate is an ion-exchanged, LAS glass-ceramic substrate having a thickness of 600 μm and a refractive index of 1.53. Further, the glass-ceramic substrate has the following composition: 74.5% $SiO_2$; 7.53% $Al_2O_3$; 2.1% $P_2O_5$; 11.3% $Li_2O$; 0.06% $Na_2O$; 0.12% $K_2O$; 4.31% $ZrO_2$; 0.06% $Fe_2O_3$; and 0.02% $SnO_2$ (wt %, on an oxide basis). In addition, the glass-ceramic substrate was cerammed according to the following schedule: (a) ramp from room temperature to 580° C. at 5° C./min; (b) hold at 580° C. for 2.75 hours; (c) ramp to 755° C. at 2.5° C./min; (d) hold at 755° C. for 0.75 hours; and (e) cool at a furnace rate to room temperature. After ceramming, the glass-ceramic substrate was ion-exchange strengthened in a molten salt bath of 60% KNO$_3$/40% NaNO$_3$+0.12% LiNO$_3$ (wt. %) at 500° C. for 6 hours. Further, the layers of the optical film structure were deposited according to vapor deposition conditions set forth in U.S. Patent Application Publication No. 2020/0158916, the salient portions of which are incorporated herein by reference.

Referring again to the transparent article of this example, the layers (e.g., layers 1-7 in Tables 9A and 9B) of the optical film structure between the glass-ceramic substrate and the scratch resistant layer (e.g., layer 8 in Tables 9A and 9B) are configured to achieve low reflectance and low color generated by the transition zone between the substrate 110 and the scratch resistant layer. Further, the arrangement of the layers in the optical film structure, along with the stoichiometry of the high RI layers in the structure, was configured to obtain residual compressive stress and elastic modulus levels (e.g., ~160 GPa for Ex. 6A and ~150 GPa for Ex. 6B) in the optical film structure that assure average failure strength levels of the transparent article that exceed 700 MPa, as measured in an ROR test. The low RI layers of the samples of this example (i.e., Exs. 6A and 6B) were deposited according to a conventional reactive sputtering process and the high RI layers were deposited according to a reactive sputtering process according to the following conditions: sputter power=6-7 kW, ICP power=2-4 kW, argon gas flow rate (metal sputter zone)=50-150 sccm (preferably, 70-90 sccm), argon gas flow rate (ICP zone)=0-100 sccm (e.g., 80 sccm), oxygen gas flow rate (ICP zone)=35-65 sccm, and a nitrogen gas flow rate (ICP zone)=200-250 sccm. Notably, oxygen gas flow rates were varied to produce high RI layers with a controlled SiO$_x$N$_y$ stoichiometry that influenced the refractive index, elastic modulus, residual compressive stress and hardness, with argon gas flow in the metal sputtering zone also playing a role in controlling film density, modulus, hardness, and stress.

TABLE 9A

Ex. 6A transparent article design with strengthened glass-ceramic substrate

| Layer | Material | Refractive index (@ 550 nm) | Thickness (nm, unless noted) | Exemplary elements of transparent article 100 (see FIGS. 1A-1D) |
|---|---|---|---|---|
| Medium | Air | 1.0 | N/A | N/A |
| 11 | SiO$_2$ | 1.477 | 59.8 | 131 |
| 10 | SiO$_x$N$_y$ | 1.829 | 38.62 | 130B |
| 9 | SiO$_2$ | 1.477 | 17.98 | 130A |
| 8 | SiO$_x$N$_y$ | 1.829 | 1925 | 150 and/or 130B |
| 7 | SiO$_2$ | 1.477 | 8.93 | 130A |
| 6 | SiO$_x$N$_y$ | 1.829 | 49.13 | 130B |
| 5 | SiO$_2$ | 1.477 | 30.24 | 130A |
| 4 | SiO$_x$N$_y$ | 1.829 | 30.58 | 130B |
| 3 | SiO$_2$ | 1.477 | 51.41 | 130A |
| 2 | SiO$_x$N$_y$ | 1.829 | 13.88 | 130B |
| 1 | SiO$_2$ | 1.477 | 25 | 130A |
| Substrate | Ion-exchanged transparent glass-ceramic | 1.53 | 600 μm | 110 |

TABLE 9B

Ex. 6B transparent article design with strengthened glass-ceramic substrate

| Layer | Material | Refractive index (@ 550 nm) | Thickness (nm, unless noted) | Exemplary elements of transparent article 100 (see FIGS. 1A-1D) |
|---|---|---|---|---|
| Medium | Air | 1.0 | N/A | N/A |
| 11 | SiO$_2$ | 1.477 | 58.42 | 131 |
| 10 | SiO$_x$N$_y$ | 1.744 | 40.85 | 130B |
| 9 | SiO$_2$ | 1.477 | 18.54 | 130A |
| 8 | SiO$_x$N$_y$ | 1.744 | 2020 | 150 and/or 130B |
| 7 | SiO$_2$ | 1.477 | 9.04 | 130A |
| 6 | SiO$_x$N$_y$ | 1.744 | 52.13 | 130B |
| 5 | SiO$_2$ | 1.477 | 30.36 | 130A |
| 4 | SiO$_x$N$_y$ | 1.744 | 33.32 | 130B |
| 3 | SiO$_2$ | 1.477 | 50.44 | 130A |
| 2 | SiO$_x$N$_y$ | 1.744 | 16.46 | 130B |
| 1 | SiO$_2$ | 1.477 | 25 | 130A |
| Substrate | Ion-exchanged transparent glass-ceramic | 1.53 | 600 μm | 110 |

Examples 7A-7C

A transparent article including a strengthened glass-ceramic substrate was prepared for this example with the structure delineated below in Tables 10A-10C (Exs. 7A-7C, respectively). The glass-ceramic substrate is an ion-exchanged, LAS glass-ceramic substrate having a thickness of 600 μm and a refractive index of 1.533. Further, the glass-ceramic substrate has the following composition: 74.5% SiO$_2$; 7.53% Al$_2$O$_3$; 2.1% P$_2$O$_5$; 11.3% Li$_2$O; 0.06% Na$_2$O; 0.12% K$_2$O; 4.31% ZrO$_2$; 0.06% Fe$_2$O$_3$; and 0.02% SnO$_2$ (wt %, on an oxide basis). In addition, the glass-ceramic substrate was cerammed according to the following schedule: (a) ramp from room temperature to 580° C. at 5° C./min; (b) hold at 580° C. for 2.75 hours; (c) ramp to 755° C. at 2.5° C./min; (d) hold at 755° C. for 0.75 hours; and (e) cool at a furnace rate to room temperature. After ceramming, the glass-ceramic substrate was ion-exchange strengthened in a molten salt bath of 60% KNO$_3$/40% NaNO$_3$+0.12% LiNO$_3$ (wt. %) at 500° C. for 6 hours. Further, the layers of the optical film structure were deposited according to vapor deposition conditions set forth in U.S. Patent Application Publication No. 2020/0158916, the salient portions of which are incorporated herein by reference.

Referring again to the transparent article of this example, the layers (e.g., layers 1-7 in Tables 10A-10C) of the optical film structure between the glass-ceramic substrate and the scratch resistant layer (e.g., layer 8 in Tables 10A-10C) are configured to achieve low reflectance and low color generated by the transition zone between the substrate 110 and the scratch resistant layer. Further, the arrangement of the layers in the optical film structure, along with the stoichiometry of the high RI layers in the structure, was configured to obtain residual compressive stress and elastic modulus levels (e.g., ~160 GPa for Ex. 7A, ~160 GPa for Ex. 7B, and ~150 GPa for Ex. 7C) in the optical film structure that assure average failure strength levels of the transparent article that exceed 700 MPa, as measured in an ROR test. With further regard to the optical film structures of Exs. 7B and 7C, not all of the high RI layers in these designs have an elastic modulus from about 150 to 160 GPa; however, the scratch resistant layer, which is the thickest and most influential layer in this context, is configured with an elastic modulus level from about 150 to 160 GPa. The low RI layers of the samples of this example (i.e., Exs. 7A-7C) were deposited according to a conventional reactive sputtering process and the high RI layers comprising $SiO_xN_y$, were deposited according to a reactive sputtering process according to the following conditions: sputter power=6 kW, argon gas flow rate=80-100 sccm, oxygen gas flow rate=35-65 sccm, and a nitrogen gas flow rate=250 sccm. Notably, oxygen gas flow rates were varied to produce high RI layers with a controlled $SiO_xN_y$ stoichiometry that influenced the refractive index, elastic modulus, residual compressive stress and hardness.

In addition, the high RI layers above the thick, scratch resistant layer in Exs. 7B and 7C comprise $SiO_xN_y$ or a SiNx composition that approaches $Si_3N_4$. Because these layers are substantially thinner than the scratch resistant layer, which comprises $SiO_xN_y$, they had less influence on the overall mechanical properties of the optical film structure (e.g., elastic modulus, residual compressive stress and hardness). Further, these $SiN_x$ layers were processed as follows: sputter power=6-9 kW, ICP power=2-4 kW, argon gas flow rater (metal sputter zone)=100-500 sccm, argon gas flow rate (ICP zone)=80 sccm, oxygen gas flow rate (ICP zone)=0-25 sccm, and a nitrogen gas flow rate=100-250 sccm.

TABLE 10A

Ex. 7A transparent article design with strengthened glass-ceramic substrate

| Layer | Material | Refractive index (@ 550 nm) | Thickness (nm, unless noted) | Exemplary elements of transparent article 100 (see FIGS. 1A-1D) |
|---|---|---|---|---|
| Medium | Air | 1.0 | N/A | N/A |
| 15 | $SiO_2$ | 1.477 | 101.73 | 131 |
| 14 | $SiO_xN_y$ | 1.829 | 101.87 | 130B |
| 13 | $SiO_2$ | 1.477 | 20.74 | 130A |
| 12 | $SiO_xN_y$ | 1.829 | 44.48 | 130B |
| 11 | $SiO_2$ | 1.477 | 49.76 | 130A |
| 10 | $SiO_xN_y$ | 1.829 | 46.24 | 130B |
| 9 | $SiO_2$ | 1.477 | 21.92 | 130A |
| 8 | $SiO_xN_y$ | 1.829 | 1954.06 | 150 and/or 130B |
| 7 | $SiO_2$ | 1.477 | 8.86 | 130A |
| 6 | $SiO_xN_y$ | 1.829 | 49.18 | 130B |
| 5 | $SiO_2$ | 1.477 | 30.09 | 130A |
| 4 | $SiO_xN_y$ | 1.829 | 30.66 | 130B |
| 3 | $SiO_2$ | 1.477 | 51.23 | 130A |
| 2 | $SiO_xN_y$ | 1.829 | 13.97 | 130B |
| 1 | $SiO_2$ | 1.477 | 25 | 130A |
| Substrate | Ion-exchanged transparent glass-ceramic | 1.533 | 600 μm | 110 |

TABLE 10B

Ex. 7B transparent article design with strengthened glass-ceramic substrate

| Layer | Material | Refractive index (@ 550 nm) | Thickness (nm, unless noted) | Exemplary elements of transparent article 100 (see FIGS. 1A-1D) |
|---|---|---|---|---|
| Medium | Air | 1.0 | N/A | N/A |
| 13 | $SiO_2$ | 1.476 | 96.74 | 131 |
| 12 | $Si_3N_4$ | 2.014 | 146.13 | 130B |
| 11 | $SiO_2$ | 1.476 | 23.14 | 130A |
| 10 | $Si_3N_4$ | 2.014 | 35.95 | 130B |
| 9 | $SiO_2$ | 1.476 | 15.18 | 130A |
| 8 | $SiO_xN_y$ | 1.829 | 2001.57 | 150 and/or 130B |
| 7 | $SiO_2$ | 1.476 | 8.86 | 130A |
| 6 | $SiO_xN_y$ | 1.829 | 49.18 | 130B |
| 5 | $SiO_2$ | 1.476 | 30.09 | 130A |
| 4 | $SiO_xN_y$ | 1.829 | 30.66 | 130B |
| 3 | $SiO_2$ | 1.476 | 51.23 | 130A |
| 2 | $SiO_xN_y$ | 1.829 | 13.97 | 130B |
| 1 | $SiO_2$ | 1.476 | 25 | 130A |
| Substrate | Ion-exchanged transparent glass-ceramic | 1.533 | 600 μm | 110 |

TABLE 10C

Ex. 7C transparent article design with strengthened glass-ceramic substrate

| Layer | Material | Refractive index (@ 550 nm) | Thickness (nm, unless noted) | Exemplary elements of transparent article 100 (see FIGS. 1A-1D) |
|---|---|---|---|---|
| Medium | Air | 1.0 | N/A | N/A |
| 13 | $SiO_2$ | 1.476 | 96.36 | 131 |
| 12 | $Si_3N_4$ | 2.014 | 142.58 | 130B |
| 11 | $SiO_2$ | 1.476 | 25.15 | 130A |
| 10 | $Si_3N_4$ | 2.014 | 29.48 | 130B |
| 9 | $SiO_2$ | 1.476 | 15.47 | 130A |
| 8 | $SiO_xN_y$ | 1.744 | 2111.16 | 150 and/or 130B |
| 7 | $SiO_2$ | 1.476 | 8.96 | 130A |
| 6 | $SiO_xN_y$ | 1.744 | 52.21 | 130B |
| 5 | $SiO_2$ | 1.476 | 30.17 | 130A |
| 4 | $SiO_xN_y$ | 1.744 | 33.42 | 130B |
| 3 | $SiO_2$ | 1.476 | 50.24 | 130A |
| 2 | $SiO_xN_y$ | 1.744 | 16.58 | 130B |
| 1 | $SiO_2$ | 1.476 | 25 | 130A |
| Substrate | Ion-exchanged transparent glass-ceramic | 1.533 | 600 μm | 110 |

Figure 9A:
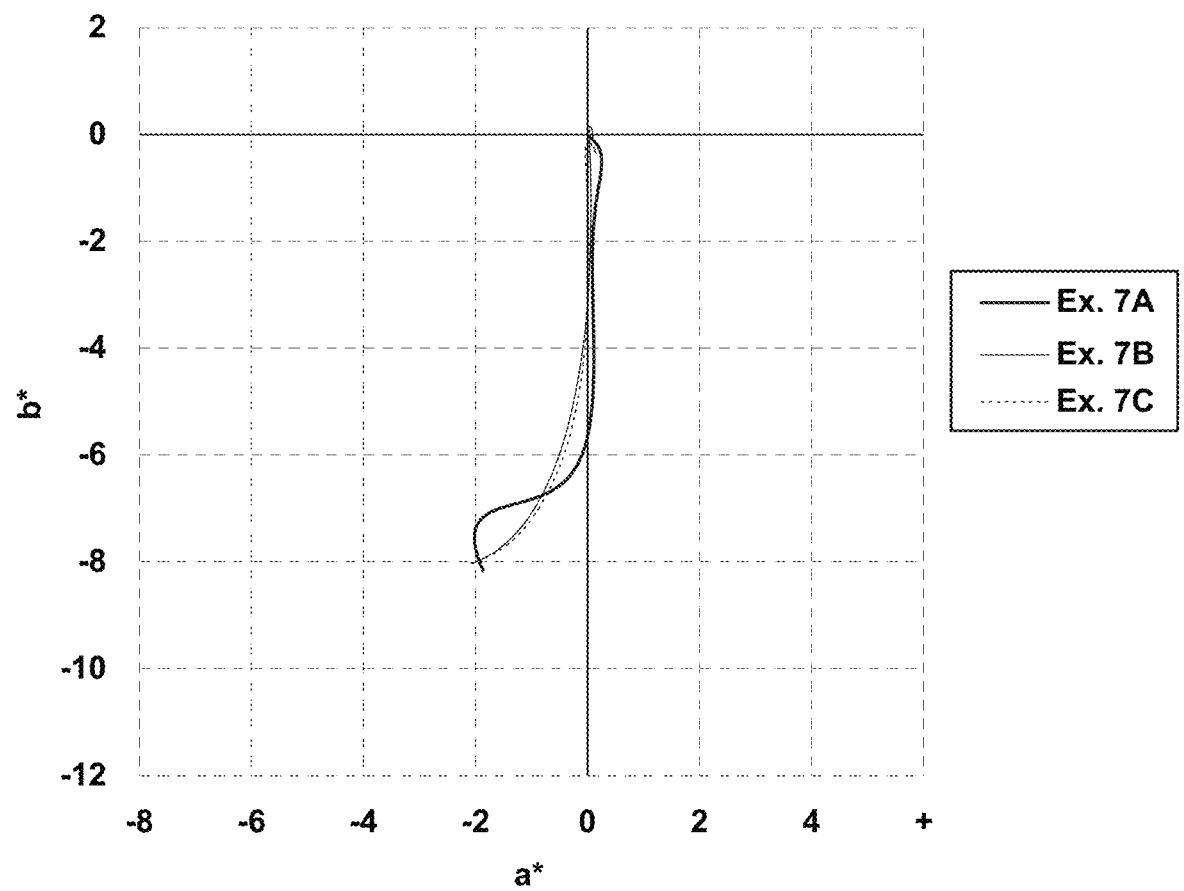
FIG. 9A is a plot of single-sided, reflected color, as measured at incident angles from 0° to 90°, for three transparent articles of the disclosure.

Referring now to FIG. 9A, a plot is provided of single-sided, reflected color, as measured at incident angles from 0° to 90°, for the three transparent articles of this example (Exs. 7A-7C). As evidenced by the data, the reflected color levels of Exs. 7A-7C are less than 9 (i.e., $\sqrt{(a^{*2}+b^{*2})}$) for the various a*, b* coordinates in FIG. 9A.

Figure 9B:
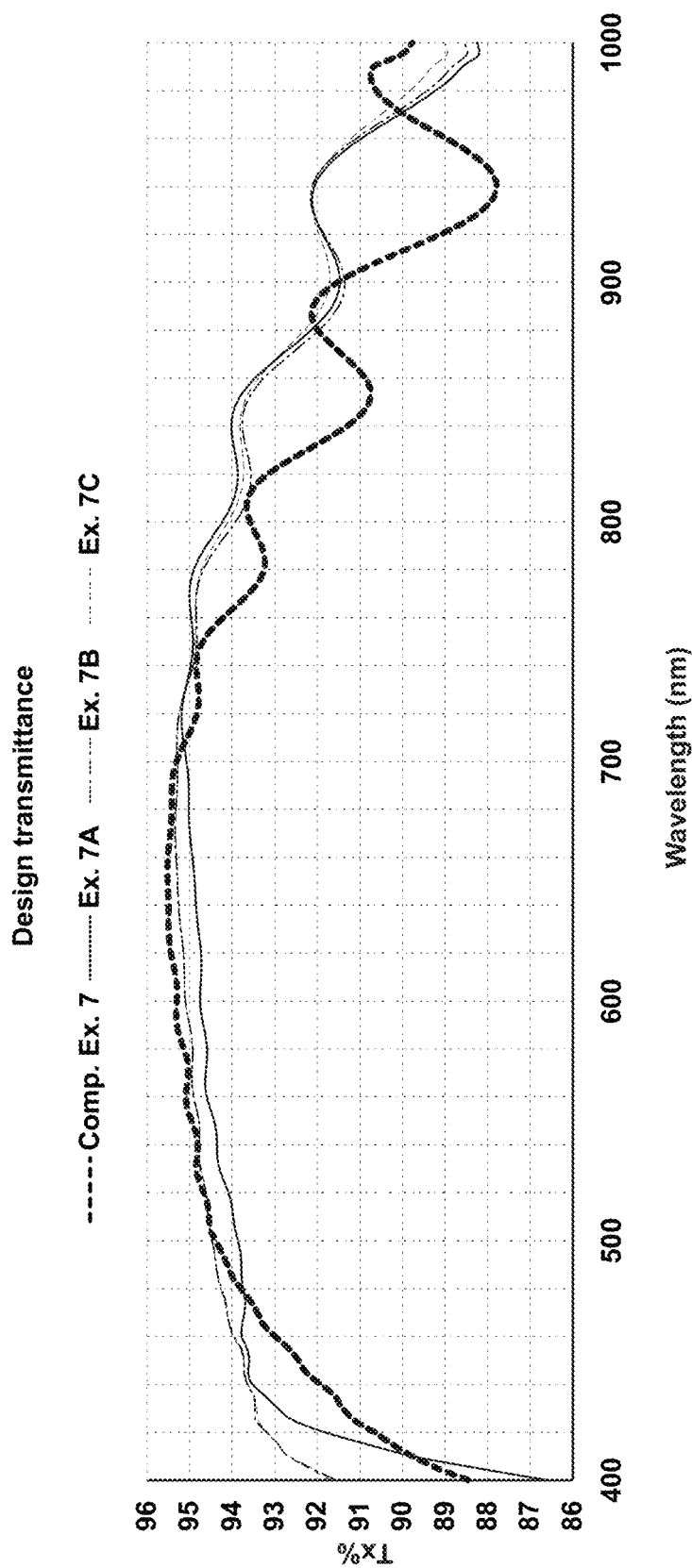
FIG. 9B is a plot of two-sided transmittance vs. wavelength, as measured at a normal incident angle, for three transparent articles of the disclosure and a comparative article.

Referring now to FIG. 9B, a plot is provided of two-sided transmittance vs. wavelength, as measured at a normal incident angle, for the three transparent articles of this example (Exs. 7A-7C) and a comparative article (Comp. Ex. 7). In particular, the comparative article (Comp. Ex. 7) is a transparent article with the some glass-ceramic substrate and an optical film structure with a layer configuration similar to those of Exs. 7A-7C. However, all of the high RI layers of the Comp. Ex. 7 design exhibit an elastic modulus of greater than 200 GPa. As evidenced by the data, the average transmittance exhibited by Exs. 7A-7C is greater than 92% in the visible spectrum (~420 nm to 700 nm) and in the infrared spectrum at 940 nm at a normal incident angle. In contrast, the transmittance of the comparative example is lower in the infrared spectrum at 940 nm, about 88%.

Figure 9C:
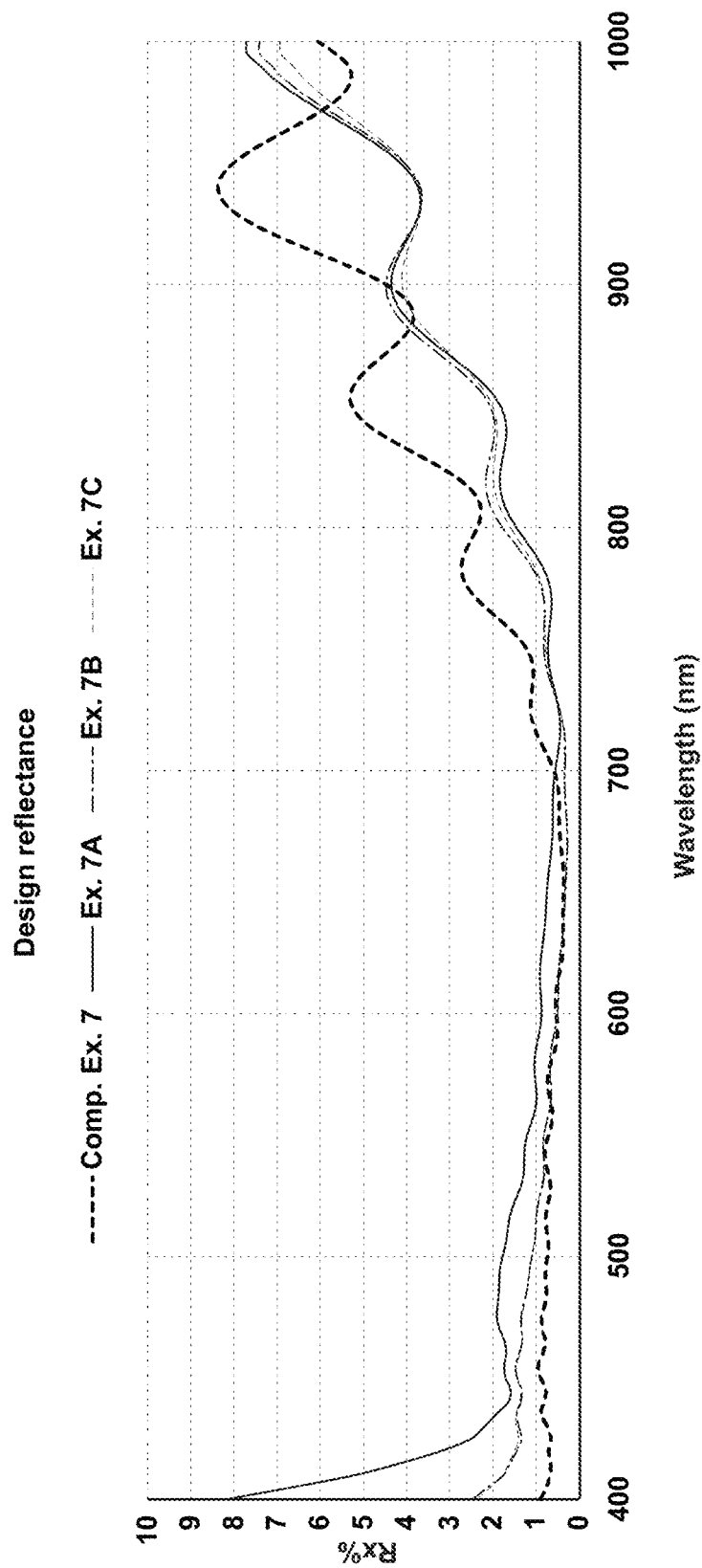
FIG. 9C is a plot of two-sided reflectance vs. wavelength, as measured at a normal incident angle, for three transparent articles of the disclosure.

Referring now to FIG. 9C, a plot is provided of two-sided reflectance vs. wavelength, as measured at a normal incident angle, for the three transparent articles of this example (Exs. 7A-7C) and a comparative article (Comp. Ex. 7). As evidenced by the data, the average reflectance exhibited by Exs. 7A-7C is less than 2% in the visible spectrum (~450 nm to 700 nm) and less than 4% in the infrared spectrum at 940 nm. In contrast, the average reflectance of the comparative example is higher in the infrared spectrum at 940 nm, about 8%.

As outlined herein, a first aspect of the disclosure is a transparent article that includes: a glass-ceramic substrate comprising a first and a second primary surface, the primary surfaces opposing one another; and an optical film structure defining an outer surface, the optical film structure disposed on the first primary surface. The glass-ceramic substrate comprises a crystallinity of at least 40% by weight. Further, the optical film structure comprises a plurality of alternating high refractive index (RI) and low RI layers and a scratch-resistant layer. The article also exhibits an average photopic transmittance of greater than 80%, a transmitted color $\sqrt{(a^{*2}+b^{*2})}$ with a D65 illuminant of less than 4 at incident angles from 0 degrees to 10 degrees, and a maximum hardness of greater than 10 GPa, as measured by a Berkovich Hardness Test over an indentation depth range from about 100 nm to about 500 nm from the outer surface of the optical film structure. Further, the glass-ceramic substrate comprises an elastic modulus of greater than 85 GPa and a fracture toughness of greater than 0.8 MPa·$\sqrt{m}$.

As outlined herein, a second aspect of the disclosure is a transparent article according to the first aspect, wherein the substrate comprises an elastic modulus of greater than 95 GPa and a fracture toughness of greater than 1.0 MPa·$\sqrt{m}$.

As outlined herein, a third aspect of the disclosure is a transparent article according to the first aspect or the second aspect, wherein the article exhibits a maximum hardness of greater than 14 GPa, as measured by a Berkovich Hardness Test over an indentation depth range from about 100 nm to about 500 nm from the outer surface of the optical film structure.

As outlined herein, a fourth aspect of the disclosure is a transparent article according to any one of the first through third aspects, wherein the article exhibits an average photopic transmittance of greater than 90%, and further the article exhibits a transmitted color $\sqrt{(a^{*2}+b^{*2})}$ with a D65 illuminant of less than 2 at incident angles from 0 degrees to 10 degrees.

As outlined herein, a fifth aspect of the disclosure is a transparent article according to any one of the first through fourth aspects, wherein the glass-ceramic substrate comprises a crystallinity of at least 75% by weight.

As outlined herein, a sixth aspect of the disclosure is a transparent article according to any one of the first through fifth aspects, wherein the glass-ceramic substrate comprises a lithium disilicate phase.

As outlined herein, a seventh aspect of the disclosure is a transparent article according to the sixth aspect, wherein the glass-ceramic substrate further comprises a petalite phase.

As outlined herein, an eighth aspect of the disclosure is a transparent article according to any one of the first through seventh aspects, wherein each high RI layer and the scratch-resistant layer comprises one or more of $Si_3N_4$, $SiN_y$, and $SiO_xN_y$, and each low RI layer comprises one or more of $SiO_2$ and $SiO_x$, and further wherein each high RI layer has a thickness from about 5 nm to about 300 nm, each low RI layer has a thickness from about 5 nm to about 300 nm, and the scratch-resistant layer has a thickness from about 200 nm to about 10,000 nm.

As outlined herein, a ninth aspect of the disclosure is a transparent article according to any one of the first through eighth aspects, wherein the optical film structure comprises an outer structure and an inner structure, the scratch-resistant layer disposed between the outer and inner structures.

As outlined herein, a tenth aspect of the disclosure is a transparent article according to any one of the first through ninth aspects, wherein the article exhibits a transmitted haze of less than 1%.

As outlined herein, an eleventh aspect of the disclosure is a transparent article according to any one of the first through tenth aspects, wherein the glass-ceramic substrate is chemically strengthened and has a surface compressive stress of from about 200 MPa to about 400 MPa and a compressive depth of layer of from about 1 µm to 15 µm.

As outlined herein, a twelfth aspect of the disclosure is a transparent article according to the eleventh aspect, wherein the glass-ceramic substrate further exhibits a maximum central tension (CT) value from about 80 MPa to about 200 MPa, and further wherein the substrate has a thickness of about 0.6 mm or less.

As outlined herein, a thirteenth aspect of the disclosure is a transparent article that includes: a glass-ceramic substrate comprising a first and a second primary surface, the primary surfaces opposing one another; and an optical film structure defining an outer surface, the optical film structure disposed on the first primary surface. The glass-ceramic substrate comprises a crystallinity of at least 40% by weight. Further, the optical film structure comprises a plurality of alternating high refractive index (RI) and low RI layers and a scratch-resistant layer. The article also exhibits an average photopic transmittance of greater than 80%, a transmitted color $\sqrt{(a^{*2}+b^{*2})}$ with a D65 illuminant of less than 4 at incident angles from 0 degrees to 10 degrees, and a lateral crack zone with an average largest linear dimension of less than 160 microns or a lateral crack area that is less than 25,000 µm$^2$, as tested with a Vickers Indentation Damage Test with a 1000 g load.

As outlined herein, a fourteenth aspect of the disclosure is a transparent article according to the thirteenth aspect, wherein the article exhibits a load threshold of about 340 mN or greater for lateral crack formation, as tested with a Ramped Load Scratch Test with a conical diamond indenter on the outer surface of the optical film structure.

As outlined herein, a fifteenth aspect of the disclosure is a transparent article according to the thirteenth aspect or the fourteenth aspect, wherein the article exhibits an average photopic transmittance of greater than 90%, and further the article exhibits a transmitted color $\sqrt{(a^{*2}+b^{*2})}$ with a D65 illuminant of less than 2 at incident angles from 0 degrees to 10 degrees.

As outlined herein, a sixteenth aspect of the disclosure is a transparent article according to any one of the thirteenth through fifteenth aspects, wherein the glass-ceramic substrate comprises a crystallinity of at least 75% by weight.

As outlined herein, a seventeenth aspect of the disclosure is a transparent article according to any one of the thirteenth through sixteenth aspects, wherein the glass-ceramic substrate comprises a lithium disilicate phase.

As outlined herein, an eighteenth aspect of the disclosure is a transparent article according to the seventeenth aspect, wherein the glass-ceramic substrate further comprises a petalite phase.

As outlined herein, a nineteenth aspect of the disclosure is a transparent article according to any one of the thirteenth through eighteenth aspects, wherein each high RI layer and the scratch-resistant layer comprises one or more of $Si_3N_4$, $SiN_y$, and $SiO_xN_y$, and each low RI layer comprises one or more of $SiO_2$ and $SiO_x$, and further wherein each high RI layer has a thickness from about 5 nm to about 300 nm, each low RI layer has a thickness from about 5 nm to about 300 nm, and the scratch-resistant layer has a thickness from about 200 nm to about 10,000 nm.

As outlined herein, a twentieth aspect of the disclosure is a transparent article according to any one of the thirteenth through nineteenth aspects, wherein the optical film structure comprises an outer structure and an inner structure, the scratch-resistant layer disposed between the outer and inner structures.

As outlined herein, a twenty-first aspect of the disclosure is a transparent article according to any one of the thirteenth through twentieth aspects, wherein the article exhibits a transmitted haze of less than 1%.

As outlined herein, a twenty-second aspect of the disclosure is a transparent article according to any one of the thirteenth through twenty-first aspects, wherein the glass-ceramic substrate is chemically strengthened and has a surface compressive stress of from about 200 MPa to about 400 MPa and a compressive depth of layer of from about 1 μm to 15 μm.

As outlined herein, a twenty-third aspect of the disclosure is a transparent article according to the twenty-second aspect, wherein the glass-ceramic substrate further exhibits a maximum central tension (CT) value from about 80 MPa to about 200 MPa, and further wherein the substrate has a thickness of about 0.6 mm or less.

As outlined herein, a twenty-fourth aspect of the disclosure is a transparent article that includes: a glass-ceramic substrate having a refractive index of about 1.52 or greater and comprising a first and a second primary surface, the primary surfaces opposing one another; and an optical film structure defining an outer surface, the optical film structure disposed on the first primary surface. The glass-ceramic substrate comprises a crystallinity of at least 40% by weight. Further, the optical film structure comprises a plurality of alternating high refractive index (RI) and low RI layers and a scratch-resistant layer. The article also exhibits an average photopic transmittance of greater than 80% and a transmitted color $\sqrt{(a^{*2}+b^{*2})}$ with a D65 illuminant of less than 4 at incident angles from 0 degrees to 10 degrees. In addition, the optical film structure comprises an outer structure and an inner structure, the scratch-resistant layer disposed between the outer and inner structures. Further, the inner structure of the optical film structure is configured to substantially match an optical impedance between the glass-ceramic substrate and the scratch-resistant layer. The glass-ceramic substrate also comprises an elastic modulus of greater than 85 GPa and a fracture toughness of greater than 0.8 MPa·√m.

As outlined herein, a twenty-fifth aspect of the disclosure is a transparent article according to the twenty-fourth aspect, wherein the article exhibits a maximum hardness of greater than 14 GPa, as measured by a Berkovich Hardness Test over an indentation depth range from about 100 nm to about 500 nm from the outer surface of the optical film structure.

As outlined herein, a twenty-sixth aspect of the disclosure is a transparent article according to the twenty-fourth aspect or the twenty-fifth aspect, wherein the article exhibits a lateral crack zone with an average largest linear dimension of less than 160 microns or a lateral crack area that is less than 25,000 μm$^2$, as tested with a Vickers Damage Test with a 1000 g load.

As outlined herein, a twenty-seventh aspect of the disclosure is a transparent article according to any one of the twenty-fourth through twenty-sixth aspects, wherein the article exhibits an average photopic transmittance of greater than 90%, and further the article exhibits a transmitted color $\sqrt{(a^{*2}+b^{*2})}$ with a D65 illuminant of less than 2 at incident angles from 0 degrees to 10 degrees.

As outlined herein, a twenty-eighth aspect of the disclosure is a transparent article according to any one of the twenty-fourth through twenty-seventh aspects, wherein each high RI layer and the scratch-resistant layer comprises one or more of $Si_3N_4$, $SiN_y$, and $SiO_xN_y$, and each low RI layer comprises one or more of $SiO_2$ and $SiO_x$.

As outlined herein, a twenty-ninth aspect of the disclosure is a transparent article according to any one of the twenty-fourth through twenty-eighth aspects, wherein each high RI layer has a thickness from about 5 nm to about 300 nm, each low RI layer has a thickness from about 5 nm to about 300 nm, and the scratch-resistant layer has a thickness from about 200 nm to about 10,000 nm.

As outlined herein, a thirtieth aspect of the disclosure is a transparent article according to any one of the twenty-fourth through twenty-ninth aspects, wherein a volume of the low RI layers in the inner structure of the optical film structure is less than about 59% and a volume of the high RI layers in the inner structure of the optical film structure is greater than about 41%.

As outlined herein, a thirty-first aspect of the disclosure is a transparent article according to any one of the twenty-fourth through thirtieth aspects, wherein the article exhibits a transmitted haze of less than 1%.

As outlined herein, a thirty-second aspect of the disclosure is a display device comprising the transparent article of any one of the first through twelfth aspects, wherein the transparent article serves as a protective cover for the display device.

As outlined herein, a thirty-third aspect of disclosure is a display device comprising the transparent article of any one of the thirteenth through twenty-third aspects, wherein the transparent article serves as a protective cover for the display device.

As outlined herein, a thirty-fourth aspect of the disclosure is a display device comprising the transparent article of any one of the twenty-fourth through thirty-first aspects, wherein the transparent article serves as a protective cover for the display device.

As outlined herein, a thirty-fifth aspect of the disclosure pertains to a transparent article that includes: a glass-ceramic substrate comprising a first and a second primary surface, the primary surfaces opposing one another; and an optical film structure comprising an inner surface and an outer surface, the inner surface of the optical film structure disposed on the first primary surface. The glass-ceramic substrate comprises a crystallinity of at least 40% by weight. Further, the optical film structure comprises a plurality of alternating high refractive index (RI) layers and low RI layers and a scratch-resistant layer. The article also exhibits an average photopic transmittance of greater than 80% and a maximum hardness of greater than 10 GPa, as measured by a Berkovich Hardness Test over an indentation depth range from about 100 nm to about 500 nm from the outer surface of the optical film structure. The glass-ceramic substrate comprises an elastic modulus of greater than 85 GPa and a fracture toughness of greater than 0.8 MPa·√m. Further, the optical film structure exhibits a residual compressive stress of greater than or equal to 700 MPa and an elastic modulus of greater than or equal to 140 GPa.

According to a thirty-sixth aspect of the disclosure, the thirty-fifth aspect is provided, wherein the article exhibits a transmitted color $\sqrt{(a^{*2}+b^{*2})}$ with a D65 illuminant of less than 4 at incident angles from 0 degrees to 10 degrees.

According to a thirty-seventh aspect of the disclosure, the thirty-fifth or thirty-sixth aspect is provided, wherein the glass-ceramic substrate comprises an elastic modulus of greater than 95 GPa and a fracture toughness of greater than 1.0 MPa·√m.

According to a thirty-eighth aspect of the disclosure, any one of the thirty-fifth through thirty-seventh aspects is provided, wherein the article exhibits a maximum hardness of greater than 12 GPa, as measured by a Berkovich Hardness Test over an indentation depth range from about 100 nm to about 500 nm from the outer surface of the optical film structure.

According to a thirty-ninth aspect of the disclosure, any one of the thirty-fifth through thirty-eighth aspects is provided, wherein the article exhibits an average photopic transmittance of greater than 90%, and further the article exhibits a transmitted color $\sqrt{(a^{*2}+b^{*2})}$ with a D65 illuminant of less than 2 at incident angles from 0 degrees to 10 degrees.

According to a fortieth aspect of the disclosure, any one of the thirty-fifth through thirty-ninth aspects is provided, wherein the glass-ceramic substrate comprises a crystallinity of at least 75% by weight.

According to a forty-first aspect of the disclosure, any one of the thirty-fifth through fortieth aspects is provided, wherein the glass-ceramic substrate comprises a lithium disilicate phase.

According to a forty-second aspect of the disclosure, the forty-first aspect is provided, wherein the glass-ceramic substrate further comprises a petalite phase.

According to a forty-third aspect of the disclosure, any one of the thirty-fifth through forty-second aspects is provided, wherein each high RI layer and the scratch-resistant layer comprises a silicon-containing nitride or a silicon-containing oxynitride, and each low RI layer comprises a silicon-containing oxide, and further wherein each high RI layer has a thickness from about 5 nm to about 300 nm, each low RI layer has a thickness from about 5 nm to about 300 nm, and the scratch-resistant layer has a thickness from about 100 nm to about 10,000 nm.

According to a forty-fourth aspect of the disclosure, the forty-third aspect is provided, wherein a first low RI layer is disposed in direct contact with the first primary surface of the substrate, and further wherein the scratch-resistant layer has a thickness from about 1000 nm to about 3000 nm.

According to a forty-fifth aspect of the disclosure, any one of the thirty-fifth through forty-fourth aspects is provided, wherein the glass-ceramic substrate is chemically strengthened and has a surface compressive stress of from about 200 MPa to about 400 MPa and a compressive depth of layer of from about 1 μm to about 15 μm.

According to a forty-sixth aspect of the disclosure, the forty-fifth aspect is provided, wherein the glass-ceramic substrate further exhibits a maximum central tension (CT) value from about 80 MPa to about 200 MPa, and further wherein the substrate has a thickness of about 0.6 mm or less.

A forty-seventh aspect of the disclosure pertains to a transparent article that includes: a glass-ceramic substrate comprising a first and a second primary surface, the primary surfaces opposing one another; and an optical film structure comprising an inner surface and an outer surface, the inner surface of the optical film structure disposed on the first primary surface. The glass-ceramic substrate comprises a crystallinity of at least 40% by weight. Further, the optical film structure comprises a plurality of alternating high refractive index (RI) layers and low RI layers and a scratch-resistant layer. The article also exhibits an average photopic transmittance of greater than 80% and a maximum hardness of greater than 10 GPa, as measured by a Berkovich Hardness Test over an indentation depth range from about 100 nm to about 500 nm from the outer surface of the optical film structure. The glass-ceramic substrate comprises an elastic modulus of greater than 85 GPa and a fracture toughness of greater than 0.8 MPa·√m. Further, the optical film structure exhibits a residual compressive stress of from 700 MPa to 1100 MPa and an elastic modulus of from 140 GPa to 200 GPa. In addition, the article exhibits an average failure stress of 700 MPa or greater in a ring-on-ring test with the outer surface of the optical film structure placed in tension.

According to a forty-eighth aspect of the disclosure, the forty-seventh aspect is provided, wherein the article exhibits an average failure stress of 800 MPa or greater in a ring-on-ring test with the outer surface of the optical film structure placed in tension.

According to a forty-ninth aspect of the disclosure, the forty-seventh aspect or forty-eighty aspect is provided, wherein the optical film structure exhibits an elastic modulus of from 140 GPa to 180 GPa.

According to a fiftieth aspect of the disclosure, any one of the forty-seventh through forty-ninth aspects is provided, wherein the article exhibits a transmitted color $\sqrt{(a^{*2}+b^{*2})}$ with a D65 illuminant of less than 4 at incident angles from 0 degrees to 10 degrees.

According to a fifty-first aspect of the disclosure, any one of the forty-seventh through fiftieth aspects is provided, wherein the glass-ceramic substrate comprises an elastic modulus of greater than 95 GPa and a fracture toughness of greater than 1.0 MPa·√m.

According to a fifty-second aspect of the disclosure, any one of the forty-seventh through fifty-first aspects is provided, wherein the article exhibits a maximum hardness of greater than 12 GPa, as measured by a Berkovich Hardness Test over an indentation depth range from about 100 nm to about 500 nm from the outer surface of the optical film structure.

According to a fifty-third aspect of the disclosure, any one of the forty-seventh through fifty-second aspects is provided, wherein the article exhibits an average photopic transmittance of greater than 90%, and further the article exhibits a transmitted color $\sqrt{(a^{*2}+b^{*2})}$ with a D65 illuminant of less than 1 at incident angles from 0 degrees to 10 degrees.

According to a fifty-fourth aspect of the disclosure, any one of the forty-seventh through fifty-third aspects is provided, wherein the glass-ceramic substrate comprises a crystallinity of at least 75% by weight, a lithium disilicate phase and a petalite phase.

According to a fifty-fifth aspect of the disclosure, any one of the forty-seventh through fifty-fourth aspects is provided, wherein each high RI layer and the scratch-resistant layer comprises a silicon-containing nitride or a silicon-containing oxynitride, and each low RI layer comprises a silicon-containing oxide, and further wherein each high RI layer has a thickness from about 5 nm to about 300 nm, each low RI layer has a thickness from about 5 nm to about 300 nm, and the scratch-resistant layer has a thickness from about 100 nm to about 10,000 nm.

According to a fifty-sixth aspect of the disclosure, the fifty-fifth aspect is provided, wherein a first low RI layer is disposed in direct contact with the first primary surface of the substrate, and further wherein the scratch-resistant layer has a thickness from about 1000 nm to about 3000 nm.

According to a fifty-seventh aspect of the disclosure, any one of the forty-seventh through fifty-sixth aspects is provided, wherein the glass-ceramic substrate is chemically strengthened and has a surface compressive stress of from about 200 MPa to about 400 MPa and a compressive depth of layer of from about 1 µm to 15 µm.

According to a fifty-eighth aspect of the disclosure, the fifty-seventh aspect is provided, wherein the glass-ceramic substrate further exhibits a maximum central tension (CT) value from about 80 MPa to about 200 MPa, and further wherein the substrate has a thickness of about 0.6 mm or less.

According to a fifty-ninth aspect of the disclosure, any one of the forty-seventh through fifty-eighth aspects is provided, wherein the optical film structure exhibits a residual compressive stress of from 700 MPa to 850 MPa and an elastic modulus of from about 140 GPa to 165 GPa.

According to a sixtieth aspect of the disclosure, any one of the forty-seventh through fifty-eighth aspects is provided, wherein the optical film structure exhibits a residual compressive stress of from 750 MPa to 950 MPa and an elastic modulus of from about 140 GPa to 175 GPa.

According to a sixty-first aspect of the disclosure, any one of the forty-seventh through fifty-eighth aspects is provided, wherein the optical film structure exhibits a residual compressive stress of from 850 MPa to 1100 MPa and an elastic modulus of from about 140 GPa to 195 GPa.

A sixty-second aspect of the disclosure pertains to a transparent article that includes: a glass-ceramic substrate comprising a first and a second primary surface, the primary surfaces opposing one another; and an optical film structure comprising an inner surface and an outer surface, the inner surface of the optical film structure disposed on the first primary surface. The glass-ceramic substrate comprises a crystallinity of at least 75%, a lithium disilicate phase, and average crystallite size of less than 100 nm. Further, the optical film structure comprises a plurality of alternating high refractive index (RI) layers and low RI layers and a scratch-resistant layer. The optical film structure has a total physical thickness of from about 200 nm to about 5000 nm, and the scratch resistant layer has a physical thickness from about 100 nm to about 4000 nm. The optical film structure exhibits an elastic modulus from about 140 GPa to 180 GPa. Further, the article exhibits an average failure stress of 700 MPa or greater in a ring-on-ring test with the outer surface of the optical film structure placed in tension.

According to a sixty-third aspect of the disclosure, the sixty-second aspect is provided, wherein the article exhibits an average photopic transmittance of greater than 80%.

According to a sixty-fourth aspect of the disclosure, the sixty-second aspect or sixty-third aspect is provided, wherein the article exhibits a maximum hardness of greater than 10 GPa, as measured by a Berkovich Hardness Test over an indentation depth range from about 100 nm to about 500 nm from the outer surface of the optical film structure.

According to a sixty-fifth aspect of the disclosure, any one of the sixty-second through sixty-fourth aspects is provided, wherein the article exhibits a transmitted color $\sqrt{(a^{*2}+b^{*2})}$ with a D65 illuminant of less than 4 at incident angles from 0 degrees to 10 degrees.

According to a sixty-sixth aspect of the disclosure, any one of the sixty-second through sixty-fifth aspects is provided, wherein each high RI layer and the scratch-resistant layer comprises a silicon-containing nitride or a silicon-containing oxynitride, and each low RI layer comprises a silicon-containing oxide, and further wherein each high RI layer has a thickness from about 5 nm to about 300 nm, each low RI layer has a thickness from about 5 nm to about 300 nm, and the scratch-resistant layer has a thickness from about 100 nm to about 10,000 nm.

According to a sixty-seventh aspect of the disclosure, the sixty-sixth aspect is provided, wherein the scratch resistant layer has a thickness from 1500 nm to 2500 nm and the total amount of the plurality of alternating high RI layers and low RI layers and the scratch resistant layer ranges from six (6) layers to twenty-five (25) layers.

According to a sixty-eighth aspect of the disclosure, any one of the thirty-fifth through forty-sixth aspects is provided, wherein the transparent article serves as a protective cover for the display device.

According to a sixty-ninth aspect of the disclosure, any one of the forty-seventh through sixty-first aspects is provided, wherein the transparent article serves as a protective cover for the display device.

According to a seventieth aspect of the disclosure, any one of the sixty-second through sixty-seventh aspects is provided, wherein the transparent article serves as a protective cover for the display device.

A seventy-first aspect of the disclosure pertains to a method of making a transparent article that includes: providing a glass-ceramic substrate comprising a first and a second primary surface, the primary surfaces opposing one another; and depositing an optical film structure on the substrate, the optical film structure comprising an inner surface and an outer surface, wherein the inner surface of the optical film structure is disposed on the first primary surface. The glass-ceramic substrate comprises a crystallinity of at least 40% by weight. Further, the optical film structure comprises a plurality of alternating high refractive index (RI) layers and low RI layers and a scratch-resistant layer. The article also exhibits an average photopic transmittance of greater than 80% and a maximum hardness of greater than 10 GPa, as measured by a Berkovich Hardness Test over an indentation depth range from about 100 nm to about 500 nm from the outer surface of the optical film structure. The glass-ceramic substrate comprises an elastic modulus of greater than 85 GPa and a fracture toughness of greater than 0.8 MPa·√m. Further, the step of depositing the optical film structure is conducted such that the optical film structure exhibits a residual compressive stress of greater than or equal to 700 MPa and an elastic modulus of greater than or equal to 140 GPa According to a seventy-second aspect of the disclosure, the seventy-first aspect is provided, wherein the step of depositing the optical film structure is further conducted such that the high RI layers and the scratch resistant layer are deposited by a reactive sputter deposition process in which an oxygen gas flow rate is controlled such that the optical film structure exhibits a residual compressive stress of greater than or equal to 700 MPa and an elastic modulus of greater than or equal to 140 GPa.

As outlined herein, a seventy-third aspect of the disclosure is a transparent article that includes: a glass-ceramic substrate comprising a first and a second primary surface, the primary surfaces opposing one another; and an optical film structure defining an outer surface, the optical film structure disposed on the first primary surface. The glass-ceramic substrate comprises a refractive index of about 1.52 or greater, a crystallinity of at least 75% by weight, a lithium disilicate phase, and a petalite phase. The glass-ceramic substrate also comprises 70-80% $SiO_2$, 5-10% $Al_2O_3$, 10-15% $Li_2O$, 0.01-1% $Na_2O$, 0.01-1% $K_2O$, 0.1-5% $P_2O_5$ and 0.1-7% $ZrO_2$ (in wt. %, oxide basis). The optical film structure comprises a plurality of alternating high refractive index (RI) and low RI layers and a scratch-resistant layer. Each high RI layer and the scratch-resistant layer comprises one or more of $Si_3N_4$, $SiN_y$, and $SiO_xN_y$, and each low RI layer comprises one or more of $SiO_2$ and $SiO_x$. Each high RI layer has a thickness from about 5 nm to about 300 nm, each low RI layer has a thickness from about 5 nm to about 300 nm, and the scratch-resistant layer has a thickness from about 200 nm to about 10,000 nm. The article exhibits an average photopic transmittance of greater than 80% and a transmitted haze of less than 1%. The article also exhibits a transmitted color $\sqrt{(a^{*2}+b^{*2})}$ with a D65 illuminant of less than 4 at incident angles from 0 degrees to 10 degrees. The article further exhibits a maximum hardness of greater than 10 GPa, as measured by a Berkovich Hardness Test over an indentation depth range from about 100 nm to about 500 nm from the outer surface of the optical film structure. The glass-ceramic substrate also comprises an elastic modulus of greater than 85 GPa and a fracture toughness of greater than 0.8 MPa·$\sqrt{m}$.

As outlined herein, a seventy-fourth aspect of the disclosure is a transparent article according to the seventy-third aspect, wherein the optical film structure comprises an outer structure and an inner structure, the scratch-resistant layer disposed between the outer and inner structures.

As outlined herein, a seventy-fifth aspect of the disclosure is a transparent article according to the seventy-third aspect or the seventy-fourth aspect, wherein the glass-ceramic substrate is chemically strengthened and has a surface compressive stress of from about 200 MPa to about 400 MPa and a compressive depth of layer of from about 1 μm to about 15 μm.

As outlined herein, a seventy-sixth aspect of the disclosure is a transparent article according to any one of the seventy-third to the seventy-fifth aspects, wherein the glass-ceramic substrate further comprises 0.1-1.5% CaO.

As outlined herein, a seventy-seventh aspect of the disclosure is a transparent article according to any one of the seventy-third to the seventy-sixth aspects, wherein the article serves as a protective cover for the display device.

Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. A transparent article, comprising:
    a glass-ceramic substrate comprising a first and a second primary surface, the primary surfaces opposing one another; and
    an optical film structure comprising an inner surface and an outer surface, the inner surface of the optical film structure disposed on the first primary surface,
    wherein the glass-ceramic substrate comprises a crystallinity of at least 40% by weight,
    wherein the optical film structure comprises a plurality of alternating high refractive index (RI) layers and low RI layers and a scratch-resistant layer,
    wherein the article exhibits an average photopic transmittance of greater than 80%,
    wherein the article exhibits a maximum hardness of greater than 10 GPa, as measured by a Berkovich Hardness Test over an indentation depth range from about 100 nm to about 500 nm from the outer surface of the optical film structure,
    wherein the glass-ceramic substrate comprises an elastic modulus of greater than 85 GPa and a fracture toughness of greater than 0.8 MPa·$\sqrt{m}$,
    further wherein the optical film structure exhibits a residual compressive stress of greater than or equal to 700 MPa and an elastic modulus of greater than or equal to 140 GPa; and
    wherein the glass-ceramic substrate is chemically strengthened and has a surface compressive stress of from about 200 MPa to about 400 MPa and a compressive depth of layer of from about 1 μm to about 15 μm, wherein the glass-ceramic substrate further exhibits a maximum central tension (CT) value from about 80 MPa to about 200 MPa, and further wherein the substrate has a thickness of about 0.6 mm or less.

2. The transparent article of claim 1, wherein the glass-ceramic substrate comprises a crystallinity of at least 75% by weight, a lithium disilicate phase, and a petalite phase.

3. The transparent article of claim 1, wherein each high RI layer and the scratch-resistant layer comprises a silicon-containing nitride or a silicon-containing oxynitride, and each low RI layer comprises a silicon-containing oxide, and further wherein each high RI layer has a thickness from about 5 nm to about 300 nm, each low RI layer has a thickness from about 5 nm to about 300 nm, and the scratch-resistant layer has a thickness from about 100 nm to about 10,000 nm.

4. The transparent article of claim 3, wherein a first low RI layer is disposed in direct contact with the first primary surface of the substrate, and further wherein the scratch-resistant layer has a thickness from about 1000 nm to about 3000 nm.

5. A display device comprising the transparent article of claim 1, wherein the transparent article serves as a protective cover for the display device.

6. A transparent article, comprising:
    a glass-ceramic substrate comprising a first and a second primary surface, the primary surfaces opposing one another; and
    an optical film structure comprising an inner surface and an outer surface, the inner surface of the optical film structure disposed on the first primary surface,
    wherein the glass-ceramic substrate comprises a crystallinity of at least 40% by weight,
    wherein the optical film structure comprises a plurality of alternating high refractive index (RI) layers and low RI layers and a scratch-resistant layer,
    wherein the article exhibits an average photopic transmittance of greater than 80%,
    wherein the article exhibits a maximum hardness of greater than 10 GPa, as measured by a Berkovich Hardness Test over an indentation depth range from about 100 nm to about 500 nm from the outer surface of the optical film structure,
    wherein the glass-ceramic substrate comprises an elastic modulus of greater than 85 GPa and a fracture toughness of greater than 0.8 MPa·$\sqrt{m}$,
    wherein the optical film structure exhibits a residual compressive stress of from 700 MPa to 1100 MPa and an elastic modulus of from 140 GPa to 200 GPa,
    further wherein the article exhibits an average failure stress of 700 MPa or greater in a ring-on-ring test with the outer surface of the optical film structure placed in tension; and
    wherein the glass-ceramic substrate is chemically strengthened and has a surface compressive stress of from about 200 MPa to about 400 MPa and a compressive depth of layer of from about 1 μm to about 15 μm, wherein the glass-ceramic substrate further exhibits a maximum central tension (CT) value from about 80 MPa to about 200 MPa, and further wherein the substrate has a thickness of about 0.6 mm or less.

7. The transparent article of claim 6, wherein the article exhibits an average failure stress of 800 MPa or greater in a ring-on-ring test with the outer surface of the optical film structure placed in tension, and further wherein the optical film structure exhibits an elastic modulus of from 140 GPa to 180 GPa.

8. The transparent article of claim 6, wherein the glass-ceramic substrate comprises a crystallinity of at least 75% by weight, a lithium disilicate phase and a petalite phase.

9. The transparent article of claim 6, wherein each high RI layer and the scratch-resistant layer comprises a silicon-containing nitride or a silicon-containing oxynitride, and each low RI layer comprises a silicon-containing oxide, and further wherein each high RI layer has a thickness from about 5 nm to about 300 nm, each low RI layer has a thickness from about 5 nm to about 300 nm, and the scratch-resistant layer has a thickness from about 100 nm to about 10,000 nm.

10. The transparent article of claim 9, wherein a first low RI layer is disposed in direct contact with the first primary surface of the substrate, and further wherein the scratch-resistant layer has a thickness from about 1000 nm to about 3000 nm.

11. The transparent article of claim 6, wherein the glass-ceramic substrate comprises a crystallinity of at least 75% by weight, a lithium disilicate phase, and an average crystallite size of less than 100 nm, wherein the optical film structure has a total physical thickness from about 200 nm to about 5000 nm, wherein the scratch resistant layer has a physical thickness from about 100 nm to about 4000 nm, wherein the optical film structure exhibits an elastic modulus from about 140 GPa to 180 GPa.

12. The transparent article of claim 11, wherein the scratch resistant layer has a thickness from 1500 nm to 2500 nm and the total amount of the plurality of alternating high RI layers and low RI layers and the scratch resistant layer ranges from six (6) layers to twenty-five (25) layers.

13. A display device comprising the transparent article of claim 6, wherein the transparent article serves as a protective cover for the display device.

* * * * *